United States Patent
Bengston et al.

(10) Patent No.: US 9,578,162 B2
(45) Date of Patent: Feb. 21, 2017

(54) TELECOMMUNICATIONS TECHNOLOGY

(71) Applicant: TW Vending, Inc., Hudson, WI (US)

(72) Inventors: Sam Bengston, River Falls, WI (US); Todd Westby, Woodbury, MN (US); Ben Halberg, River Falls, WI (US); Eric Bloms, River Falls, WI (US)

(73) Assignee: TW Vending, Inc., Hudson, WI (US)

( * ) Notice: Subject to any disclaimer, the term of this patent is extended or adjusted under 35 U.S.C. 154(b) by 0 days.

(21) Appl. No.: 14/136,697

(22) Filed: Dec. 20, 2013

(65) Prior Publication Data

US 2014/0219432 A1    Aug. 7, 2014

Related U.S. Application Data

(60) Provisional application No. 61/848,149, filed on Dec. 21, 2012.

(51) Int. Cl.
| | |
|---|---|
| H04M 3/00 | (2006.01) |
| H04M 1/64 | (2006.01) |
| H04M 3/42 | (2006.01) |
| H04M 1/66 | (2006.01) |
| H04M 3/22 | (2006.01) |
| H04M 3/38 | (2006.01) |

(52) U.S. Cl.
CPC ........... *H04M 3/2281* (2013.01); *H04M 3/38* (2013.01)

(58) Field of Classification Search
CPC ........... H04M 3/2281; H04M 3/42221; H04M 2215/0116; H04M 15/00
USPC ......... 379/196, 69, 210.02, 88.02, 189, 200, 379/201.06, 201.1, 188; 455/412.2
See application file for complete search history.

(56) References Cited

U.S. PATENT DOCUMENTS

| | | | |
|---|---|---|---|
| 4,054,756 A | 10/1977 | Comella et al. | |
| 5,382,972 A | 1/1995 | Kannes | |
| 6,844,893 B1 | 1/2005 | Miller et al. | |
| 7,046,779 B2 | 5/2006 | Hesse | |
| 7,061,521 B2 | 6/2006 | Bulriss et al. | |
| 7,158,621 B2 | 1/2007 | Bayne | |
| 7,256,816 B2 | 8/2007 | Profanchik et al. | |
| 7,889,847 B2 * | 2/2011 | Gainsboro | 379/88.02 |
| 8,064,580 B1 | 11/2011 | Apple et al. | |
| 8,160,219 B2 | 4/2012 | Bayne | |
| 8,494,144 B2 * | 7/2013 | Hodge | 379/210.02 |

(Continued)

*Primary Examiner* — Thjuan K Addy
(74) *Attorney, Agent, or Firm* — Skinner and Associates; Joel Skinner

(57) ABSTRACT

A telecommunications system for use in a secure facility such as a jail, prison or the like. The systems, devices and methods disclosed provide telecommunications, email, other messaging, financial services, vending, and commissary or canteen services for inmates of a secure facility with respect to family, friends and others. The system includes a phone server adapted to be communicatively connected to an external service provider; a monitoring station communicatively connected to the phone server; an account manager server communicatively connected to the phone server, and at least one telecommunications device disposed at the secure facility for use by the inmate and which is communicatively connected to the phone server. A method of telecommunicating, including receiving incomming calls at the secure facility, via the system is also disclosed.

23 Claims, 59 Drawing Sheets

(56) References Cited

U.S. PATENT DOCUMENTS

| | | | |
|---|---|---|---|
| 2008/0039053 A1* | 2/2008 | Polozola | H04L 12/1895 455/412.2 |
| 2009/0067587 A1* | 3/2009 | Rokosky et al. | 379/69 |
| 2009/0228383 A1 | 9/2009 | Martinez et al. | |
| 2012/0224678 A1* | 9/2012 | Walters et al. | 379/189 |
| 2013/0194377 A1 | 8/2013 | Humphries | |

* cited by examiner

SUPPORT PORTAL
🌐 ENGLISH (US)

REPRESENTATIVES [?]
1-BEN"OBI"WANLESS

ISSUE SUBMISSION [?]
- YOUR ISSUE: —PLEASE CHOOSE AN ISSUE—
- YOUR NAME:
- COMPANY NAME:
- DESCRIBE YOUR ISSUE:

[SUBMIT]

| INMATE NAME | | |
|---|---|---|
| ACCOUNT INFORMATION<br>ACCOUNT CODE  1471<br>NAME  INMATE NAME<br>LOCATION  ADMIN<br>LANGUAGE  ENGLISH<br>ACCOUNT BALANCES<br>TRUST BALANCE  $68.80<br>LIEN BALANCE  $0.00<br>BAIL BALANCE  $0.00<br>SMART CARD BALANCE  $0.00 | NOTICES<br>YOU HAVE 1 UNREAD MESSAGES, PLEASE GO TO<br>INBOX TAB TO VIEW THEM. | |
| PHONE REQUESTS | JAIL NOTICE | |

ACCOUNT INFO
HISTORY
CHANGE PIN
WITHDRAWAL
CANTEEN
PHONE CARD
MP3
REQUESTS
INBOX
PHONE CALL
EXIT

INMATE CANTEEN

HOME   FAQ   CONTACT

NEW ACCOUNT SIGNUP                                           STEP 1 OF 4

AN INMATE CANTEEN ACCOUNT GIVES YOU DIRECT ACCESS TO A VARIETY OF SPECIALIZED SERVICES DESIGNED SPECIFICALLY FOR FAMILY AND FRIENDS OF INMATES IN CORRECTIONAL FACILITIES AROUND THE U.S.

CURRENTLY YOU MAY DEPOSIT FUNDS DIRECTLY INTO AN INMATE'S TRUST ACCOUNT, AND SOON YOU WILL BE ABLE TO SEND CARE PACKAGES, PURCHASE PRE-PAID PHONE CARDS, AND SEND ELECTRONIC MESSAGES TO INMATES AS WELL.

PLEASE ENTER YOUR FIRST AND LAST NAME BELOW

FIRST NAME:
LAST NAME:
PHONE NUMBER:

[ NEXT ]

INMATE CANTEEN  PHONE CALL MONITORING  PHONE SITE SETTINGS  REPORTS ▷ LOGOUT

TEST SITE TELPHONY SITE SETTINGS

PHONE CALL MONITORING
PHONE CALL SETTINGS
REPORTS △

EMAIL NOTIFICATIONS
ADD NEW NOTIFICATION
EMAIL ADDRESS: A@JAILCOMB@JAIL.COM
PER APPROVED WEBUSER: NO WEBUSERS AVAILAB ▽
PER INMATE: -SELECT- ▽
PER SECTION: -SELECT- ▽
PER INMATE GROUP: -SELECT- ▽
ADD SETTING

BLACKLISTING
BLACKLIST INMATES AND WEBUSERS FROM PHONE CALLS
SELECT AN APPROVED WEBUSER: NO WEBUSERS AVAILAB ▽
SELECT AND INMATE: -SELECT- ▽
SELECT A SECTION: -SELECT- ▽
SELECT A GROUP: -SELECT- ▽
ENTER A PHONE NUMBER:
SEARCH FOR BLACKLISTED NUMBER: SEARCH
ADD SETTING

PHONE CALL HOURS
EDIT PHONE INCOMING/OUTGOING HOURS
DAY: -SELECT- ▽ START TIME: 11:24:00AM ⊠ END TIME: 11:24:00AM ⊠ ADD SETTING
MONDAY'S CALL HOURS:
MONDAY  5:00 AM  TO  10:00 PM  ⊠
MONDAY  9:30 AM  TO  9:30 PM  ⊠

FIG. 56

TELECOMMUNICATIONS TECHNOLOGY

CROSS REFERENCE TO RELATED APPLICATIONS, IF ANY

This application claims the benefit under 35 U.S.C. §119(e) of U.S. Provisional Patent Application Ser. No. 61/848,149, filed Dec. 21, 2012, which is hereby incorporated by reference.

37 C.F.R. §1.71(E) AUTHORIZATION

A portion of the disclosure of this patent document contains material which is subject to copyright protection. The copyright owner has no objection to the facsimile reproduction by anyone of the patent document or the patent disclosure, as it appears in the US patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

Field of the Invention

The present invention relates, generally, to telecommunications systems, apparatus and methods. Particularly, the invention relates to a telecommunications system for use in a secure facility such as a jail, prison or the like. Most particularly, the invention provides telecommunications, email, other messaging, financial services, vending, and commissary or canteen services for inmates of a secure facility with respect to family, friends and others.

Background Information

Existing technology in this field is believed to have significant limitations and shortcomings.

All US patents and patent applications, and all other published documents mentioned anywhere in this application are incorporated by reference in their entirety.

BRIEF SUMMARY OF THE INVENTION

The present invention provides a telecommunications apparatus and methods which are practical, reliable, secure, accurate and efficient, and which are believed to constitute an improvement over the background technology.

The invention relates to systems, devices and methods for providing telecommunications, email, other messaging, financial services, vending, and commissary or canteen services for inmates of a secure facility with respect to family, friends and others.

In one aspect, the invention provides a system for providing telecommunications between a resident inside a secure facility and at least one person outside the secure facility, and for management of such telecommunications by an administrator of the secure facility, comprising: a phone server adapted to be communicatively connected to an external service provider; a monitoring station communicatively connected to the phone server; an account manager server communicatively connected to the phone server, and at least one telecommunications device disposed at the secure facility for use by the resident and being communicatively connected to the phone server.

In another aspect, the invention provides a method for telecommunicating between a resident inside a secure facility and at least one person outside the secure facility, and for management of such telecommunication by an administrator of the secure facility, comprising the step of making an incomming voice call from at least one person outside the secure facility to the resident inside the secure facility.

The secure facility is an institution such as a jail, a detention center, a short term corrections facility, a penitentiary, a prison and a mental health institution. The resident is a person such as an inmate, a prisoner and a patient. The administrator is a person such as a sheriff, an officer, a guard, a warden, a jailer, and a mental health worker. The at least one person outside the secure facility is a person such as a family member, a friend, an acquaintance, and an attorney. The telecommunications between the resident of the secure facility and the at least one person outside the secure facility is a communication mode such as voice, SMS text, IM, email, and/or audio-visual. Management of telecommunications is selected from the group of activities consisting of monitoring, recording, controlling and documenting communications and transactions of the resident. Controlling activities may involve call blocking, blacklisting, email notification, section/station setting, attorney call status, and/or deferred call status. The at least one telecommunications device disposed at the secure facility is a device such as a land line telephone, a mobile telephone, a personal computer (PC), and a telecommunications kiosk. And, the person outside the secure facility communicatively connects with the system by a device adapted to connect to the phone server selected from the group of devices consisting of a land line telephone, a mobile telephone, a smart phone, a PC and a telecommunications kiosk.

The person outside the secure facility is further able to electronically deposit funds or credits to an account of the resident at the secure facility. The account funding products and services may be voice communications, audio-visual communications, vending drink, snacks and food items, and commissary items such as personal care items, books, videos, clothing and apparel, and blankets. The administrator is further able to monitor, audit and manage the account of the resident.

The present invention is believed to involve novel elements, combined in novel ways to yield more than predictable results. The problems solved by the invention were not fully recognized in the prior art.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIGS. 12 to 24 show embodiments of user screens of the administrator controls and tools of the system as outlined in the Chart of FIG. 9, with FIG. 12 illustrating a LogIn interface.

FIG. 13 discloses a chat initiation screen.

Figure 14:
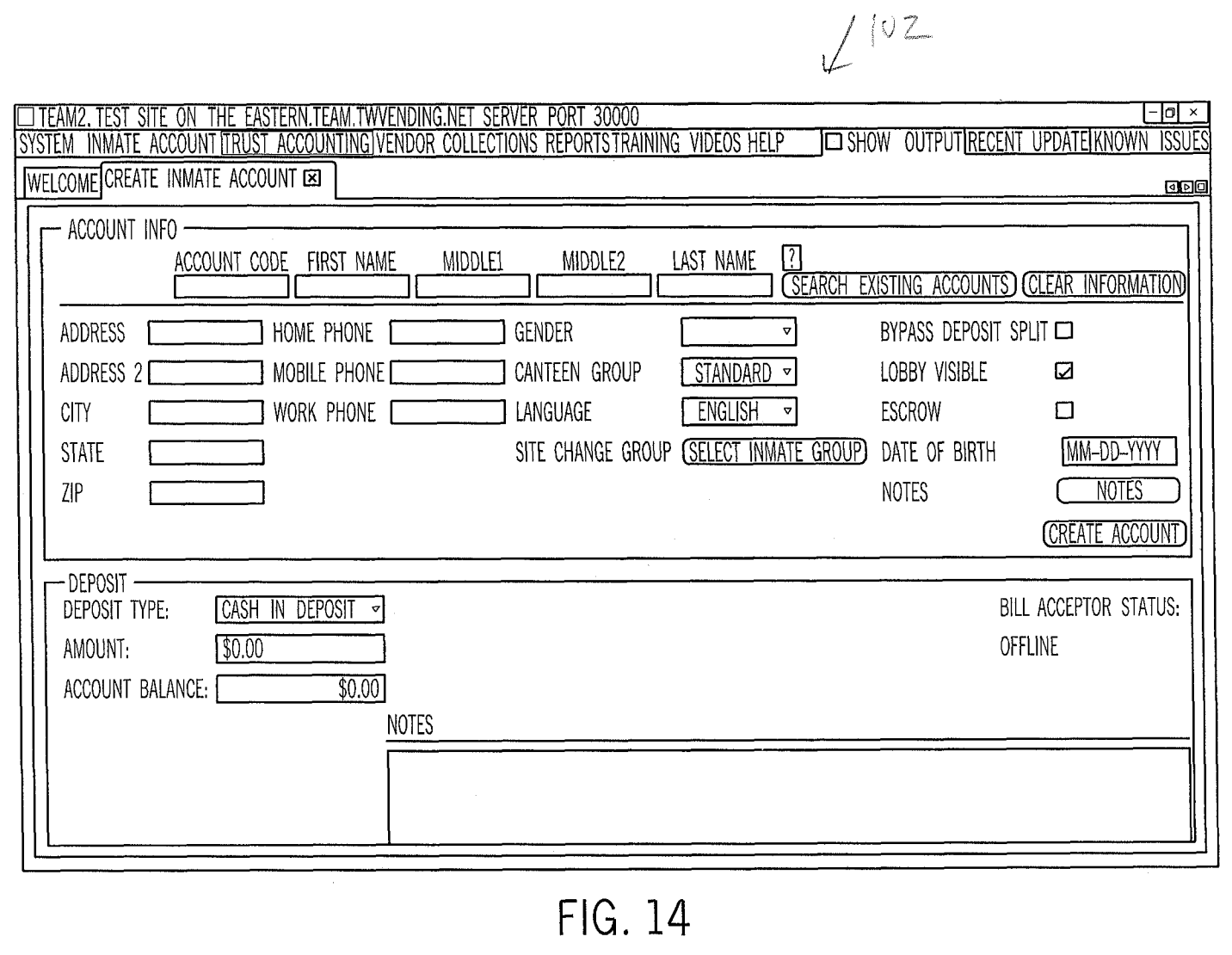

FIG. 14 shows a Create Inmate Account screen.

Figure 15:
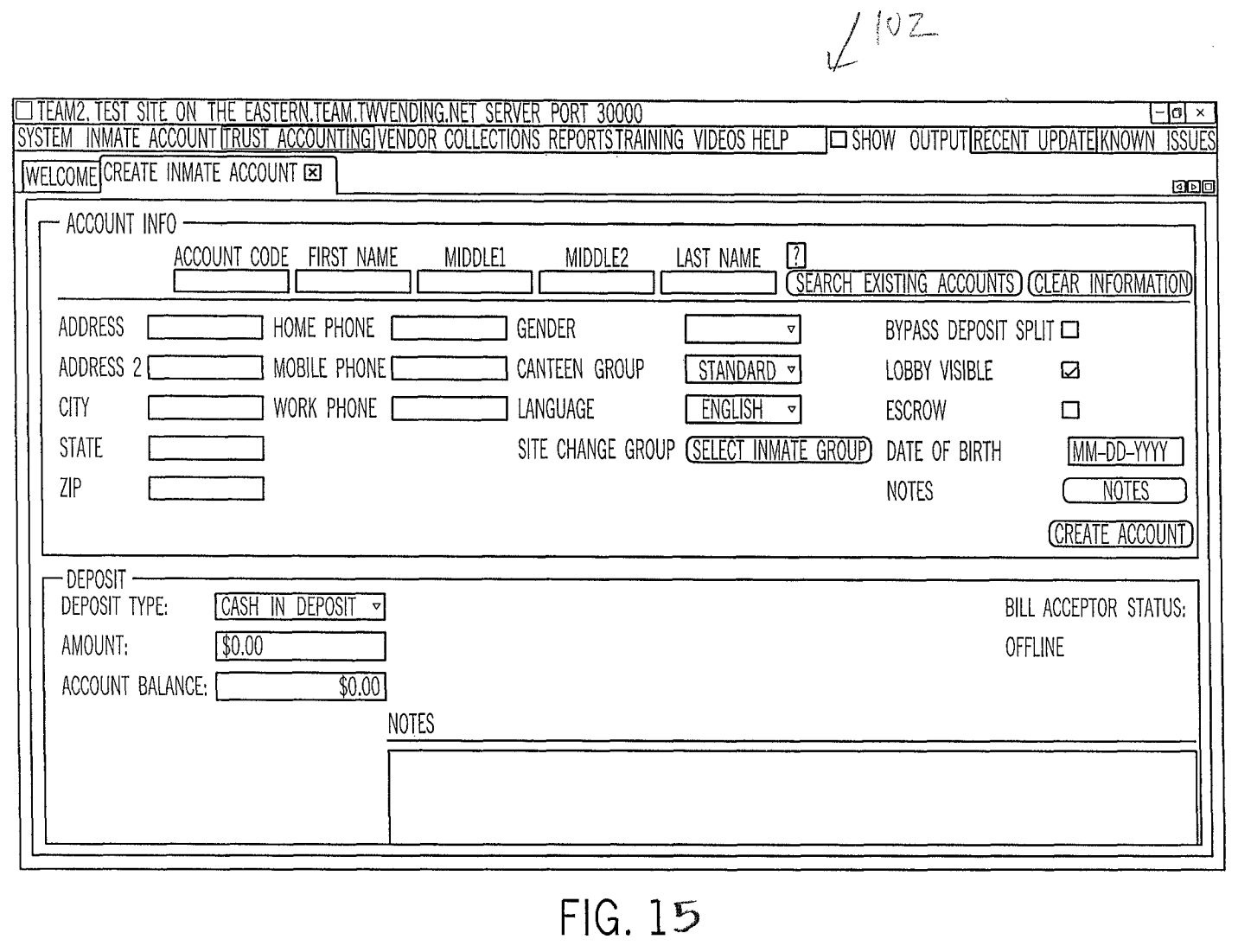

FIG. 15 also shows a Create Account screen.

FIG. 16 discloses a Deposit Funds to Inmate Account screen.

Figure 17:
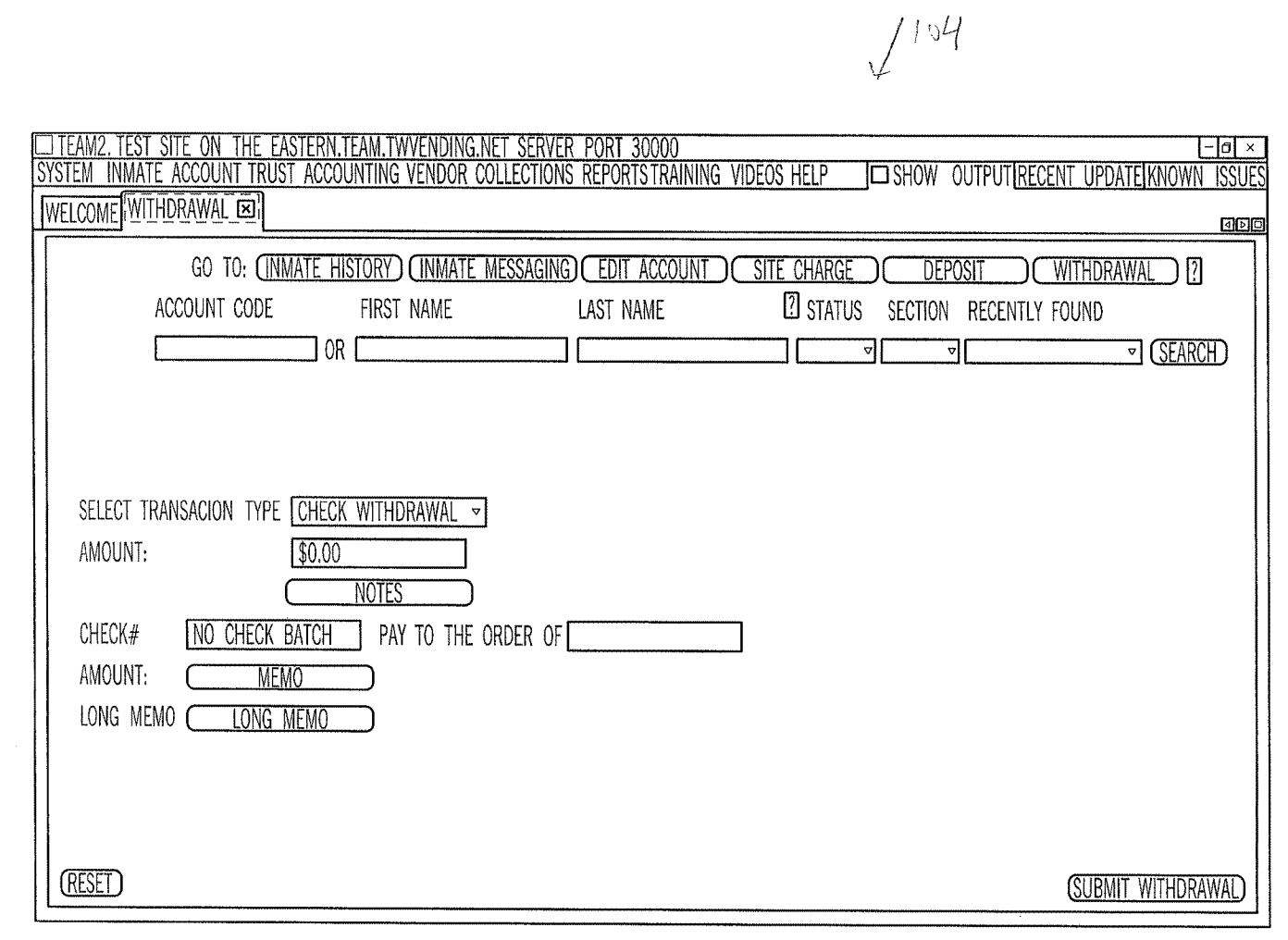

FIG. 17 illustrates a Withdraw Funds from Inmate Account screen.

Figure 18:
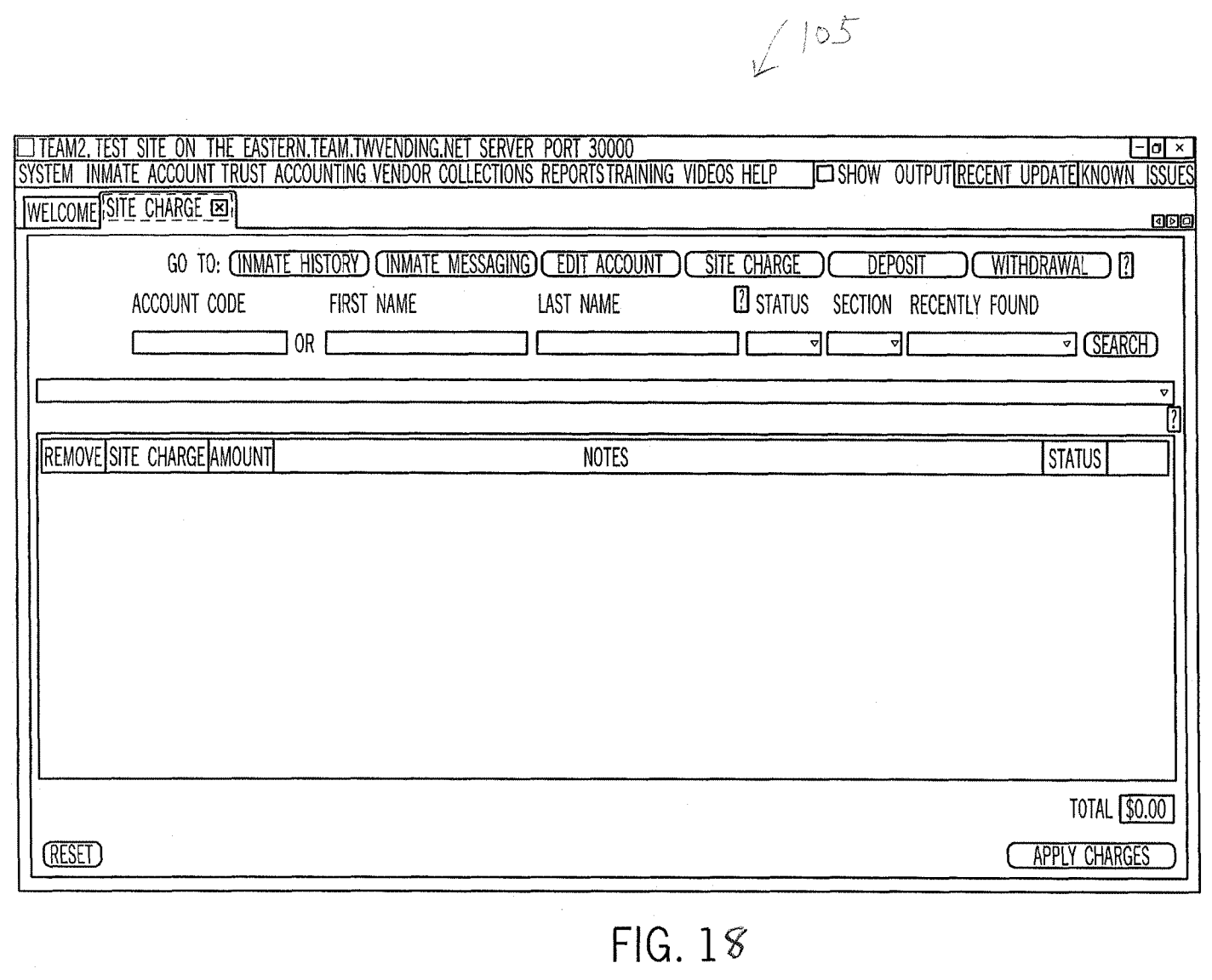

FIG. 18 shows a Charge (Site Charge) An Inmate's Account for Money Owed to a Vendor screen.

Figure 19:
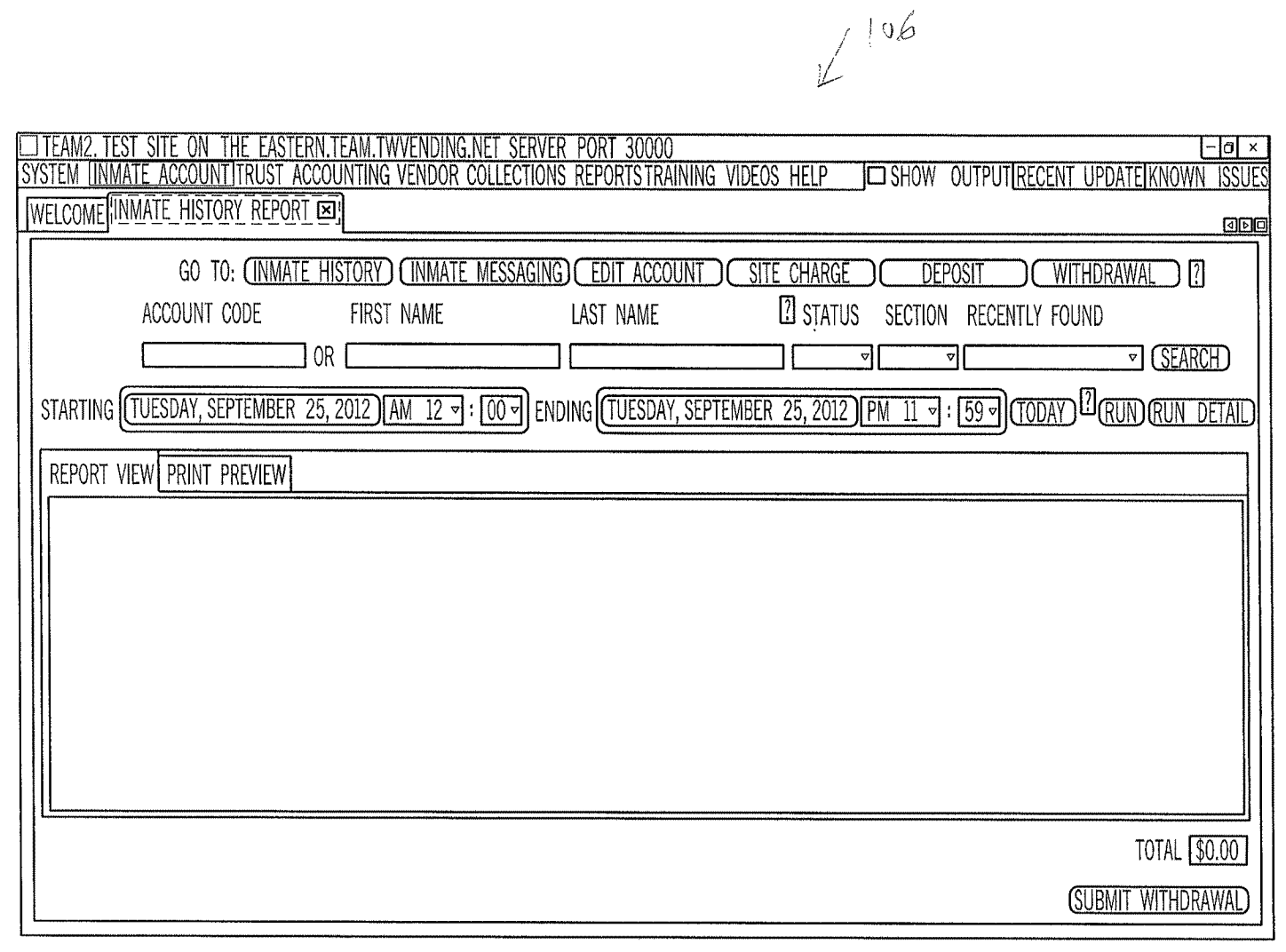

FIG. 19 discloses a Inmate History Report user interface.

FIG. 20 shows a Inmate Request screen.

FIG. 21 shows an Undo/Correction Wizard interface.

FIG. 22 shows a submit a ticket 110A screen.

FIG. 23 shows a remote support 110B screen.

FIG. 24 shows a live chat 110C screen.

FIGS. 25-37 show further administrator control functions and user interfaces, with FIG. 25 illustrating a Close Inmate Account screen.

Figure 26:
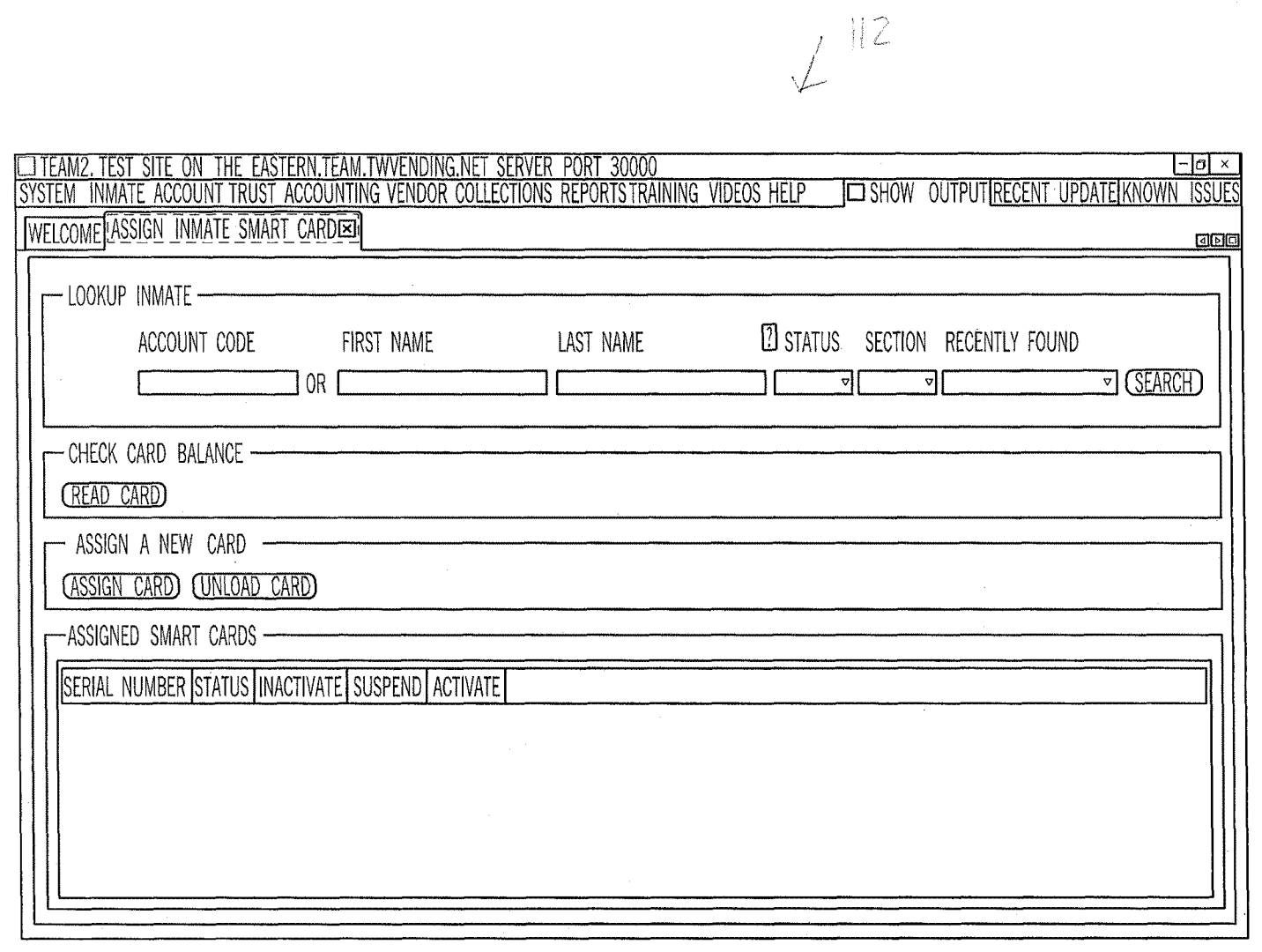

FIG. 26 shows an Assign Inmate Smart Card screen.

Figure 27:
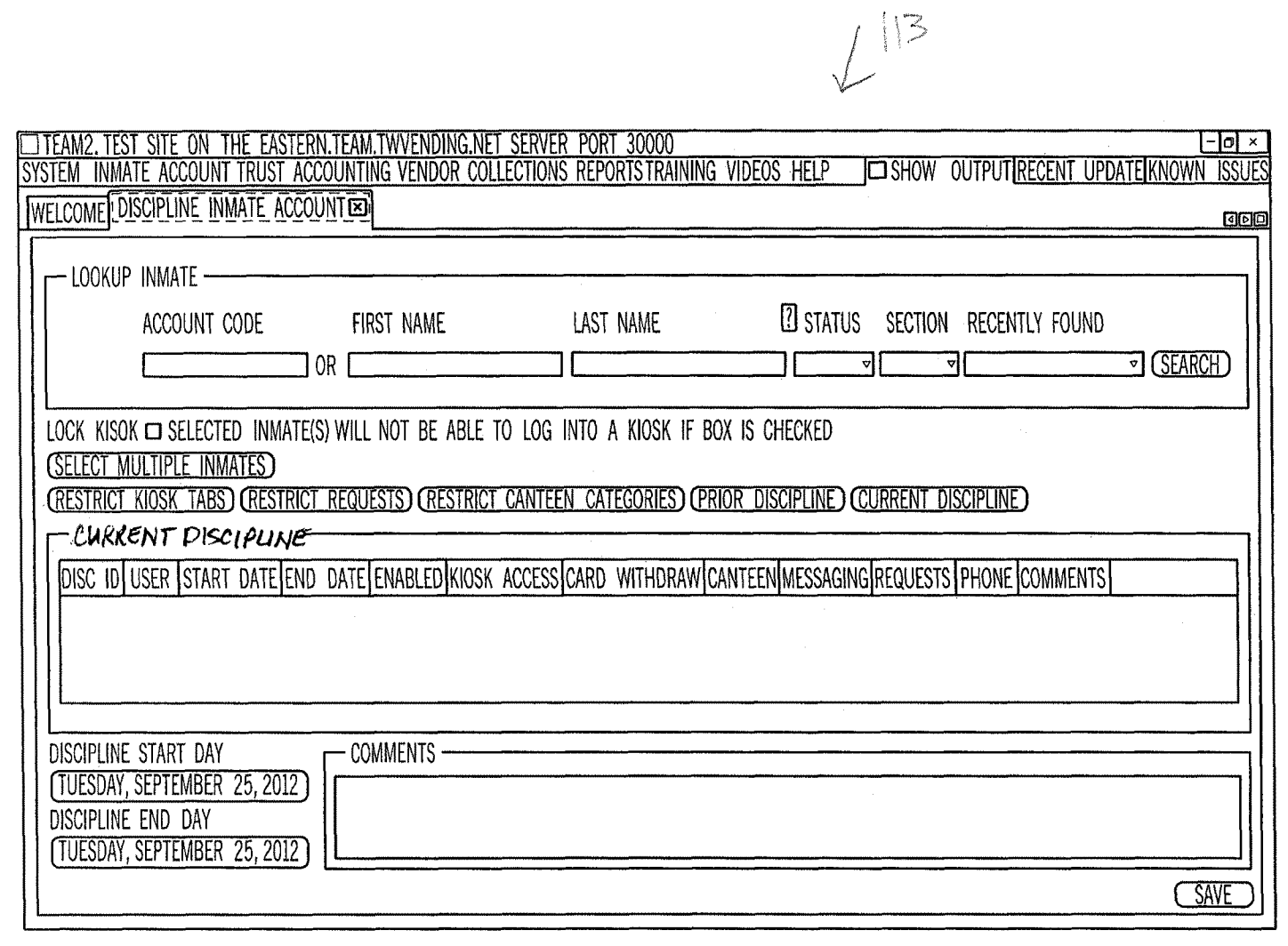

FIG. 27 discloses a Discipline Inmate Account interface.

Figure 28:
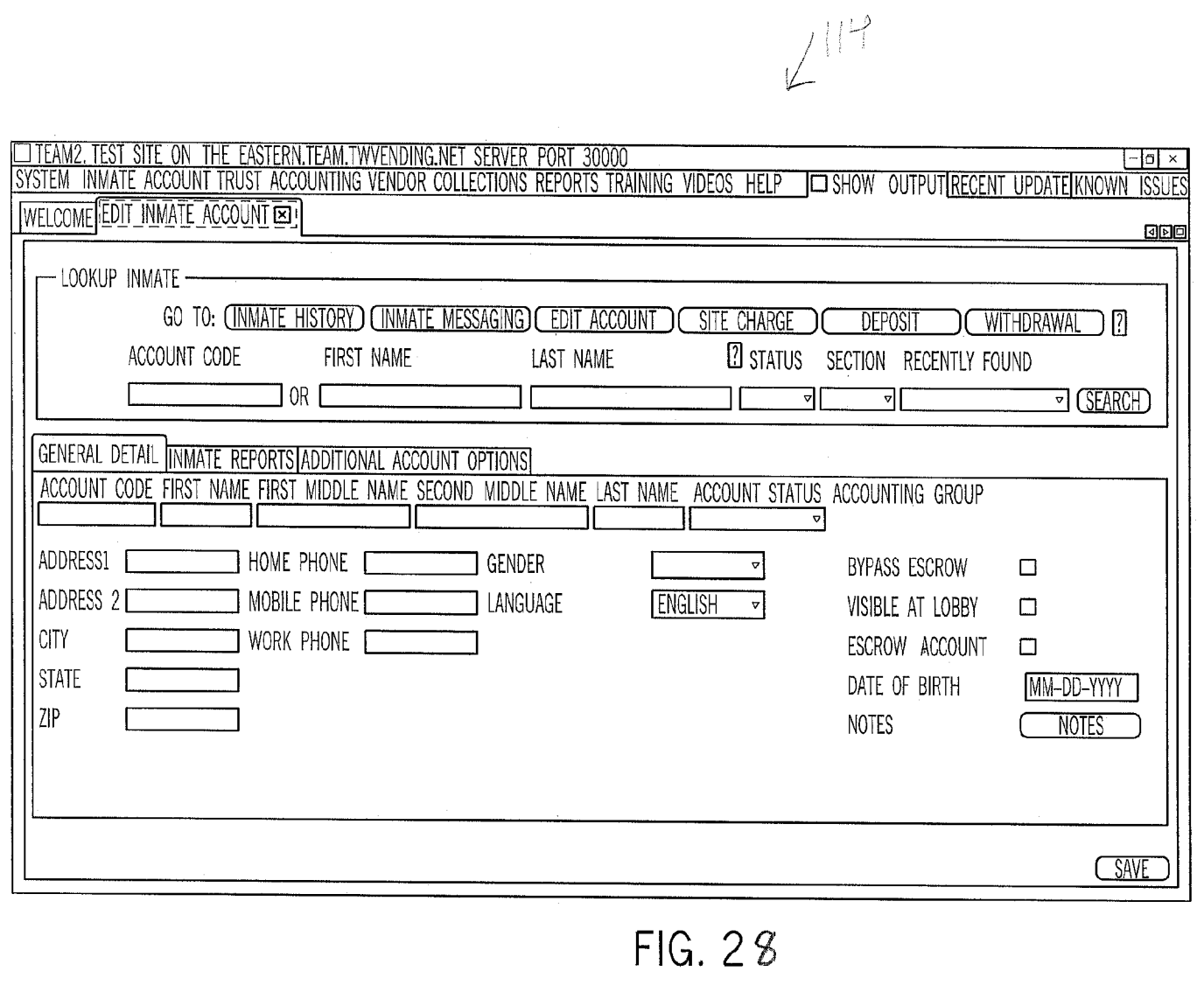

FIG. 28 illustrates an Edit Inmate Account screen.

FIG. 29 shows an Inmate Requests—Old screen.

Figure 30:
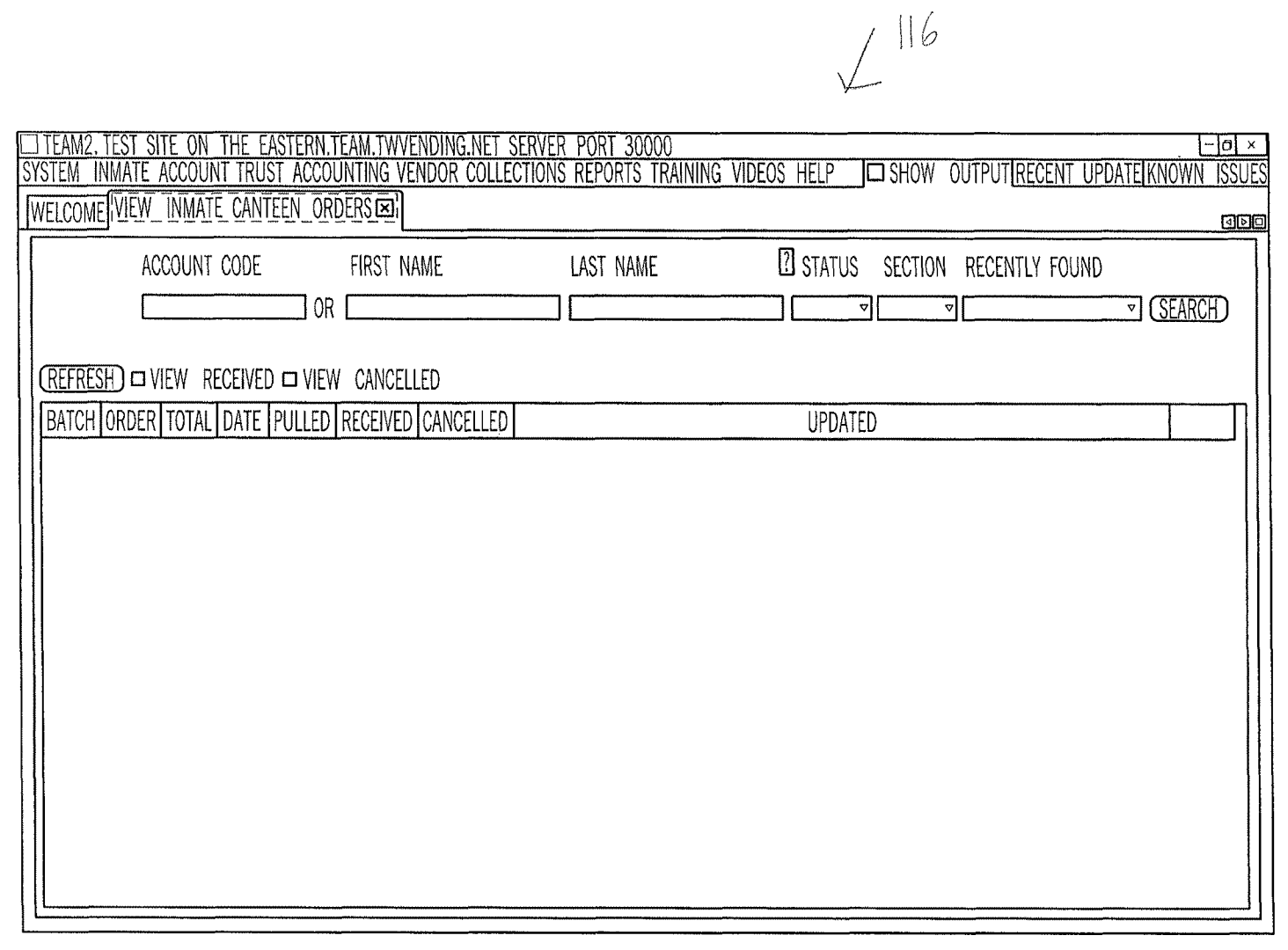

FIG. 30 shows a View Inmate Canteen Order screen.

FIG. 31 shows a Bank Deposit interface.

Figure 32:
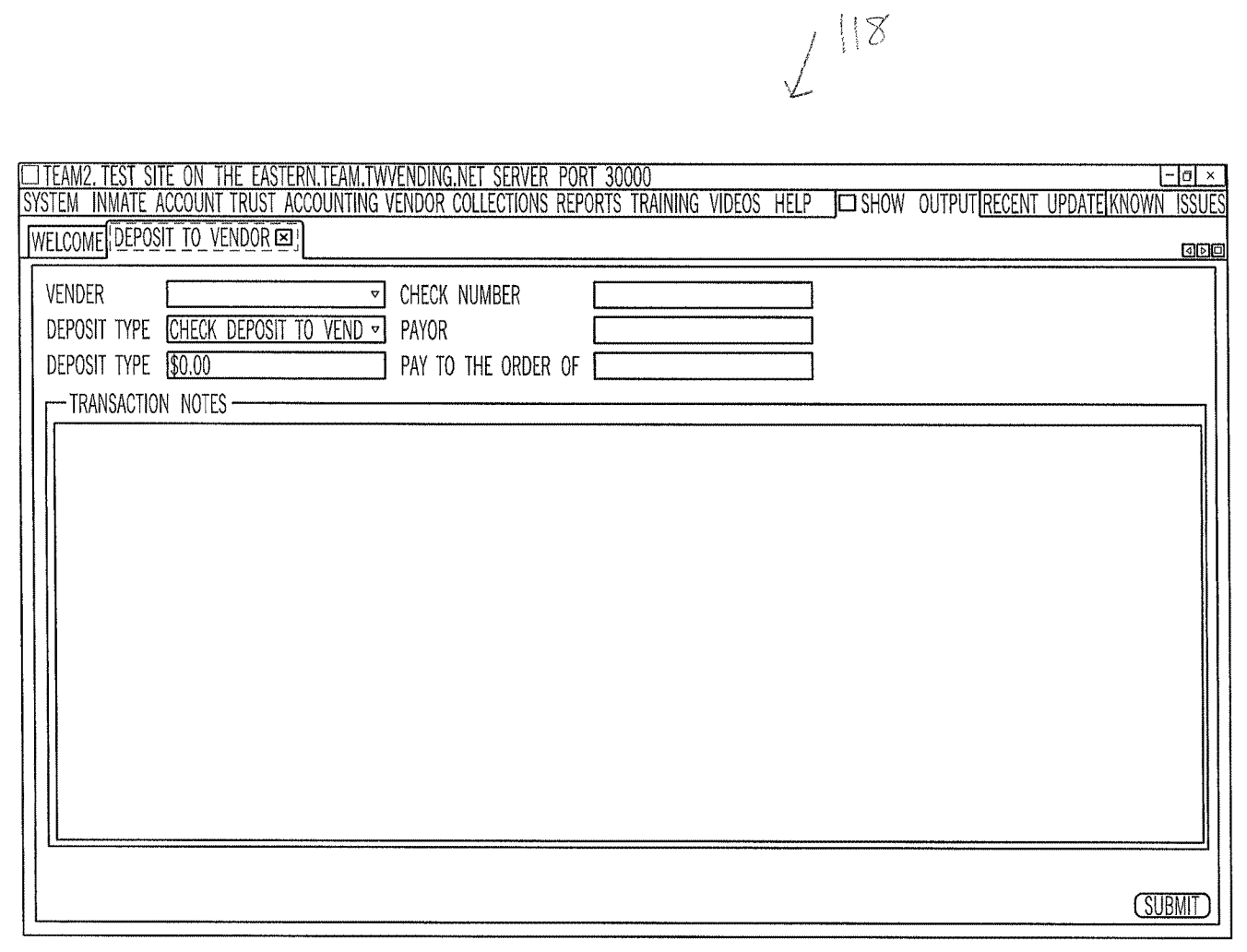

FIG. 32 shows a Deposit To Vendor screen.

Figure 33:
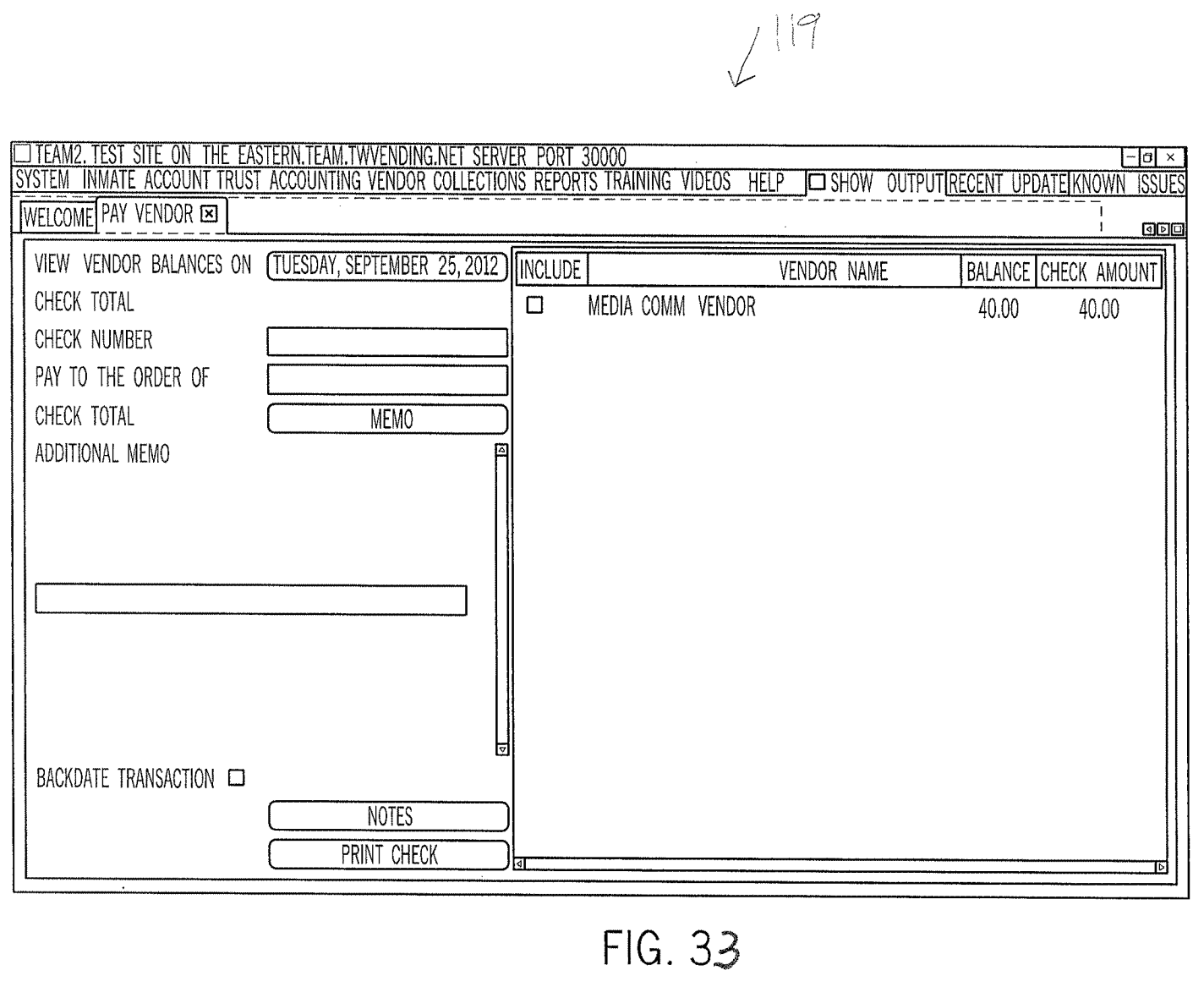

FIG. 33 shows a Pay Vendor user interface.

FIG. 34 shows a Batch Order screen.

Figure 35:
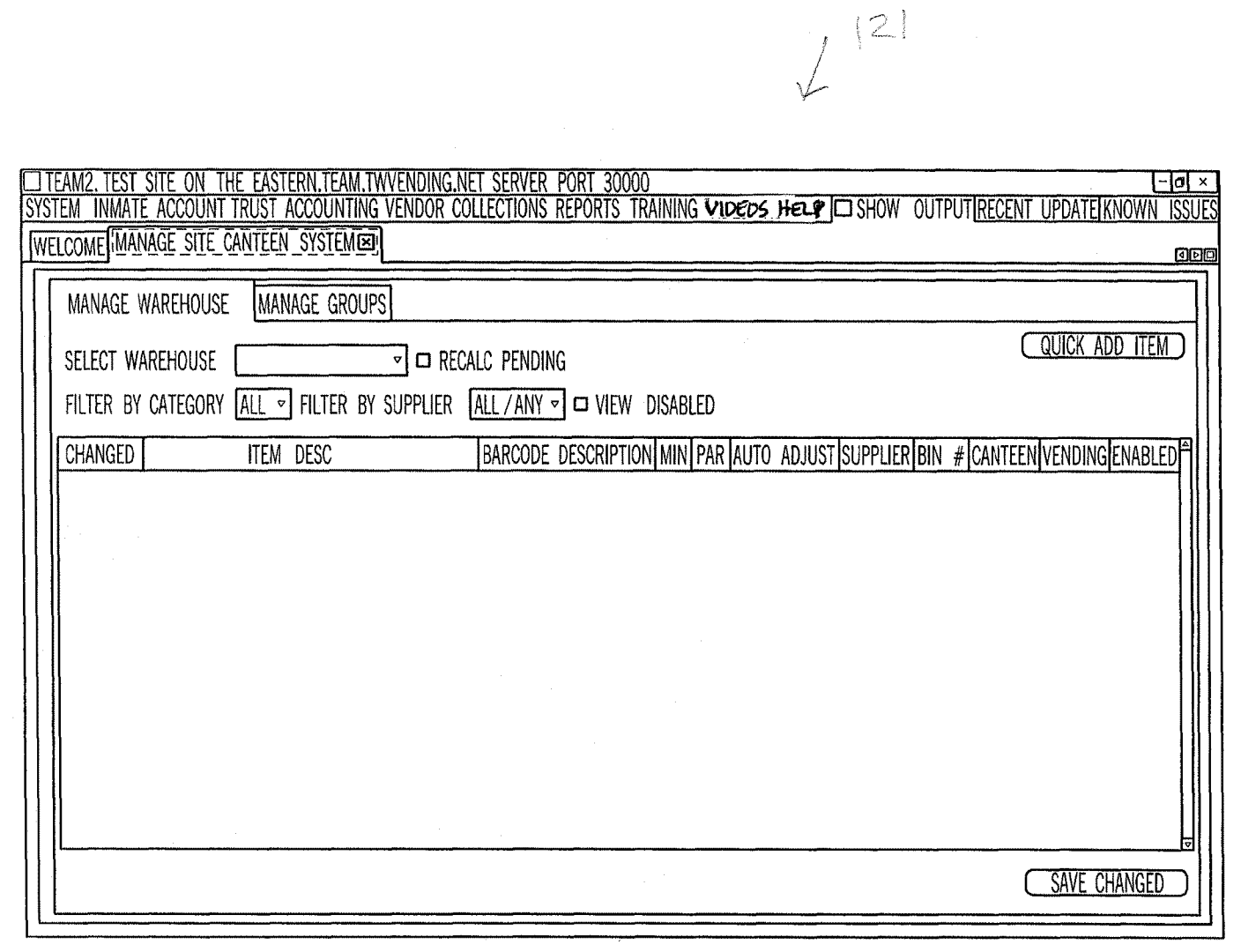

FIG. 35 shows a Manage Site Canteen System interface.

FIG. 36 shows a Manage Warehouse screen.

FIG. 37 discloses a Manage Warehouse Order System user interface.

FIGS. 38 to 50 show embodiments of user screens of the inmate management tools of the system outlined in the Chart of FIG. 10, with FIG. 38 illustrating the login screen.

FIG. 39 shows an example of the Account Information screen.

Figure 40:
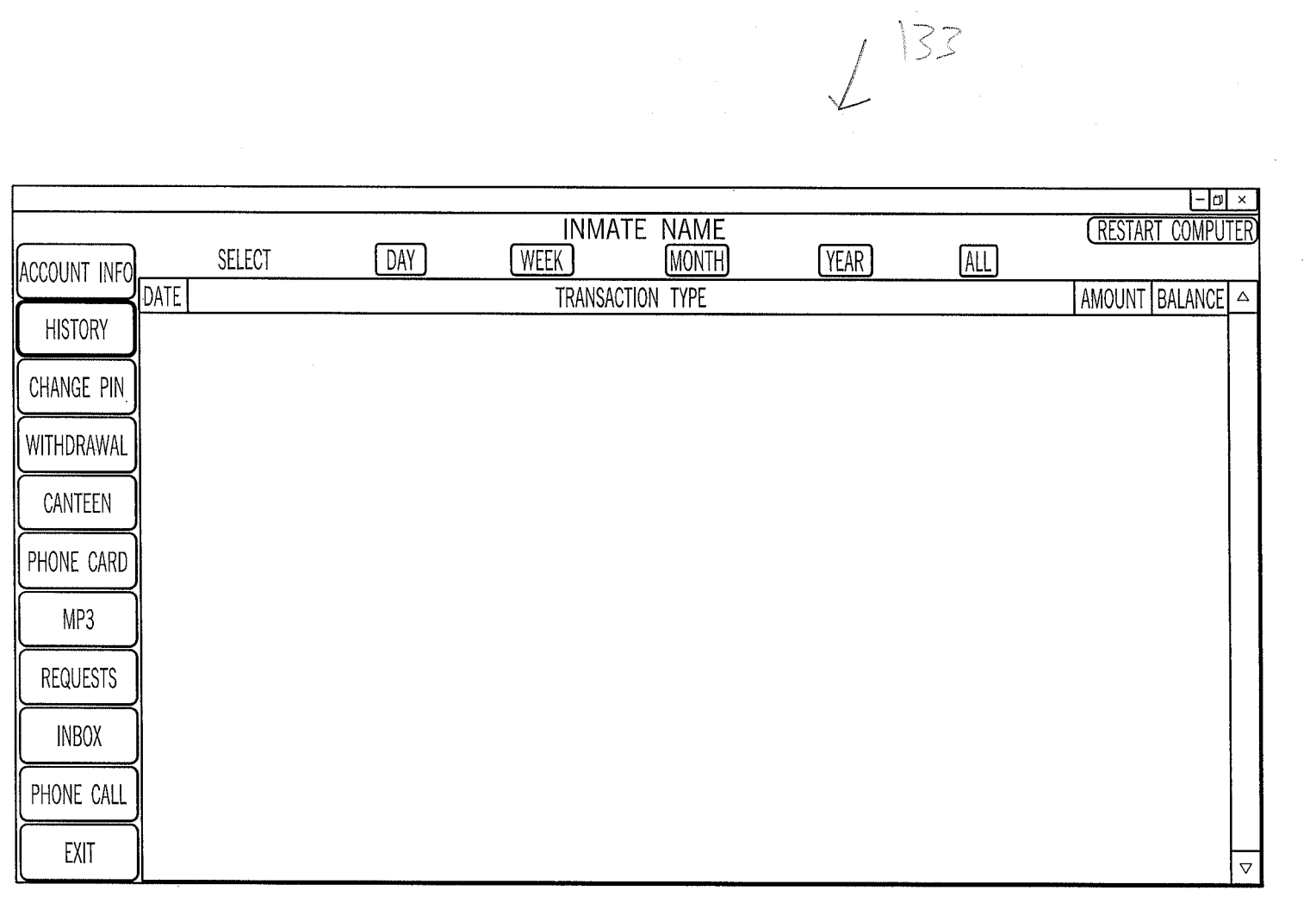

FIG. 40 shows an embodiment of the Account History screen.

FIG. 41 shows a Withdrawal Information screen.

FIG. 42 shows a Canteen Information screen with Current Order and Past Order selections.

FIG. 43 shows a further Canteen Information Screen Current Order screen.

FIG. 44 shows a Phone Card screen.

FIG. 45 shows an MP3 screen.

FIG. 46 shows a Requests screen.

FIG. 47 shows an Inbox 141 screen.

FIG. 48 shows a Phone Call screen.

FIG. 49 shows a Voice Mail screen.

FIG. 50 shows a preferred embodiment of the Phone Account screen.

FIGS. 51 to 59 show embodiments of user screens of the family/friend management tools of the system, as outlined in the Chart of FIG. 11, with FIG. 51 showing a login screen.

FIG. 52 shows an embodiment of the New Account Sign Up Screen.

FIG. 53 shows an admin screen 155a for user name and password.

FIG. 54 shows a facility selection screen 155b.

FIG. 55 shows an example interface for phone administration.

FIG. 56 shows a phone call setting screen.

FIG. 57 illustrates a call detail screen.

FIG. 58 discloses an inmate deposit user interface.

FIG. 59 shows a video visitation admin screen.

DETAILED DESCRIPTION

The invention provides systems, devices and methods for providing telecommunications, email, other messaging, financial services, vending, and commissary or canteen services for inmates of a secure facility with respect to family, friends and others.

Figure 1:
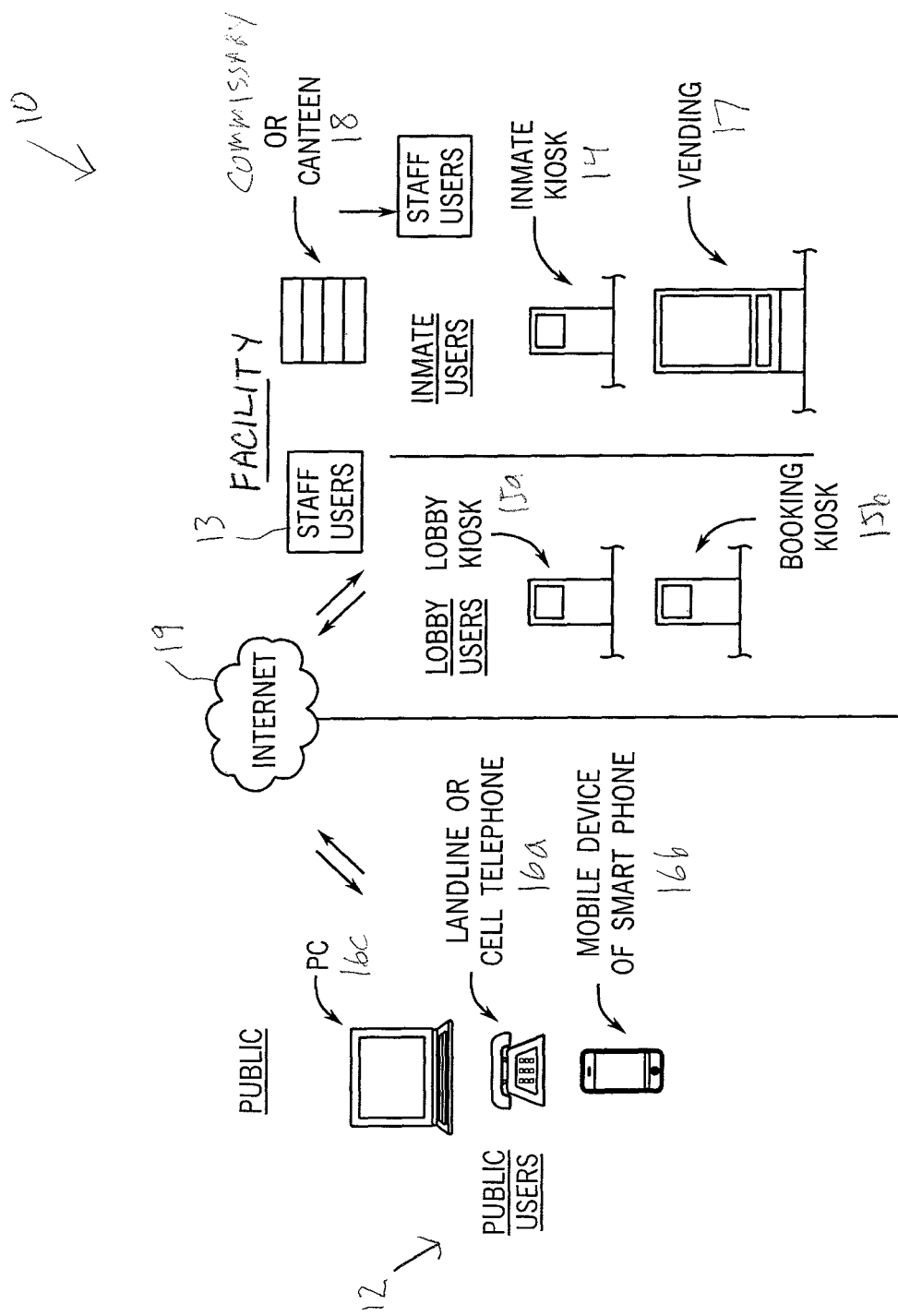
FIG. 1 is a diagram showing an embodiment of the system of the present invention for providing telecommunications, email, other messaging, financial services, vending, and commissary or canteen services for inmates of a secure facility with respect to family, friends and others.
Figure 2:
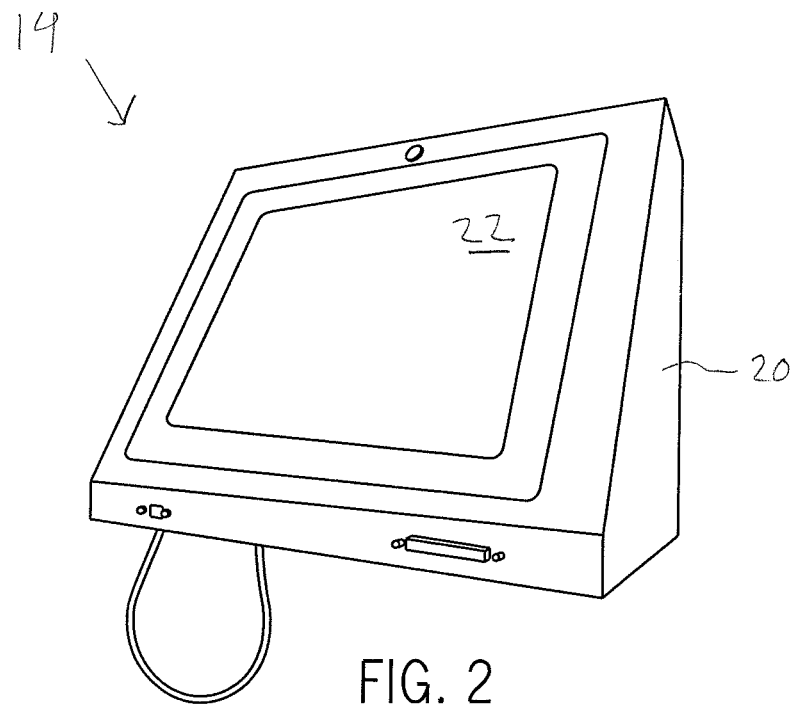
FIG. 2 is a perspective view of an embodiment of an inmate kiosk of the system of the present invention.
Figure 3:
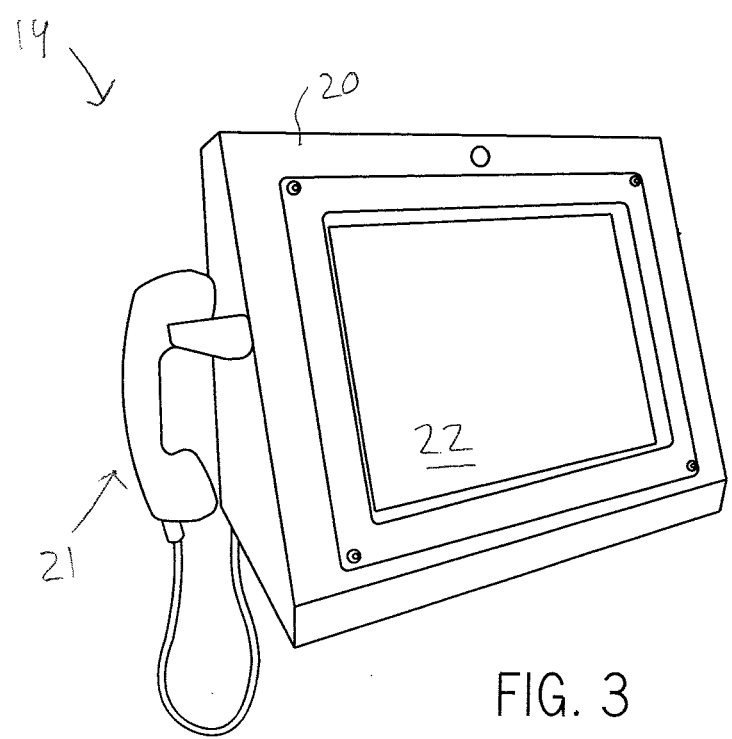
FIG. 3 is another perspective view of the kiosk.

FIG. 1 shows an embodiment of the system 10 of the invention for providing communications, financial transactions and delivery of goods and services between an inmate 11 and family member 12 at the inmate facility (such as the booking area or the lobby of the jail) or remote from the facility (such as a home or work location), and which can be monitored and controlled by a facility (jail) administrator(s) 13. The system 10 provides telecommunications (voice, text, email, and in some cases audiovisual) between a person (for example an inmate) inside a closed facility (for example a jail, work house, detention center, prison or the like) with one or more persons (for example family, spouse, children, friends or the like) outside the facility (for example in the lobby of the facility, booking station of the facility, or completely outside the facility such as home, work or public place either in the community of the facility or even outside the city, state or country of the facility. The inmate uses a kiosk 14, an example embodiment of which is shown in FIGS. 2 and 3 (including a housing 20, a receiver/transmitter handset 21, a touch screen user interface 22, control and communications circuitry, and a power supply), inside the secure section of the secure facility to send and receive telecommunications. The other person receiving or sending communications may use a kiosk 15a or b inside the facility, but outside the secure section thereof (i.e. a lobby or booking kiosk 17a/b), or a land line type or cell type telephone 16a (POTS) for voice or SMS text, a smart mobile phone 16b for voice, text, email or AV, or a PC 16c for email or AV. The system 10 also provides means for family or friends to electronically send or deposit funds or credits to the inmate that may then be used by the inmate to purchase or acquire telecommunication services of the system, vending of drinks, candy, snacks, personal items, or the like by way of one or more vending machines 17 inside the secure section of the facility or commissary 18 (aka "canteen") items such as clothing, blankets and other larger personal items delivered by facility staff or administration, via so called "brown-bag" services. The system further provides a means for the facility staff or administration to monitor, record, and document communications and transactions between the inmate and his or her family, friends or others. The facility staff can safely and securely monitor communications for prohibited, illegal or unsafe activity, limit inmate access based on normal rules, funds or credit availability, or rule violations, and can suspend inmate accounts when warranted or necessary.

A preferred embodiment of the system 10 of the invention uses VoIP to communicatively connect the Kiosks 14 and 15, staff hardware and users of PCs 16c, land line telephones 16a and mobile phones and other mobile devices such as smart phones 16b. VoIP stands for Voice over IP or voice over Internet Protocol. It encompasses the communication protocols, technologies, methodologies, and transmission techniques involved in the delivery of voice communications and multimedia sessions over Internet Protocol (IP) networks, such as the Internet 19. Internet telephony refers to communications services—voice, SMS, and/or voice-messaging applications—that are transported via the Internet, rather than the public switched telephone network (PSTN). The steps involved in originating an outgoing VoIP telephone call are signaling and media channel setup, digitization of the analog voice signal, encoding, packetization, and transmission as Internet Protocol (IP) packets over a packet-switched network. On the receiving or incoming side, similar steps (usually in the reverse order) such as reception of the IP packets, decoding of the packets and digital-to-analog conversion reproduce the original voice stream. Even though IP telephony and VoIP are used interchangeably, IP telephony refers to all use of IP protocols for voice communication by digital telephony systems, while VoIP is one technology used by IP telephony to transport phone calls. VoIP systems employ session control protocols to control the set-up and tear-down of calls as well as audio codecs which encode speech allowing transmission over an IP network as digital audio via an audio stream. The choice of codec varies between different implementations of VoIP depending on application requirements and network bandwidth; some implementations rely on narrowband and compressed speech, while others support high fidelity stereo codecs. Some popular codecs include u-law and a-law versions of G.711, G.722 which is a high-fidelity codec marketed as HD Voice by Polycom, a popular open source voice codec known as iLBC, a codec that only uses 8 Kbit/s each way called G.729, and many others. VoIP is available on many smart phones and Internet devices so that users of portable devices that are not phones, may place calls or send SMS text messages over 3G or Wi-Fi.

Figure 4:
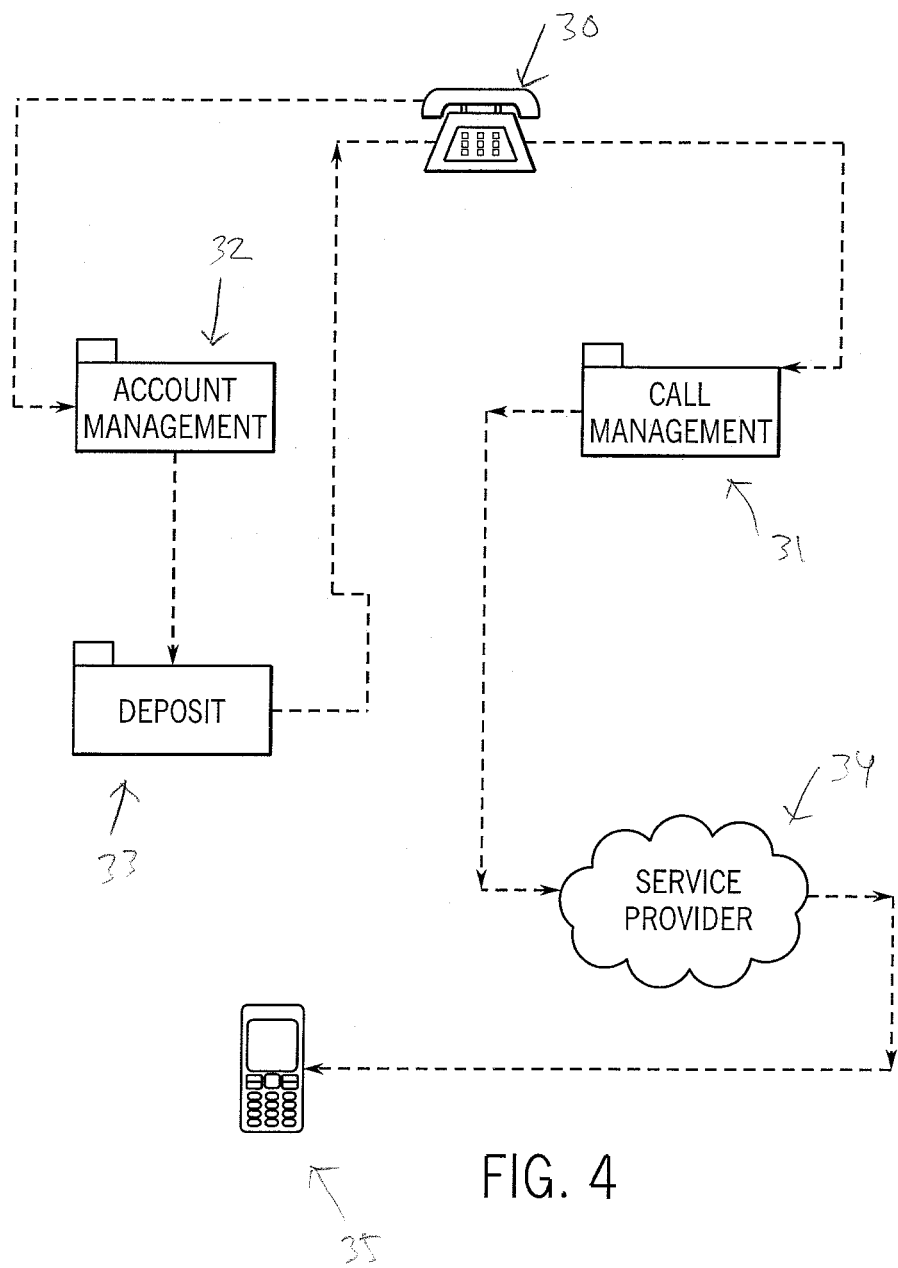
FIG. 4 is diagram of a prior art telecommunications system.

FIG. 4 illustrates a traditional process for using telephones inside a jail or other secure facility to contact persons outside the jail. In the prior art, the inmate picks up a telephone 30 and is automatically connected to a switch, which prompts the inmate with call 31 or account management 32 options. To manage their account, the switch checks into the inmate's balance and prompts the inmate with deposit 33 options. Funds may be deposited into the inmates' account assuming all validation checks pass. To manage a call, the switch check the inmate's balance and then prompts the inmate for the number to be called and checks for various rule settings. The rule settings may include blacklistings, email notifications, section/station settings, attorney call status, and deferred payment call status. The call is placed with a telecommunications service provider 34 via Session Initiation Protocol (SIP). The telephone called is answered by a user 35 (for example the inmate's friend, family member or attorney) outside the jail or other secure facility, or if not answered it routes to voicemail. A non-blocking call identifying prompt is played in the background while the call continues. Either the calling device or the telephony switch will charge the inmate account for the call.

Figure 5:
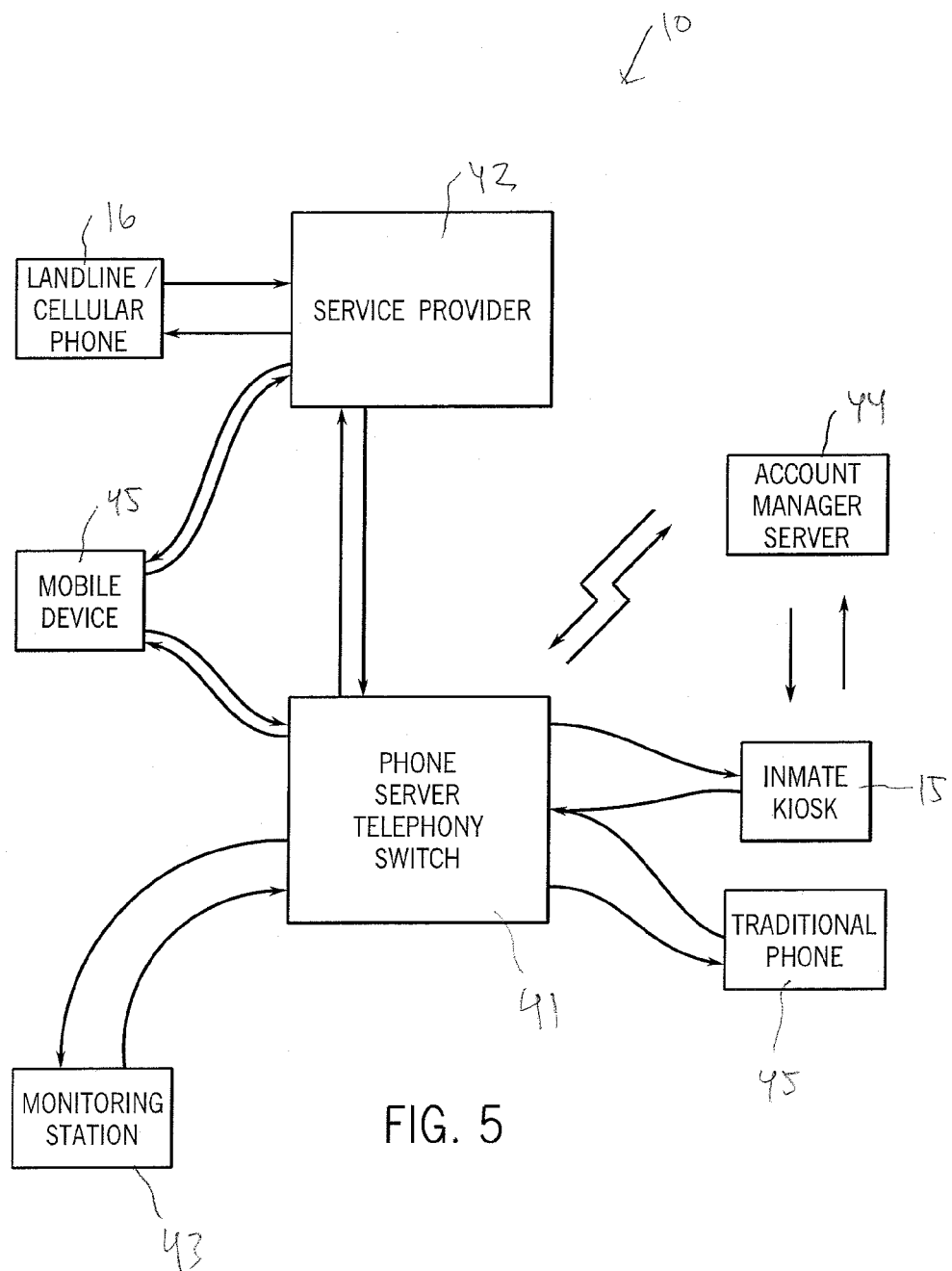
FIG. 5 is a more detailed diagram of the system of the invention, including the interconnection of a phone server and an account manager server, and a monitoring station of the system.

Referring to FIG. 5, an embodiment of the phone system 10 of the invention comprises a Phone Server 41, a telephony switch which is connected to a Service Provider 42. The Service Provider 42 is any provider with Session Initiated Protocol (SIP) capability. The Phone Server 41 negotiates SIP communication between various SIP endpoints. It handles call permissions as well as charging, recording and monitoring. The Phone Server 41 is communicatively connected to a Monitoring Station 43 which requests recorded and live streams from the Phone Server 41. Based on a request, the monitoring station 43 has the ability to pause, fast forward and rewind the recorded stream as well as to stop a live call in progress. It also enables calling rules. The Phone Server 41 is also communicatively connected to an Account Manager Server 44. The account manager 44 provides a means for the telephones to know the details of the caller and the person or entity being called. A most preferred example of the account manager server 44 is a Team Server provided by Team Software of Hudson, Wis. USA. However. The account manager server 44 can be any server that handles TCP/IP protocols over any IP network. The Phone Server 41 and Account Manager Server 44 are communicatively connected to the Inmate Kiosk(s) 15 or other devices inside the jail or other facility. Such other devices include traditional inmate telephones 19a and mobile or hand held devices inside the secure facility or jail. The Phone Server 41 is also communicatively connected to the telephones and devices 16a-c outside the facility.

Figure 6:
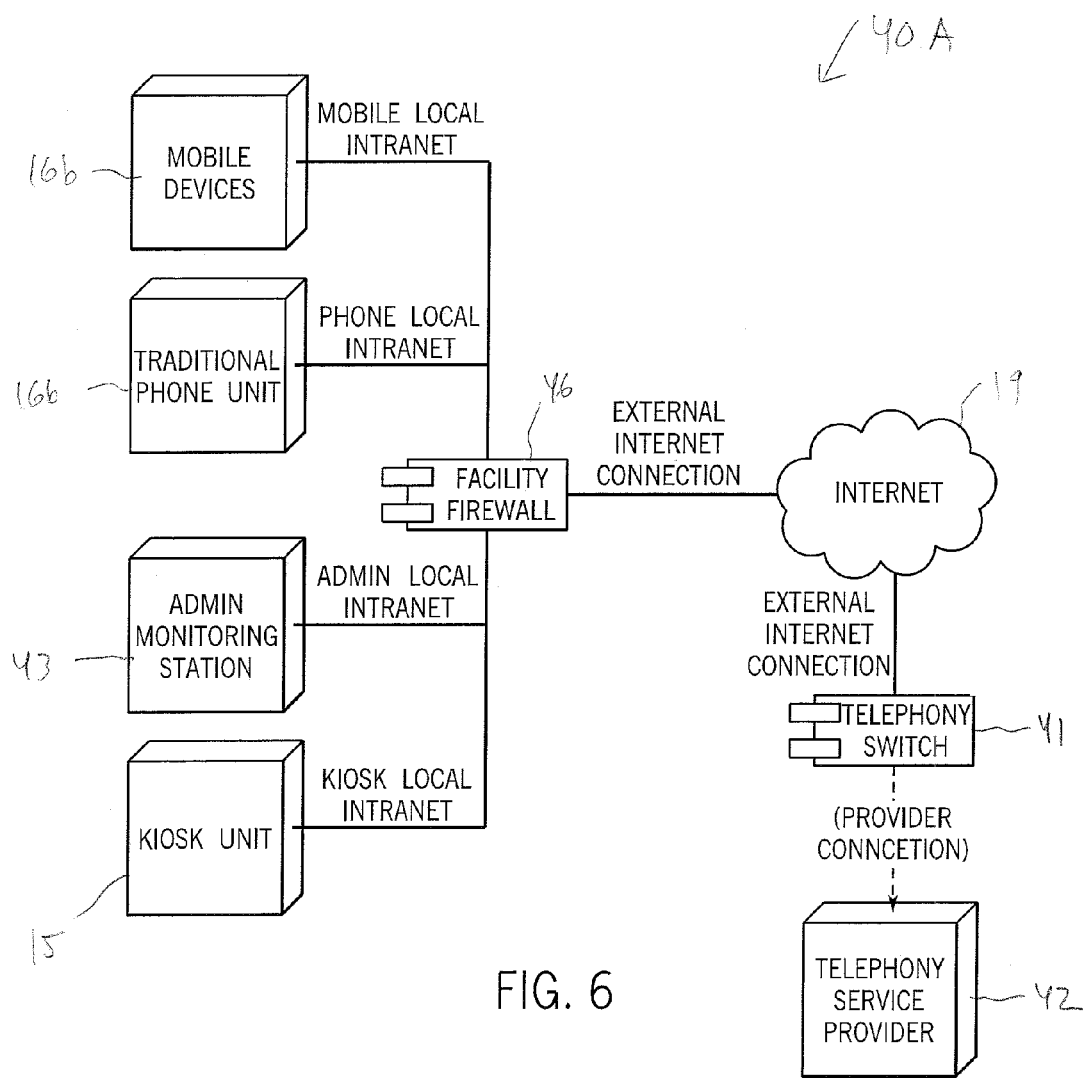
FIG. 6 a diagram showing an embodiment of the communicative interconnection of the phone server with elements of the system which are disposed inside the secure facility.

FIG. 6 shows an embodiment of the communications connections 40a between the phone server 41 and certain elements of the system 10 located inside the secure facility (the kiosk(s) 15, traditional inmate phone(s) 45, other mobile devices 16 in the facility, and the admin monitoring station 44) via the Internet 19 and through the facility firewall 46.

Figure 7:
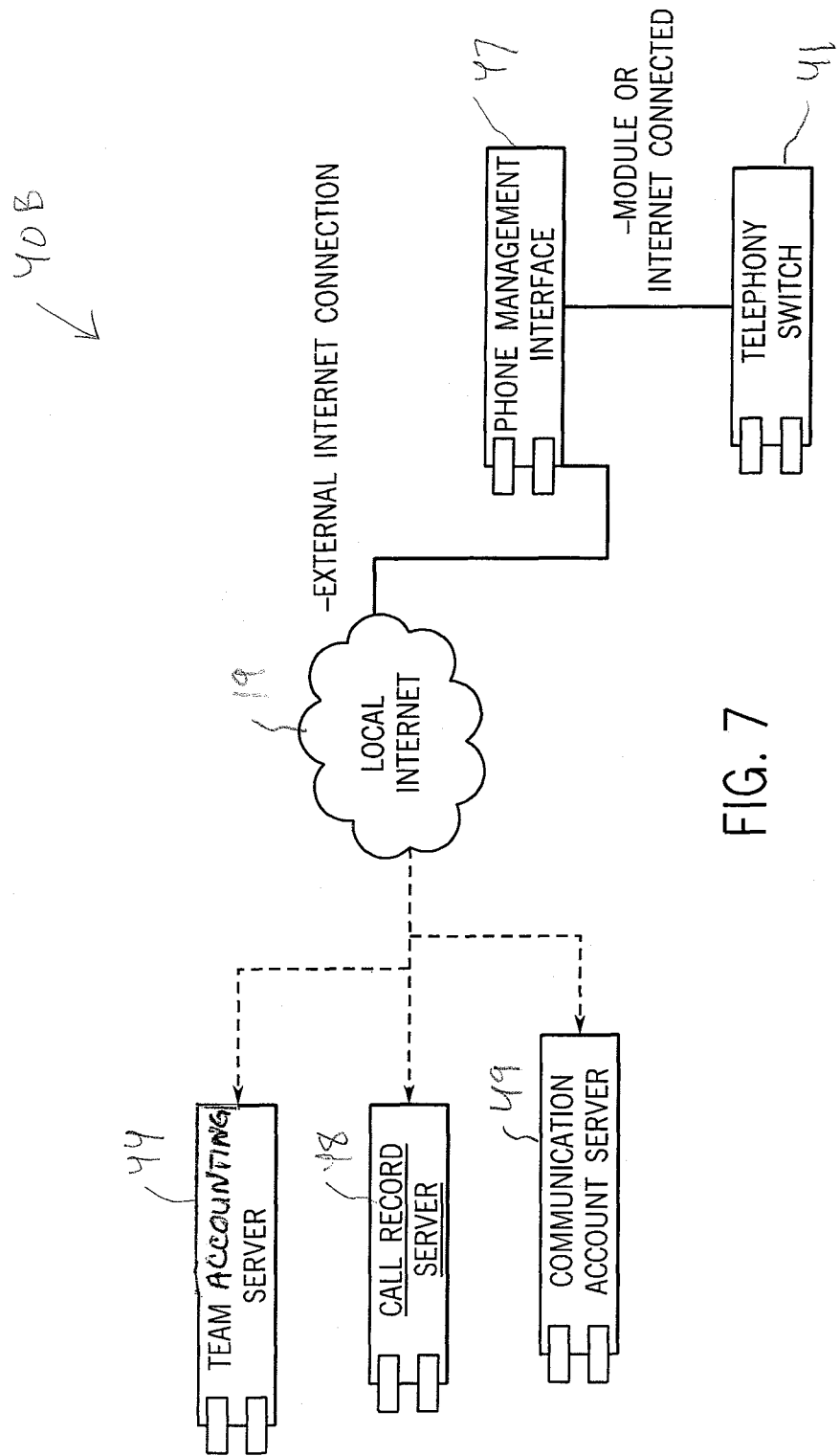
FIG. 7 is a diagram showing an embodiment of the communicative interconnections of the phone server with elements of the system which are preferably disposed outside the secure facility.

FIG. 7 shows an embodiment of the communication connections 40b between the phone server 41 and other servers and elements of the system 10 which are disposed outside the secure facility. The phone server 41 is preferably a software element which makes the calls. A phone management interface 47 is an additional layer of software that controls the phone server 41. The phone management interface 47 processes information such as outgoing and incoming rules, the inmate rate, and the like. Connected through the Internet 19 are the account manager server 44, the call record server 48 (a hardware element which actually stores recorded calls), and a communication account server 49. The communication account server 49 is preferably software which debits and credits accounts at the manager of the system 10, and other similar business functions. The manager of the system 10 is preferably an independent third party business, such as Applicant's assignee. However, it is within the purview of the invention that the system 10 manager may be the jail or secure facility itself, or some other governmental, quasi-governmental or non-profit entity.

Figure 8A:
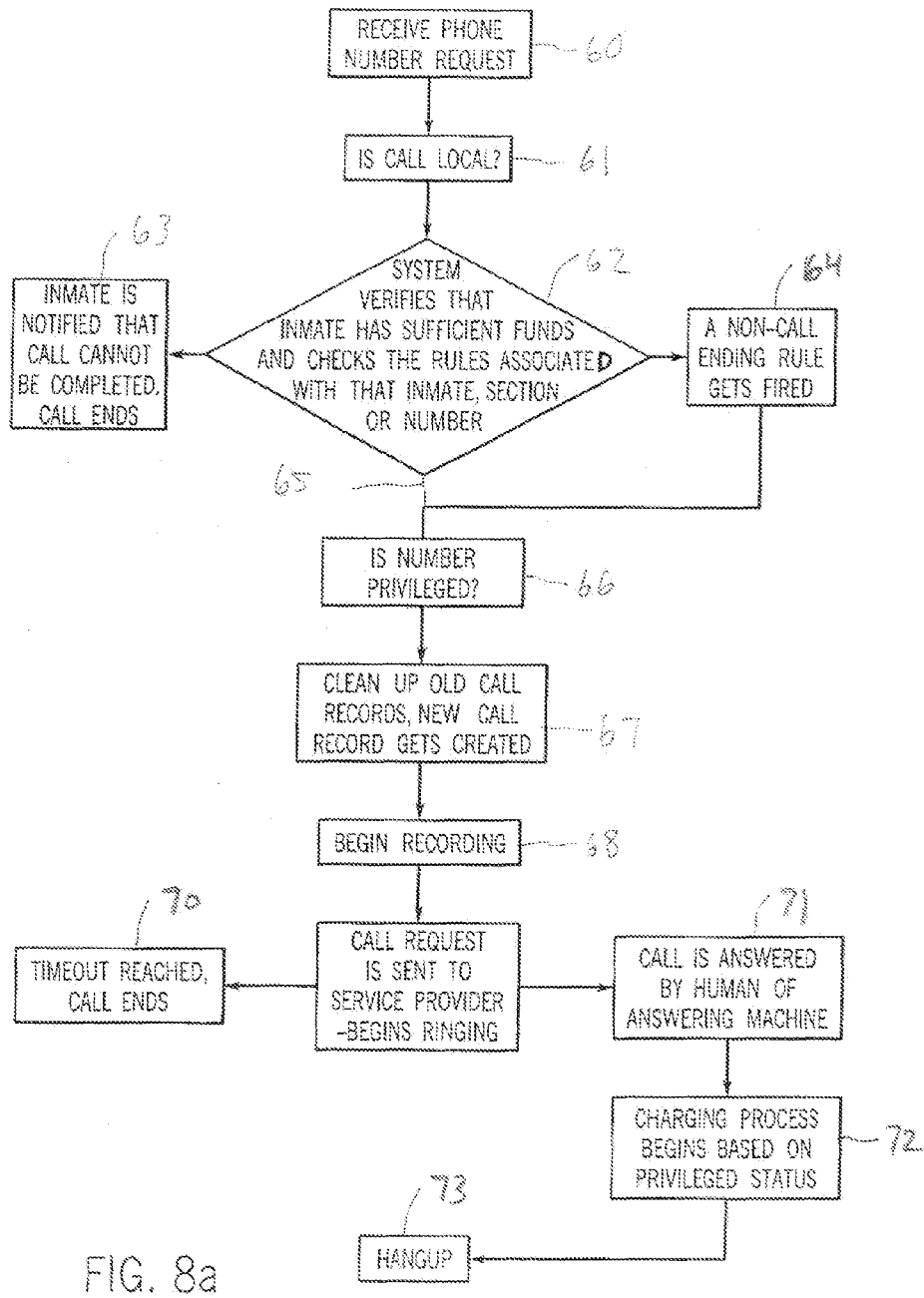
FIG. 8a is a flowchart of an embodiment of an outgoing call process of the invention.

FIG. 8a is a flow chart showing an embodiment of the process of making an outgoing call from a jail according to the invention. The outgoing call process of the invention is preferably implemented by the system 10 of the invention. The first step of the process involves receiving 60 a request for an outside phone number of a family member, friend or other call recipient, and then determine 61 whether the call is local or long distance. Next, the system verifies 62 that the inmate has sufficient funds or credit, and checks associated rules for that inmate account. The call is either prohibited 63 (with notice to the inmate), a non-call ending rule is noted 64, or the system proceeds 65 to determination 66 whether the call number is privileged as for example in the case of an attorney telephone number. Proceeding with the call, next records are logged and created 67, recording is initiated 68 and the call is sent 69 to the service provider to ring the call recipient. If a timeout timer period is reached 70 the call ends. If the call is answered 71 within the allotted time, the call proceeds. A charging process 72 begins in some cases. The call proceeds until termination or hang up 73.

Figure 8B:
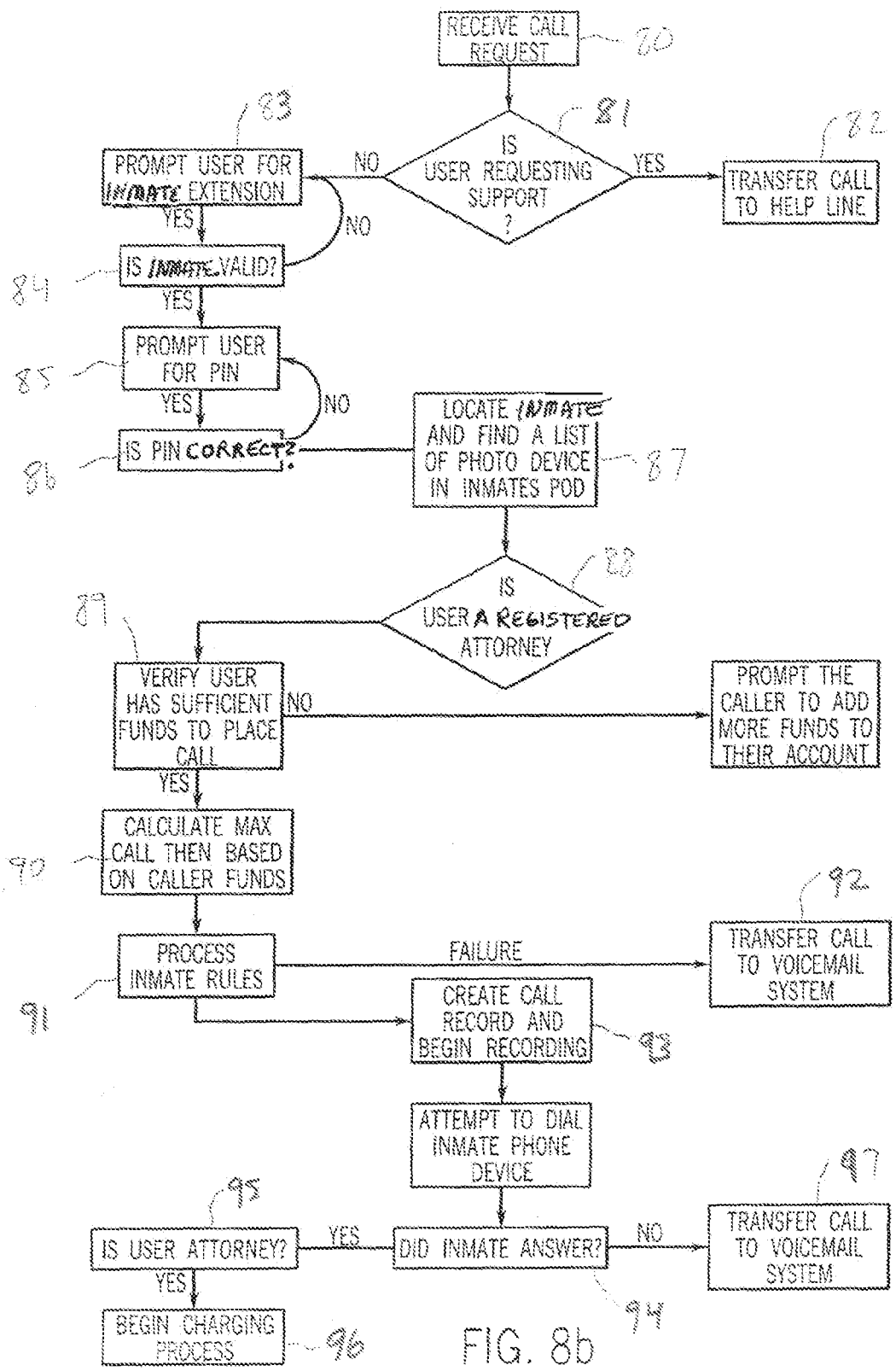
FIG. 8b is a flowchart of an embodiment of an incoming call process of the invention.

Significantly, the system of the invention provides a means of receiving 80 an incoming call to the inmate in the facility from a person outside. Referring to FIG. 8b, a preferred embodiment of an incoming call process of the invention involves first receiving a call request and then determining 81 whether the outside caller is requesting support. If so, then the call is transferred 82 to a help line. If not, the user is prompted 83 to dial or otherwise input an extension for the inmate. Users may first obtain an inmate extension as well as a PIN number by utilizing the inmate-cantee.com process shown in FIGS. 51-59. Next, the system determines 84 if the extension is valid. If not, then the caller has an opportunity to enter another extension by another prompt 85. If valid, the system inquires of the PIN and checks 86 whether it is valid. If the PIN is not entered correctly, the user again has an opportunity to correct. If the PIN is correct, the next step 87 is to find the Inmate's location and a list of phone devices in the inmate's POD (jail location). Phone devices may include, but are not limited to stand alone Kiosks, traditional hand held telephone devices and the like. The system then determines 88 whether the caller is a registered attorney. If the user is a registered attorney (again signed up at the inmatecanteen.com system of FIGS. 51-59), the conversation is private and a reduced rate may apply. If not, the system verifies 89 that the user has sufficient funds to place the call (funds are deposited via inmatecanteen.com). Maximum call time is calculated 90 based on caller funds, and at a predetermined time, for example the 1 minute 30 second remaining mark of the call, a blocking prompt is played warning the user that they are about to runt out of call minutes. Initially or at any time later, inmate rules 91 may be processed. Such rules may include, but are not limited to inmate blacklisting, section/pod blacklisting, email call notifications, and approved calling hours. If a call or call event or time fails a rule, the call is transferred 92 to a voicemail system. If all rules or some rules are met, a call record is created 93, recording begins (unless attorney or other call), and the registered device is dialed. Recordings are processed in GSM format. Both sides of the stream are included in the recording. The next step is to wait 94 for an answer. If the inmate answers, the attorney rule is checked 95 and if positive, the charging 96 process begins. If the inmate does not answer, the call may be transferred 97 to a voicemail system.

Figure 9:
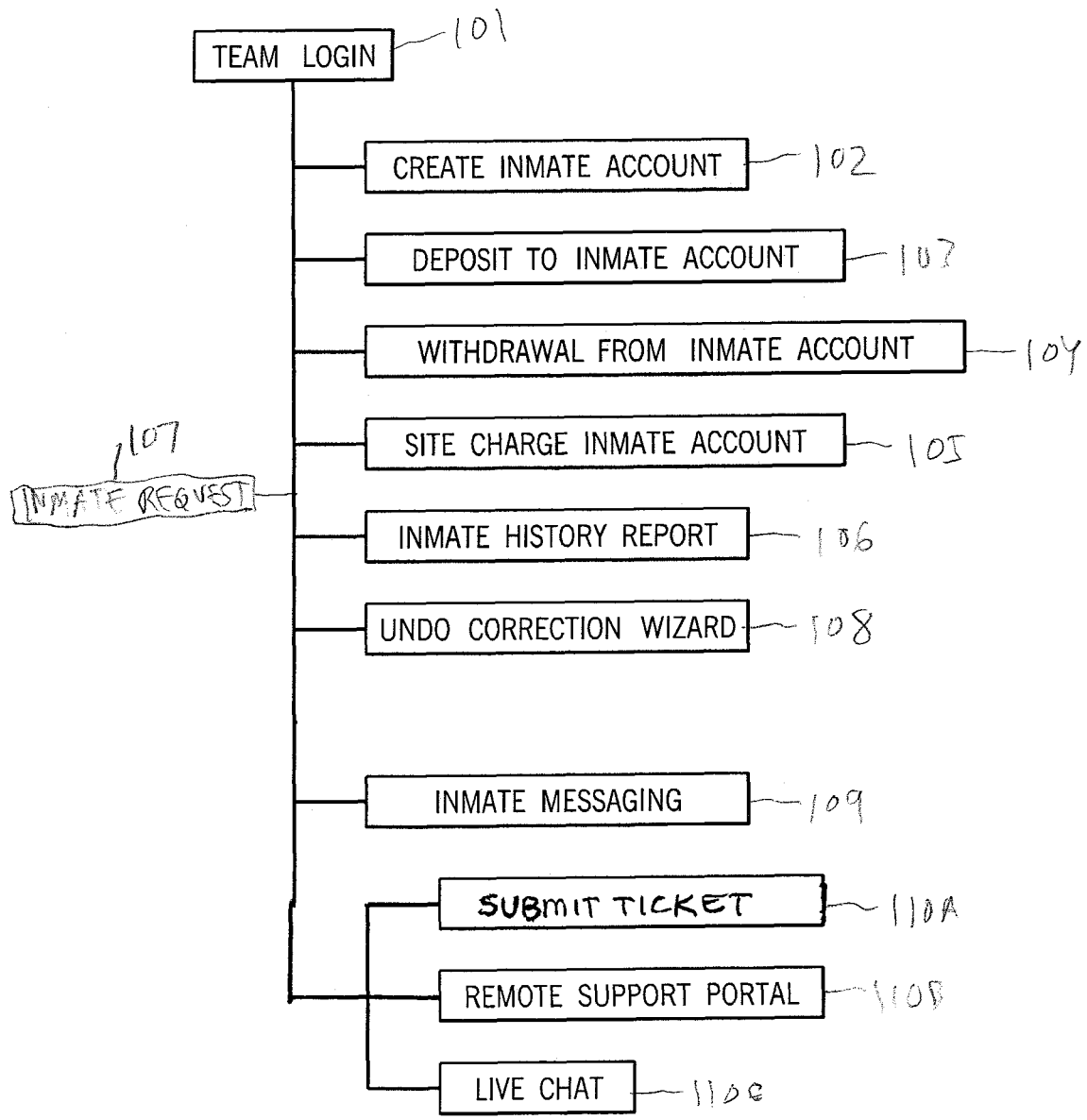
FIG. 9 is a chart of an embodiment of the user screens of the administrator controls and tools of the system.
Figure 12:
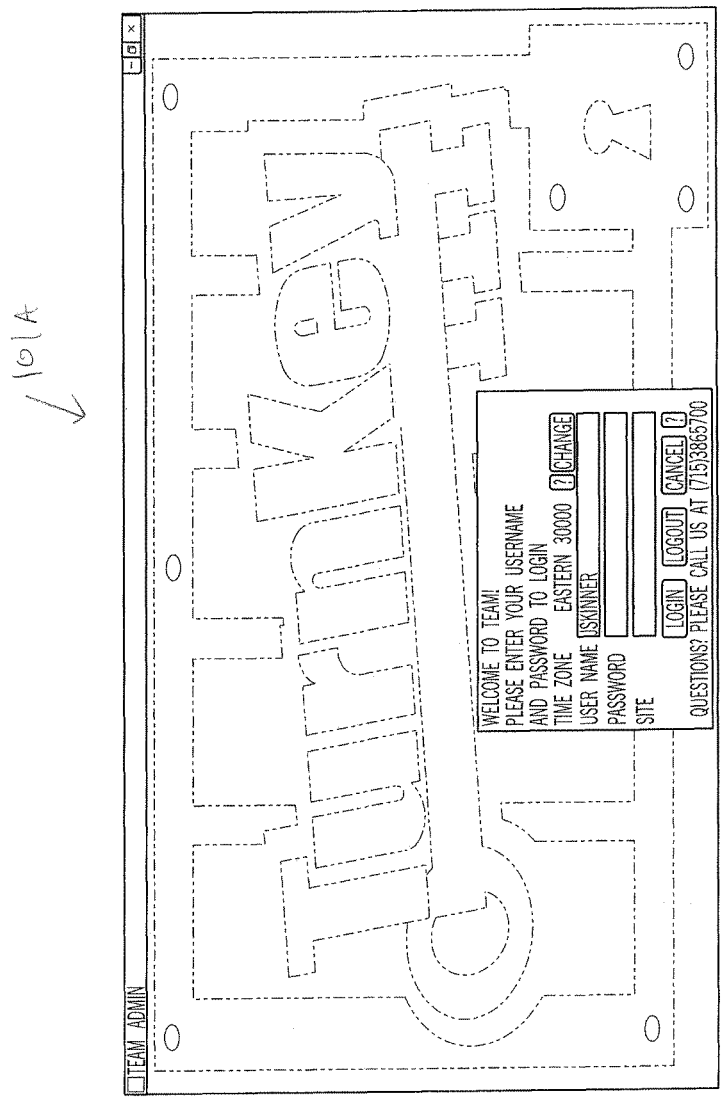
Figure 13:
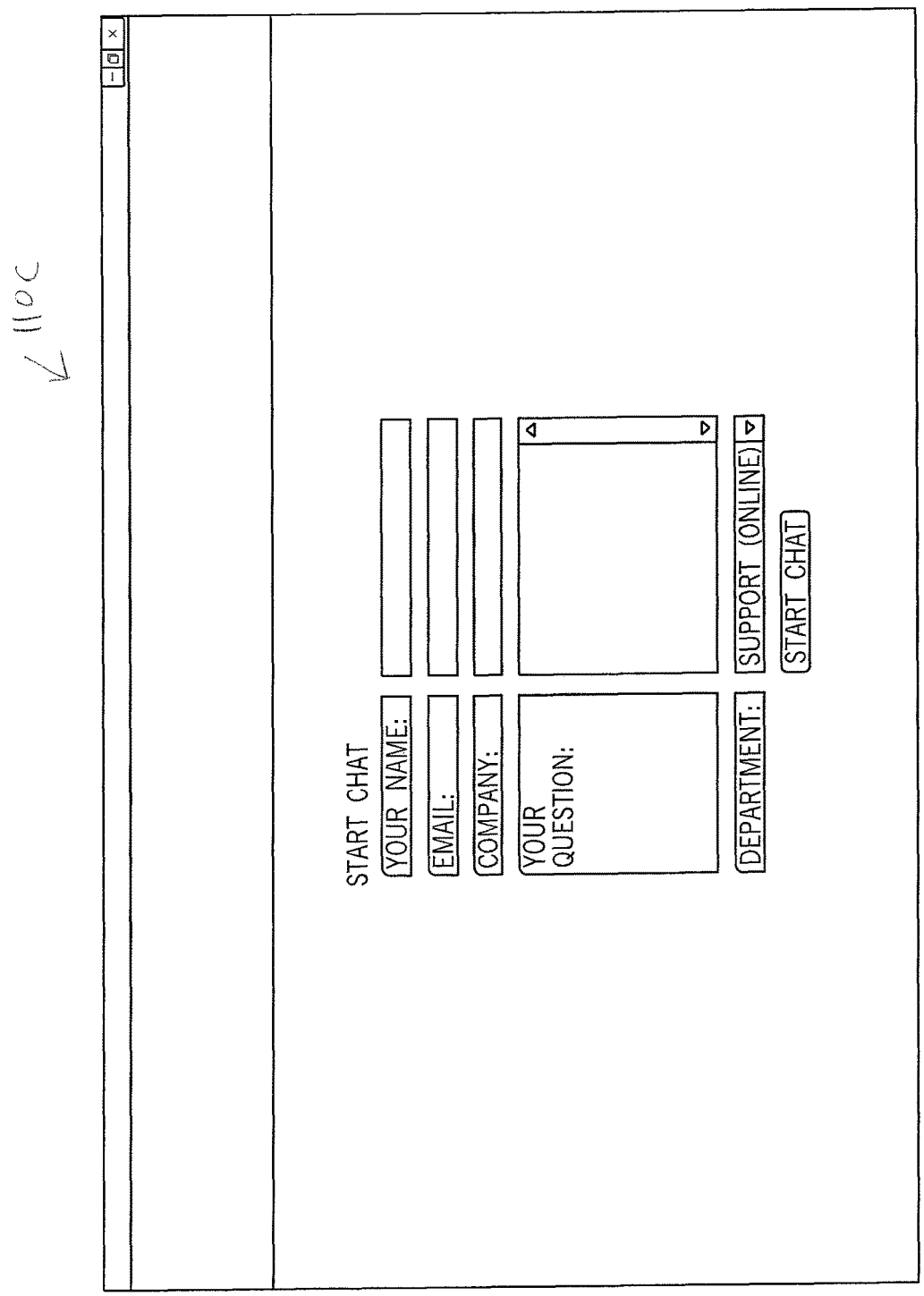
Figure 16:
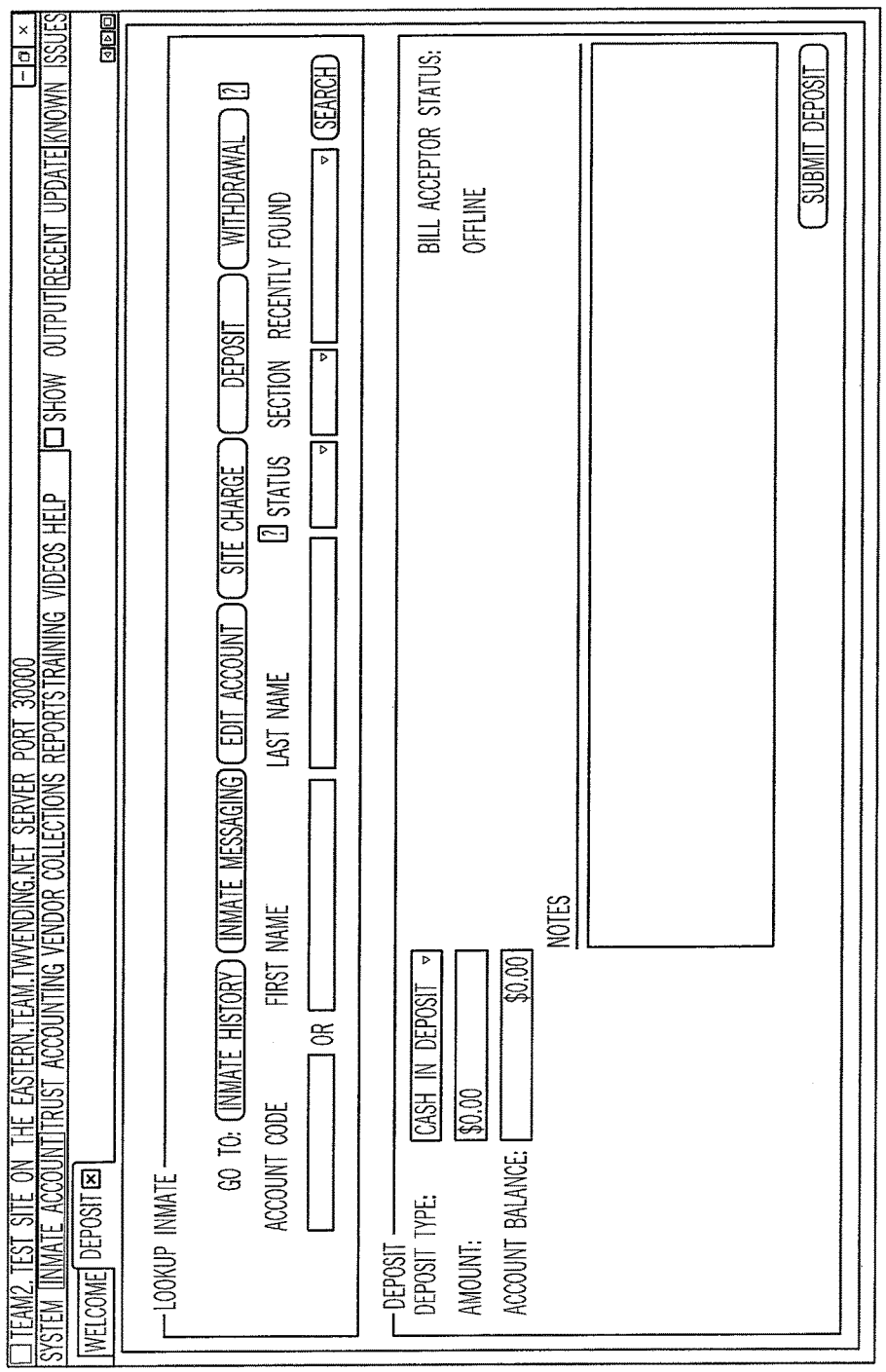
Figure 20:
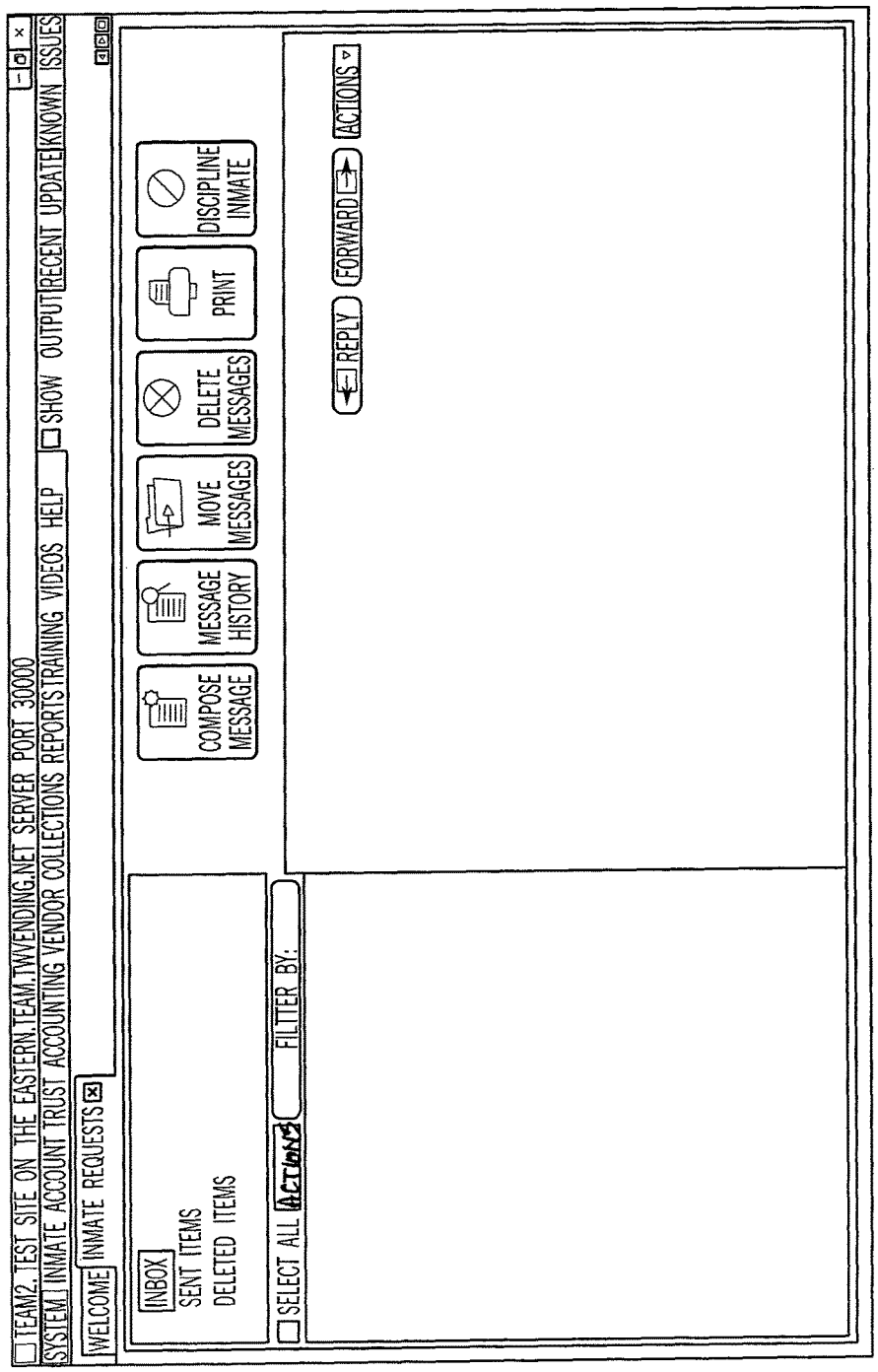
Figure 21:
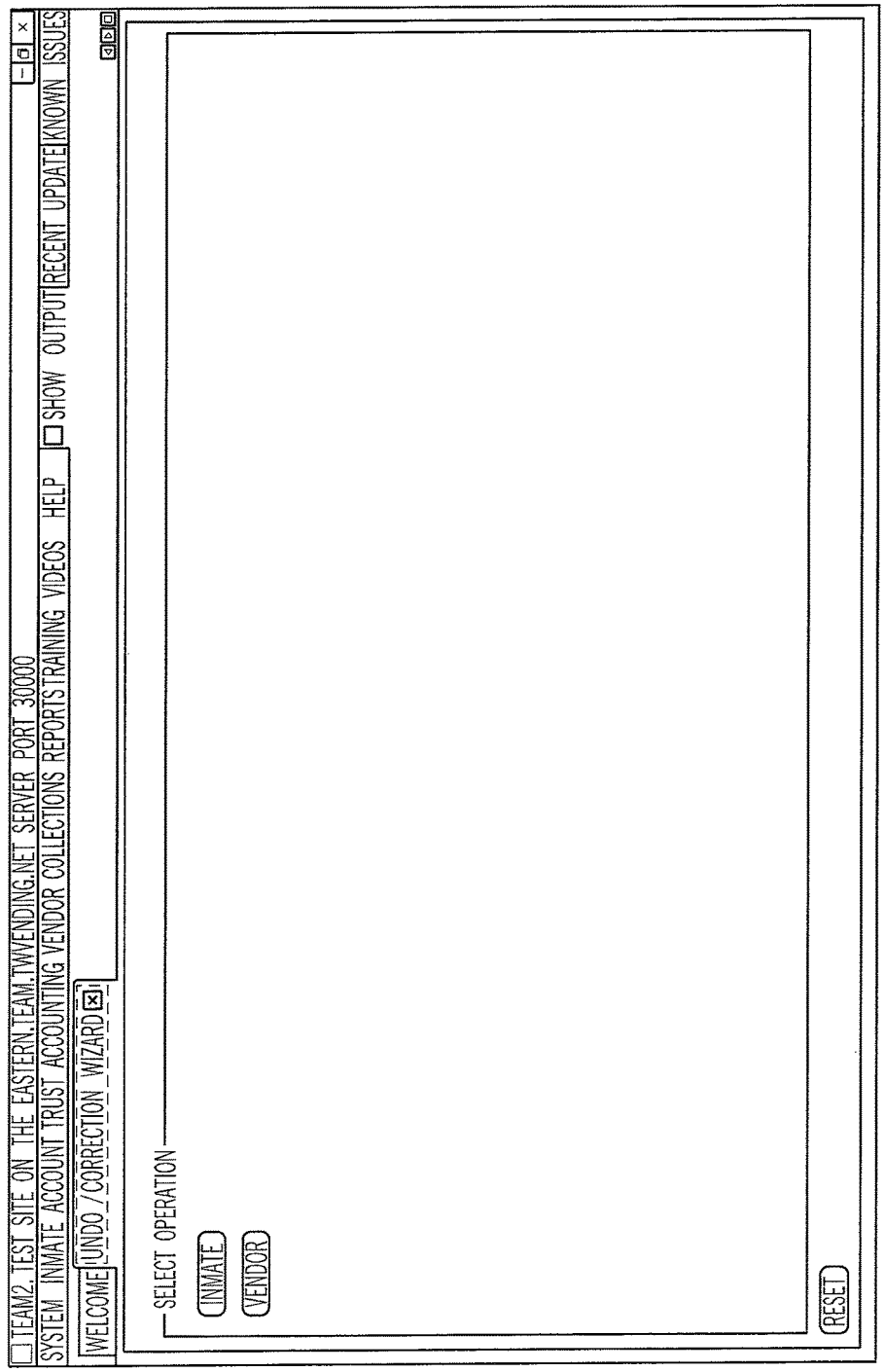
Figure 22:
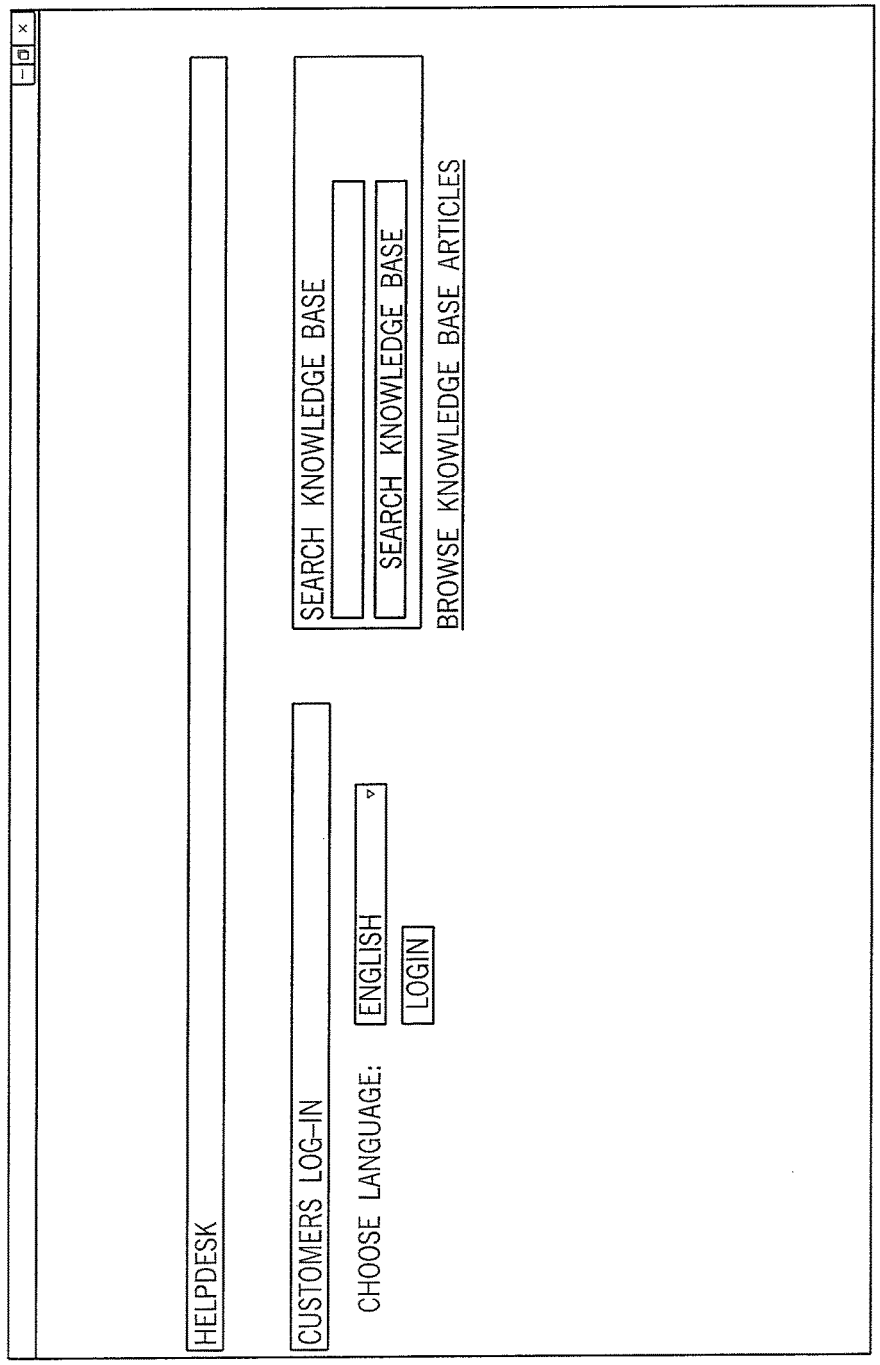

FIG. 9 is a chart of an embodiment of the hierarchy or relationship of the user screens of the administrator controls and tools 100 of the system. At the Administration Login screen 101 a username and password are provided by the user. The following admin screens are available: Create Inmate Account 102, Deposit Funds to Inmate Account 103, Withdraw Funds from Inmate Account 104, Charge (Site Charge) An Inmate's Account for money owed to a Vendor 105, Inmate History Report 106, Inmate Request Page 107, an Undo Connection Wizard 108 and an Inmate Messaging page 109. Additionally, the system provides means to submit a ticket 110A, for remote support 110B, and for live chat 110C. FIGS. 12-24 show exemplary embodiments of user interfaces for these functions. FIG. 12 illustrates a LogIn interface 101. FIG. 14 shows a Create Inmate Account 102. FIG. 16 discloses a Deposit Funds to Inmate Account screen 103. FIG. 17 illustrates a Withdraw Funds from Inmate Account screen 104. FIG. 18 shows a Charge (Site Charge) An Inmate's Account for Money Owed to a Vendor 105 screen. FIG. 19 discloses a Inmate History Report user interface 106. FIG. 20 shows a Inmate Request screen 107. Additionally, the system provides means to submit a ticket 110A, for remote support 110B, and for live chat 110C shown in FIGS. 22, 23 and 24 respectively.

Figure 25:
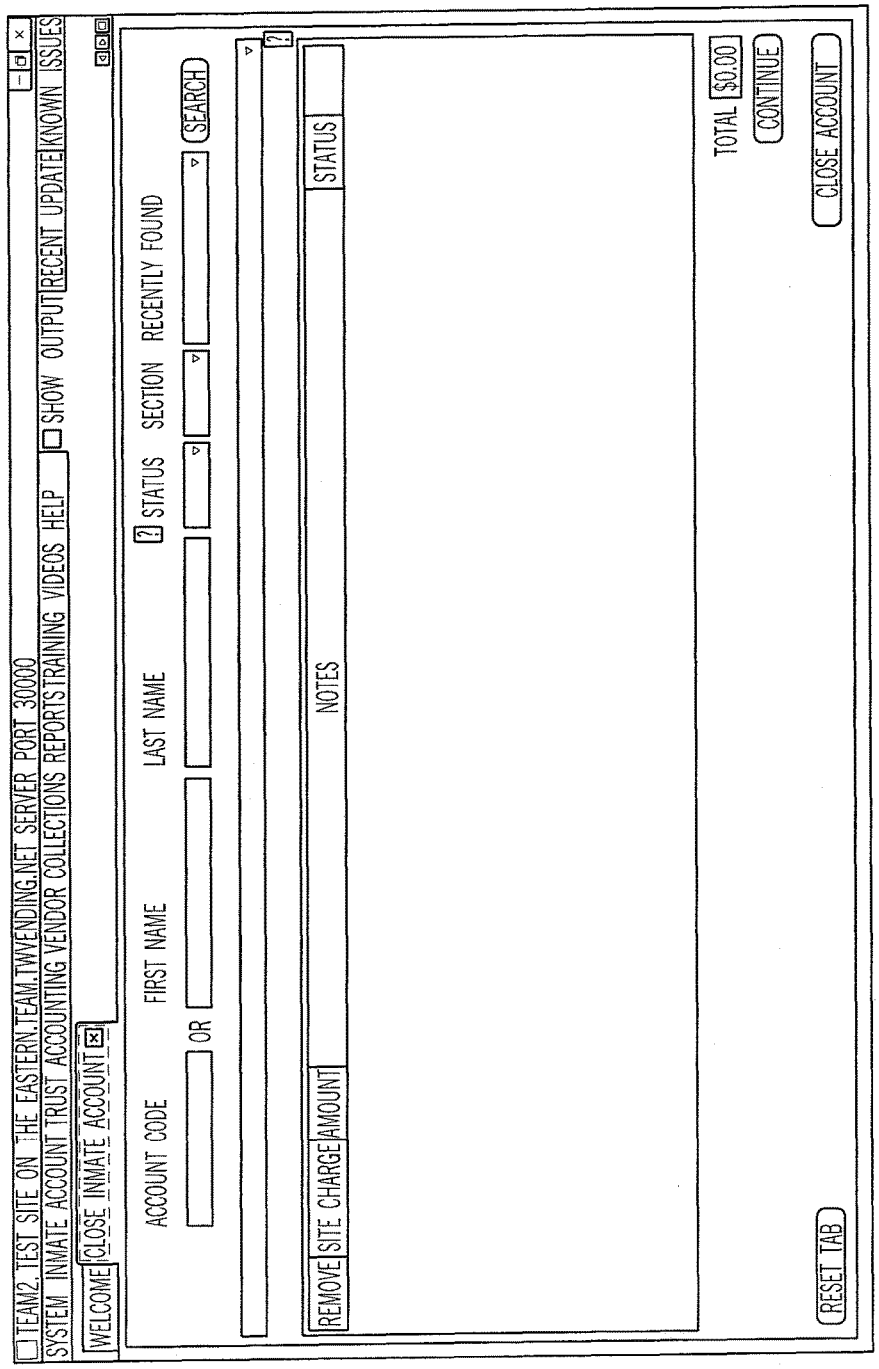
Figure 29:
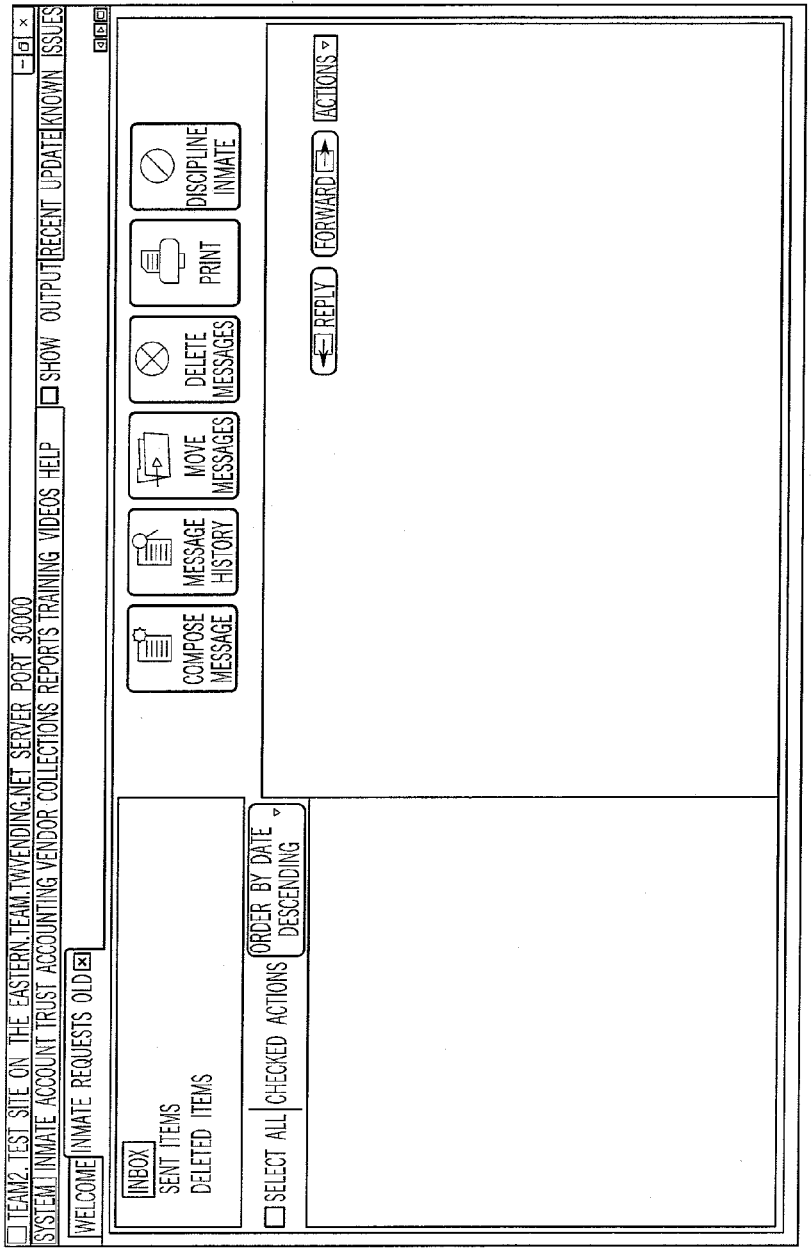
Figure 31:
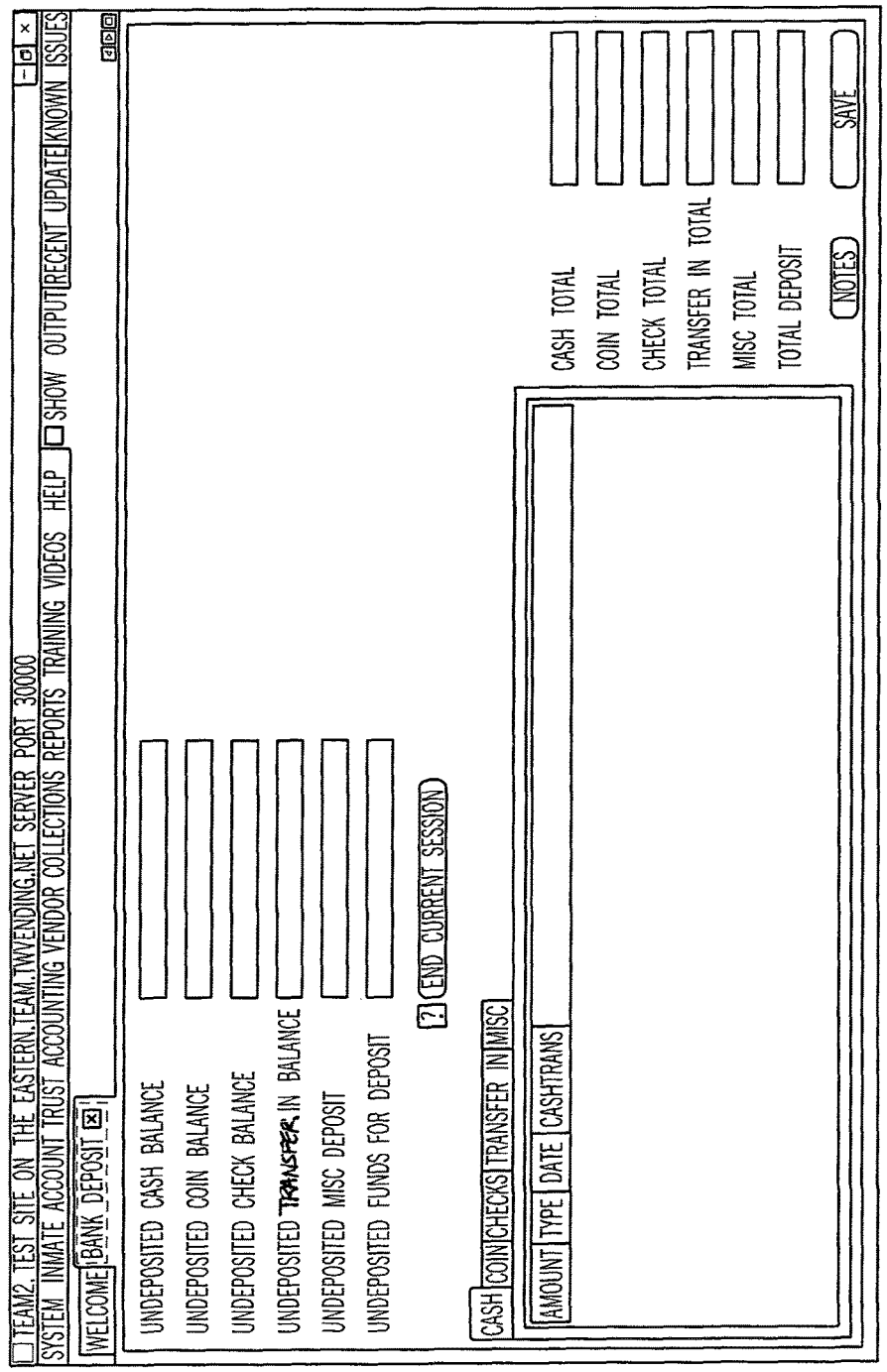
Figure 36:
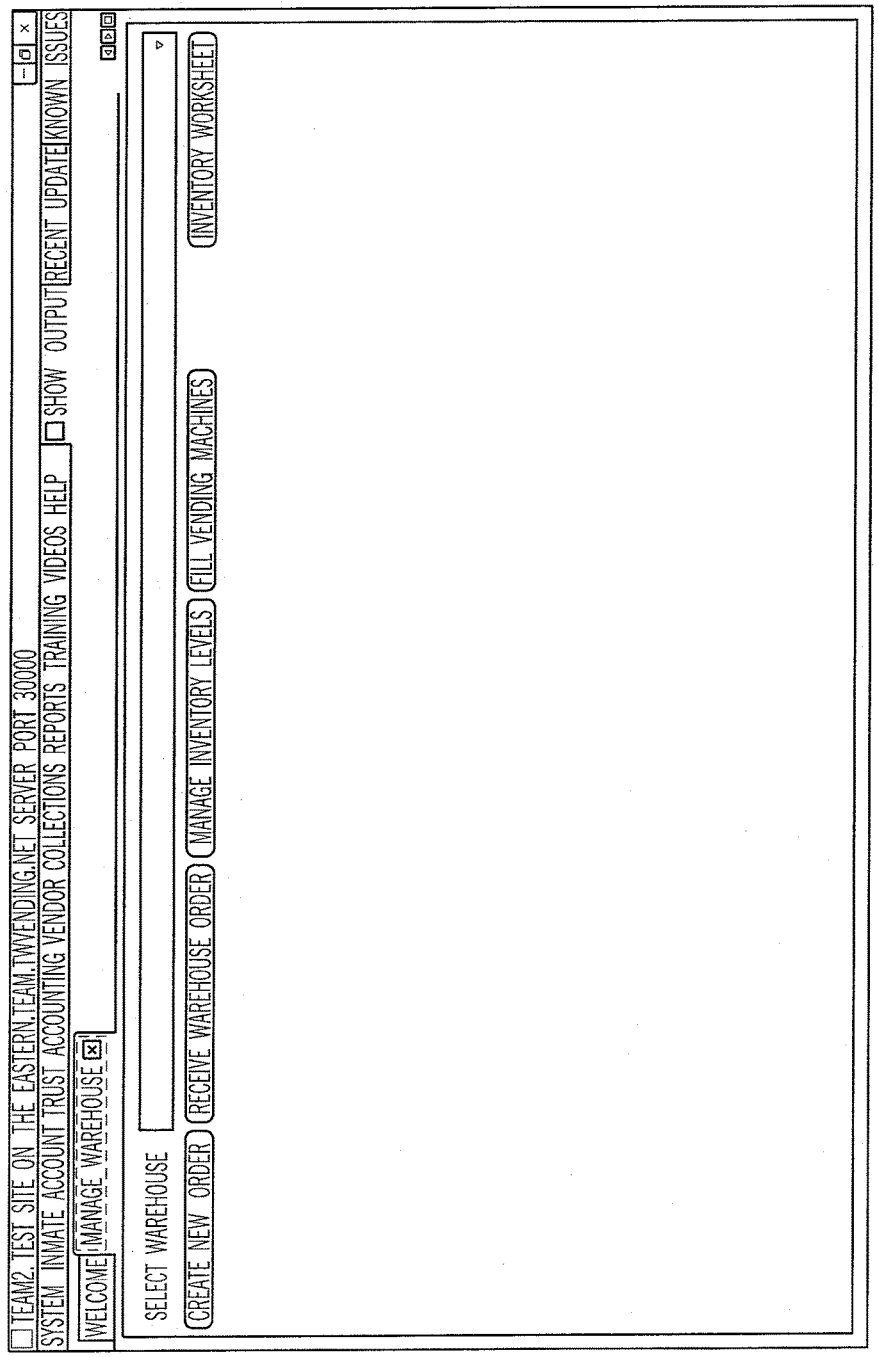
Figure 37:
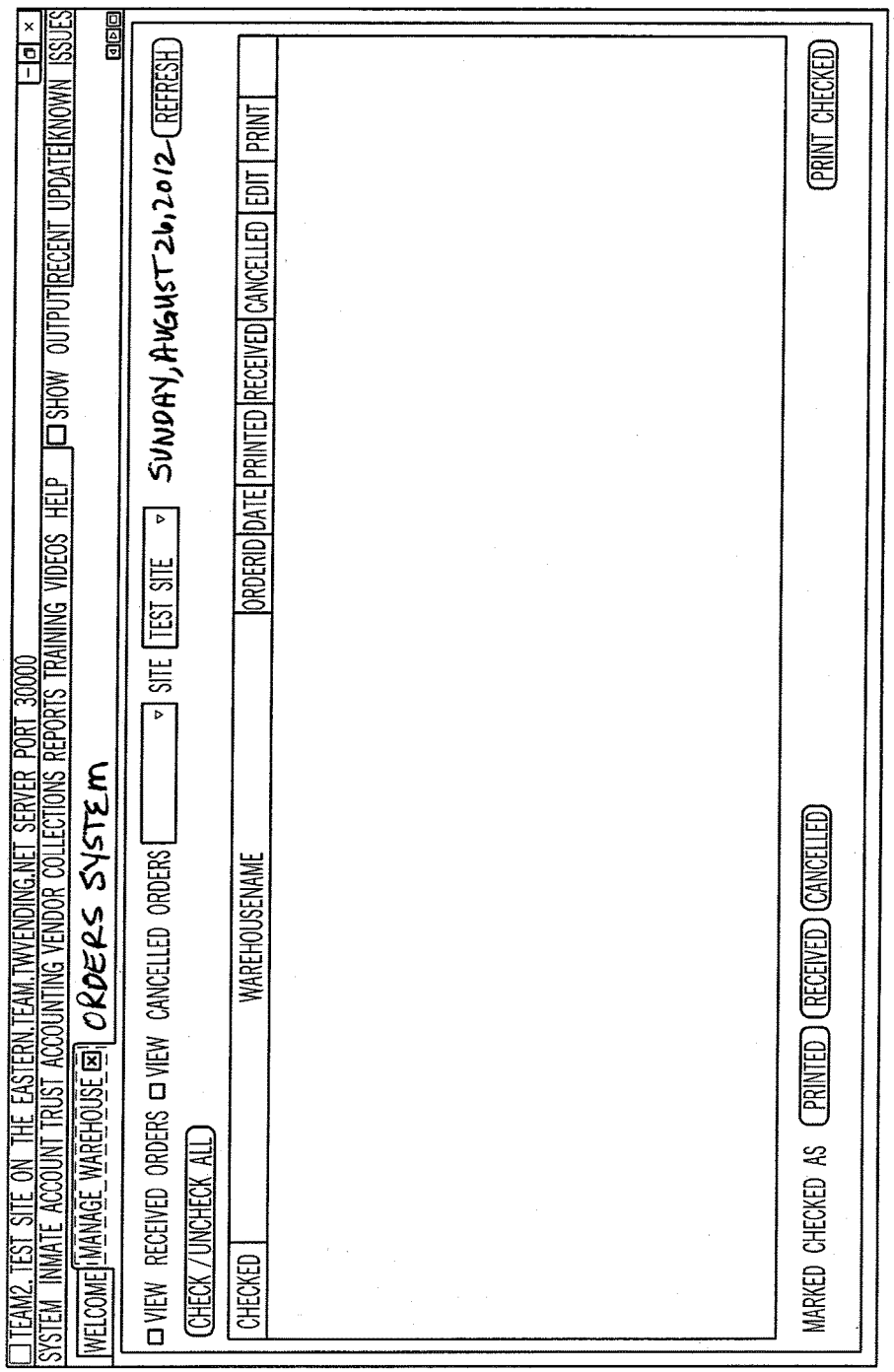
Figure 36:
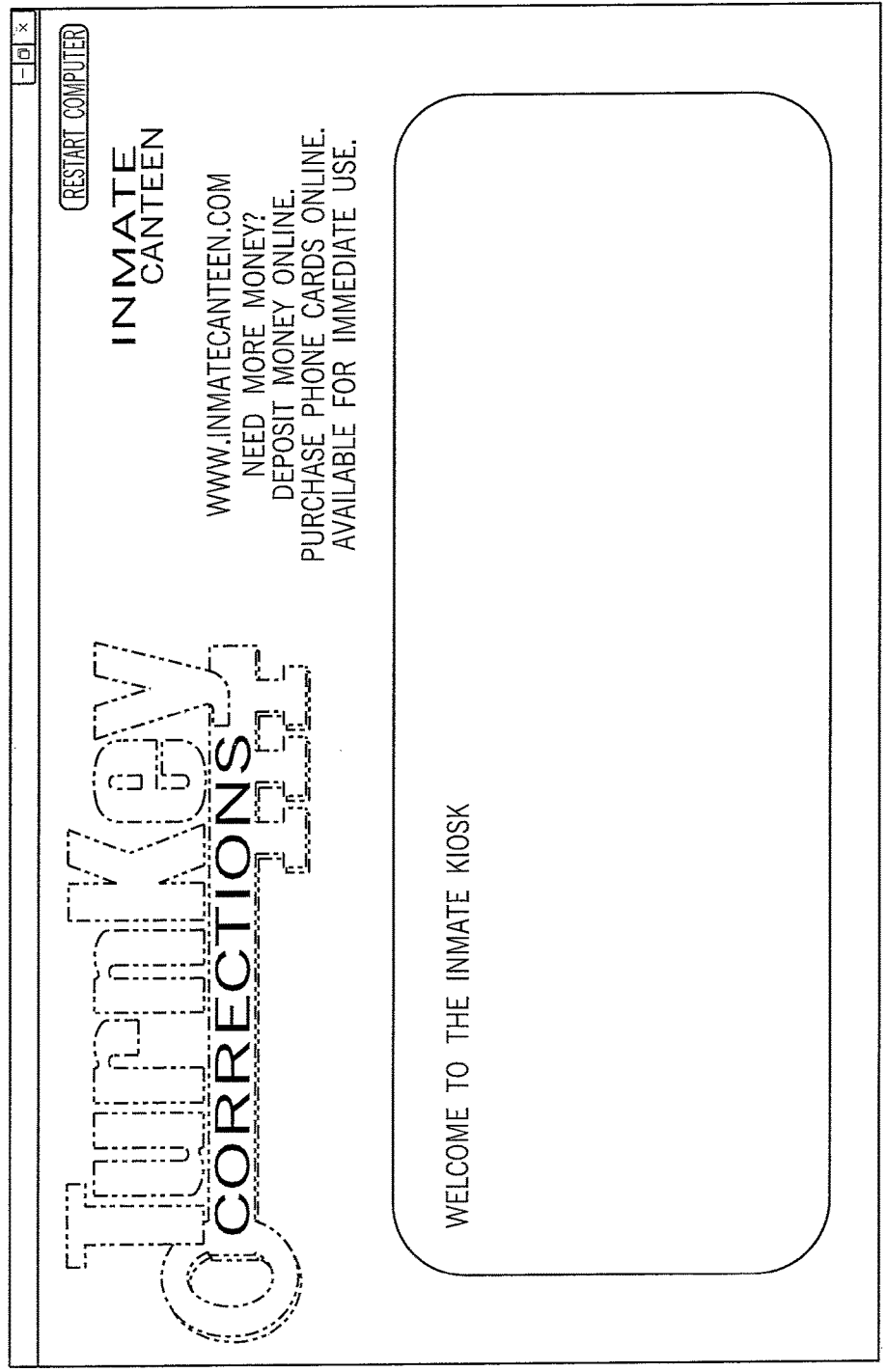

Additional administrator control functions and user interfaces therefor are shown in FIGS. 25-37. FIG. 25 illustrates a Close Inmate Account screen 111. FIG. 26 shows an Assign Inmate Smart Card screen 112. FIG. 27 discloses a Discipline Inmate Account interface 113. FIG. 28 illustrates an Edit Inmate Account screen 114. FIG. 29 shows an Inmate Requests—Old screen 115. FIG. 30 shows a View Inmate Canteen Order screen 116. FIG. 31 shows a Bank Deposit interface 117. FIG. 32 shows a Deposit To Vendor screen 118. FIG. 33 shows a Pay Vendor user interface 119. FIG. 34 shows a Batch Order screen 120. FIG. 35 shows a Manage Site Canteen System interface 121. FIG. 36 shows a Manage Warehouse screen 122. FIG. 37 discloses a Manage Warehouse Order System user interface 123.

Figure 10:
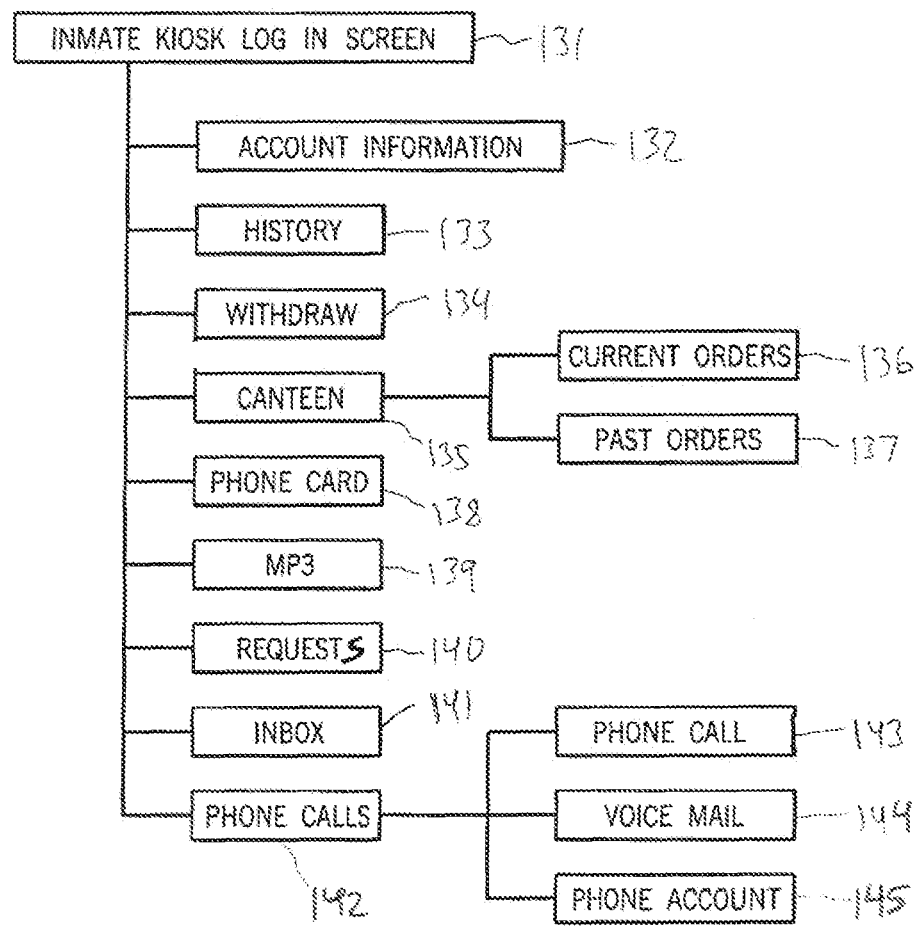
FIG. 10 is a chart of an embodiment of the user screens of the inmate management tools of the system.
Figure 41:
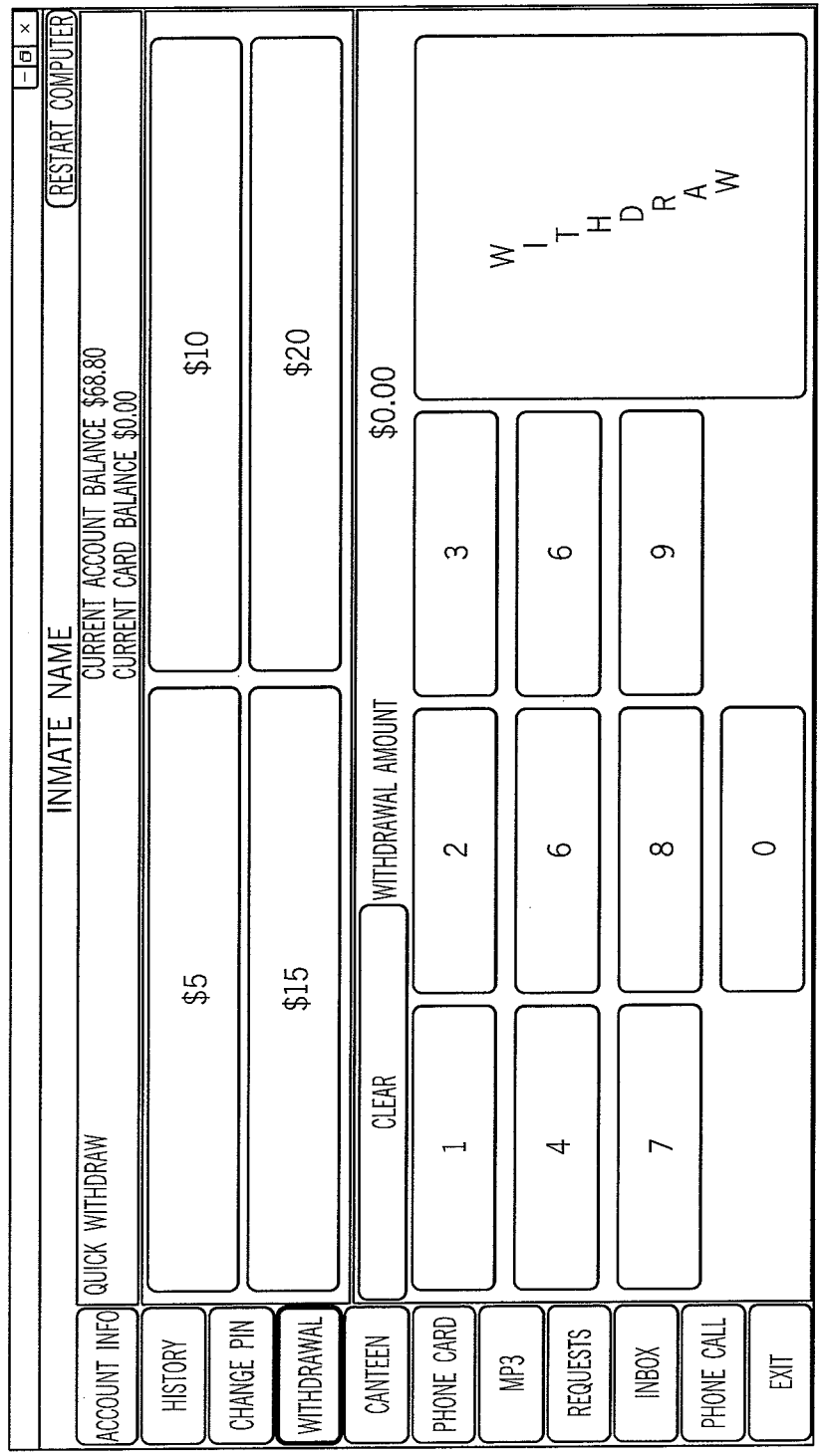
Figure 42:
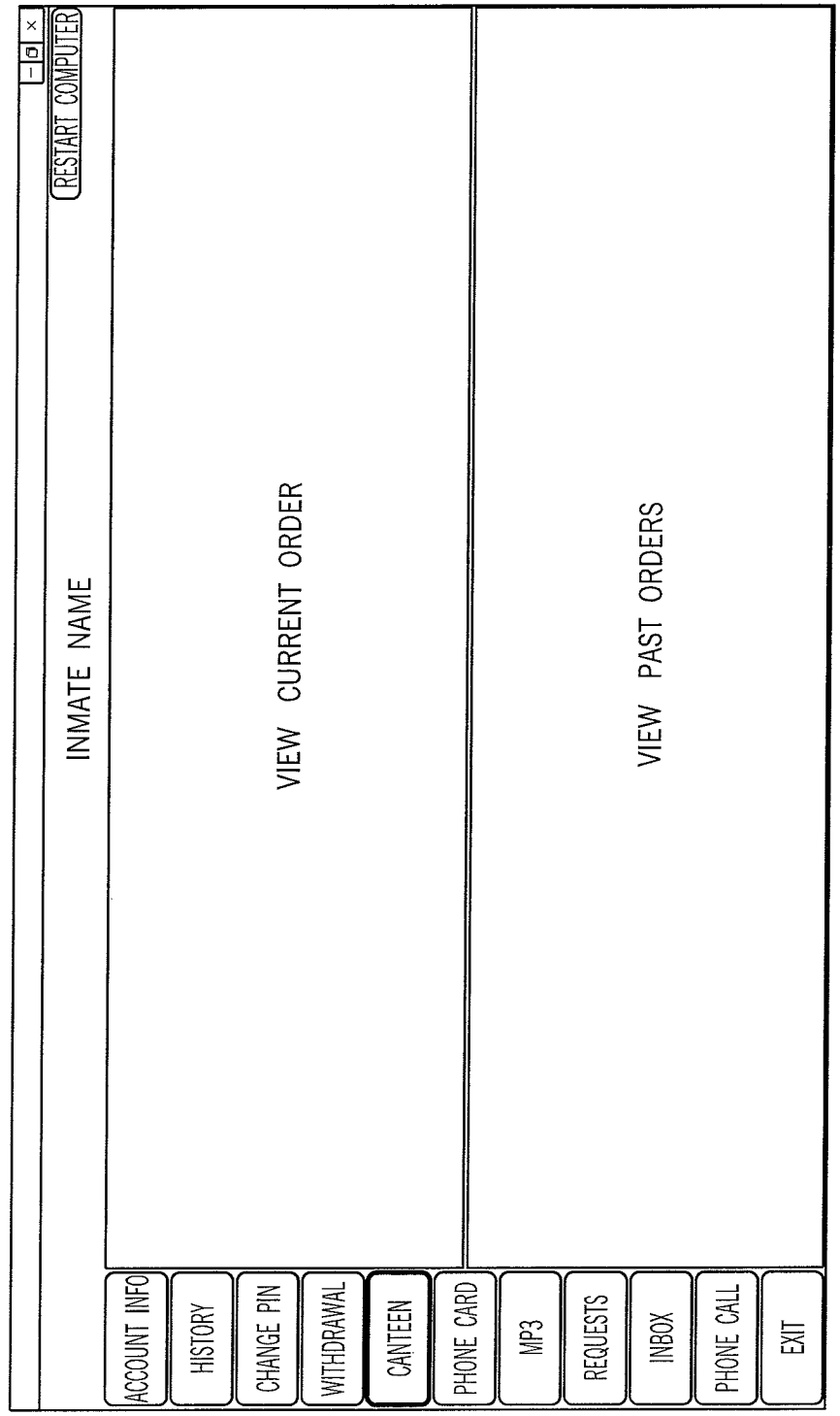
Figure 43:
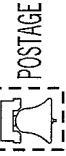
Figure 45:
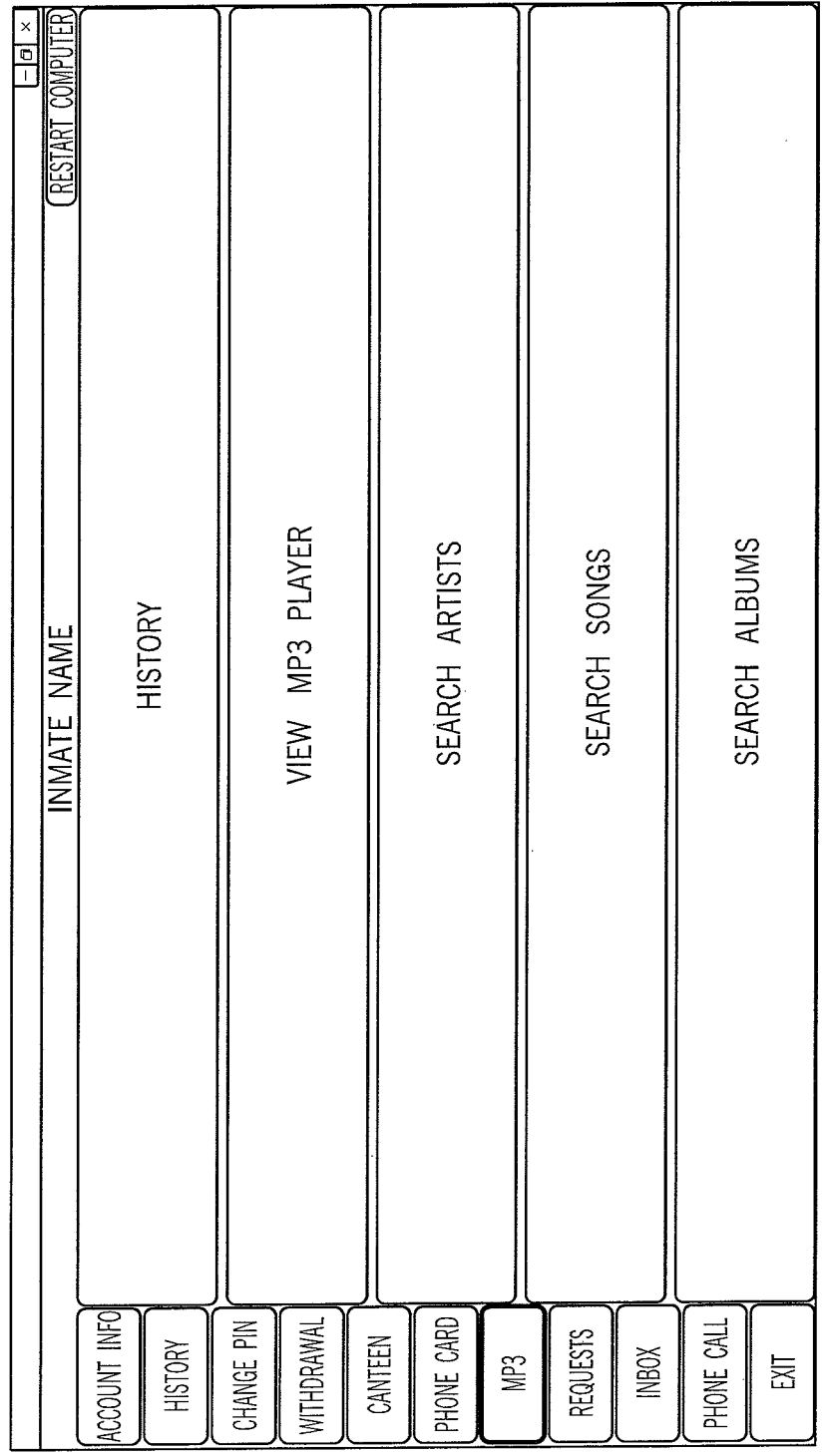
Figure 4B:
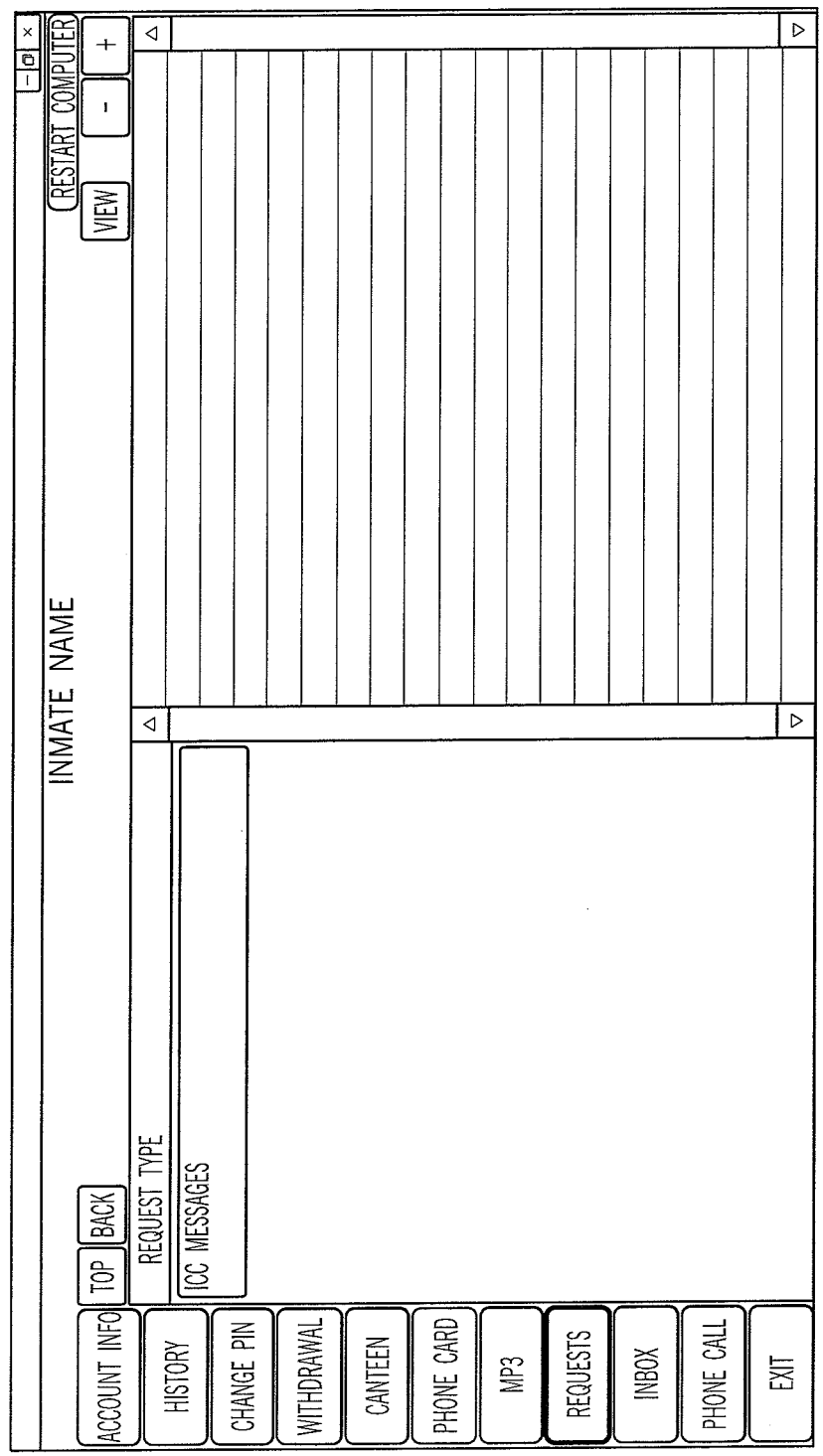
Figure 47:
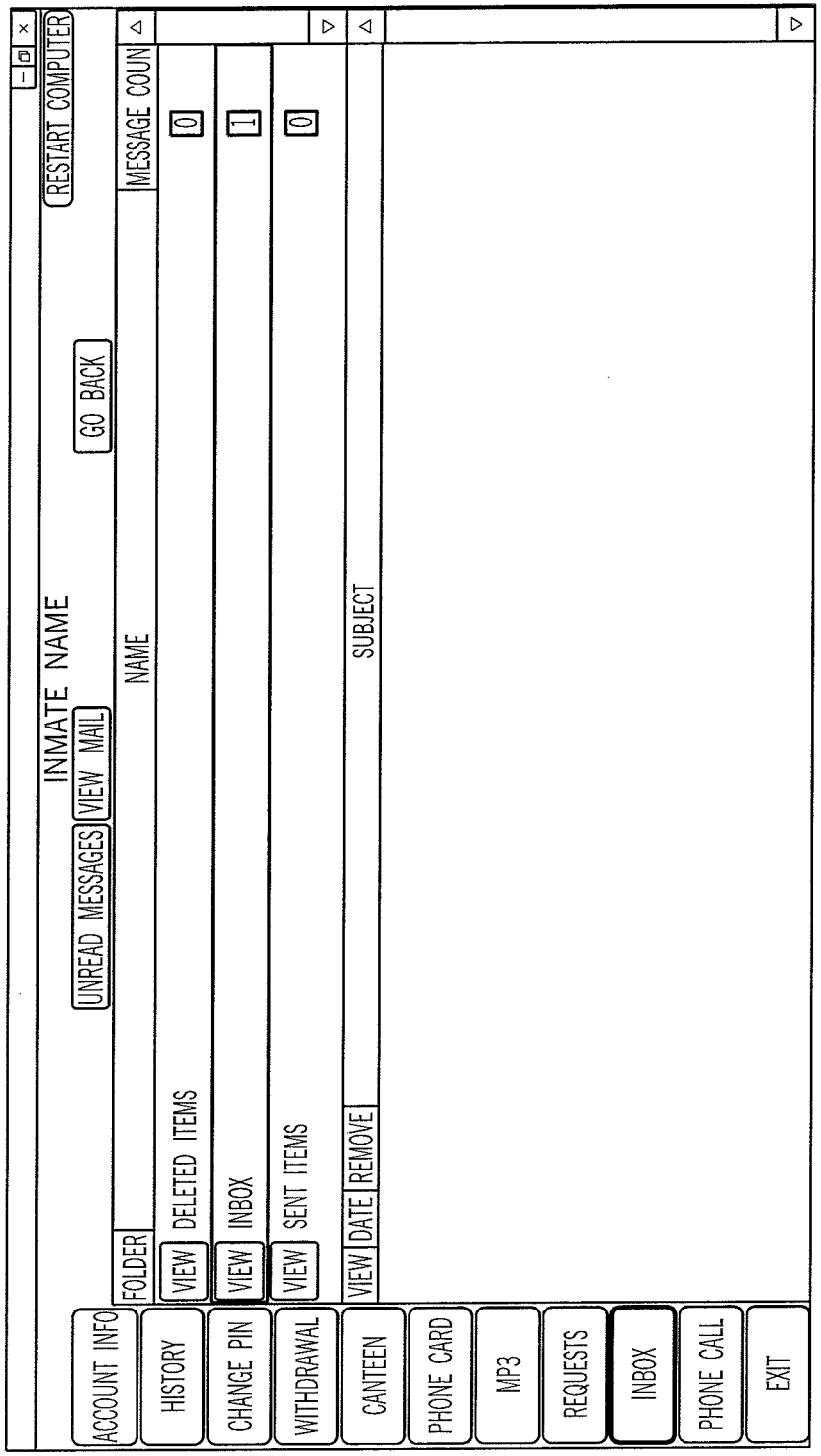
Figure 48:
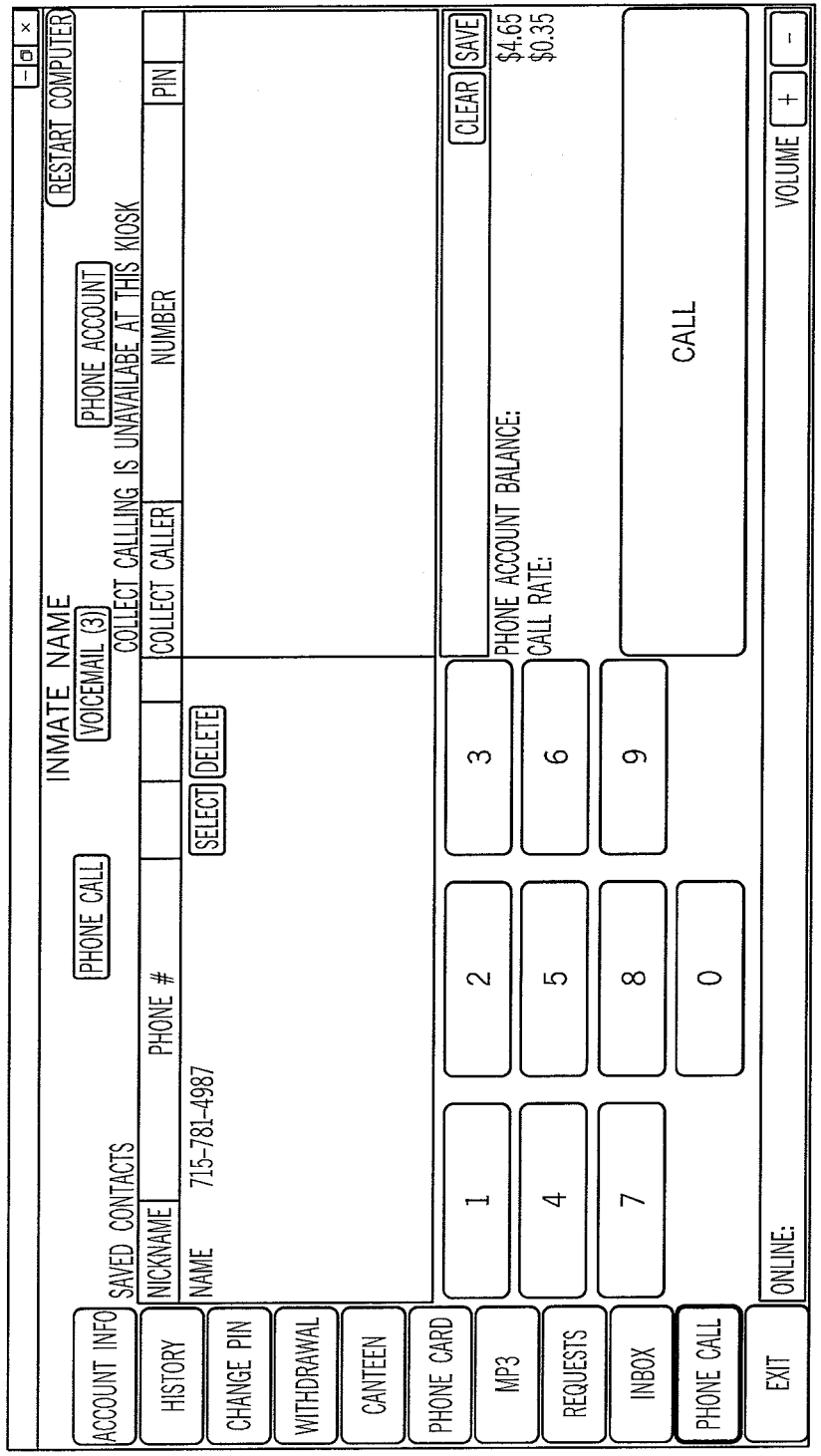
Figure 49:
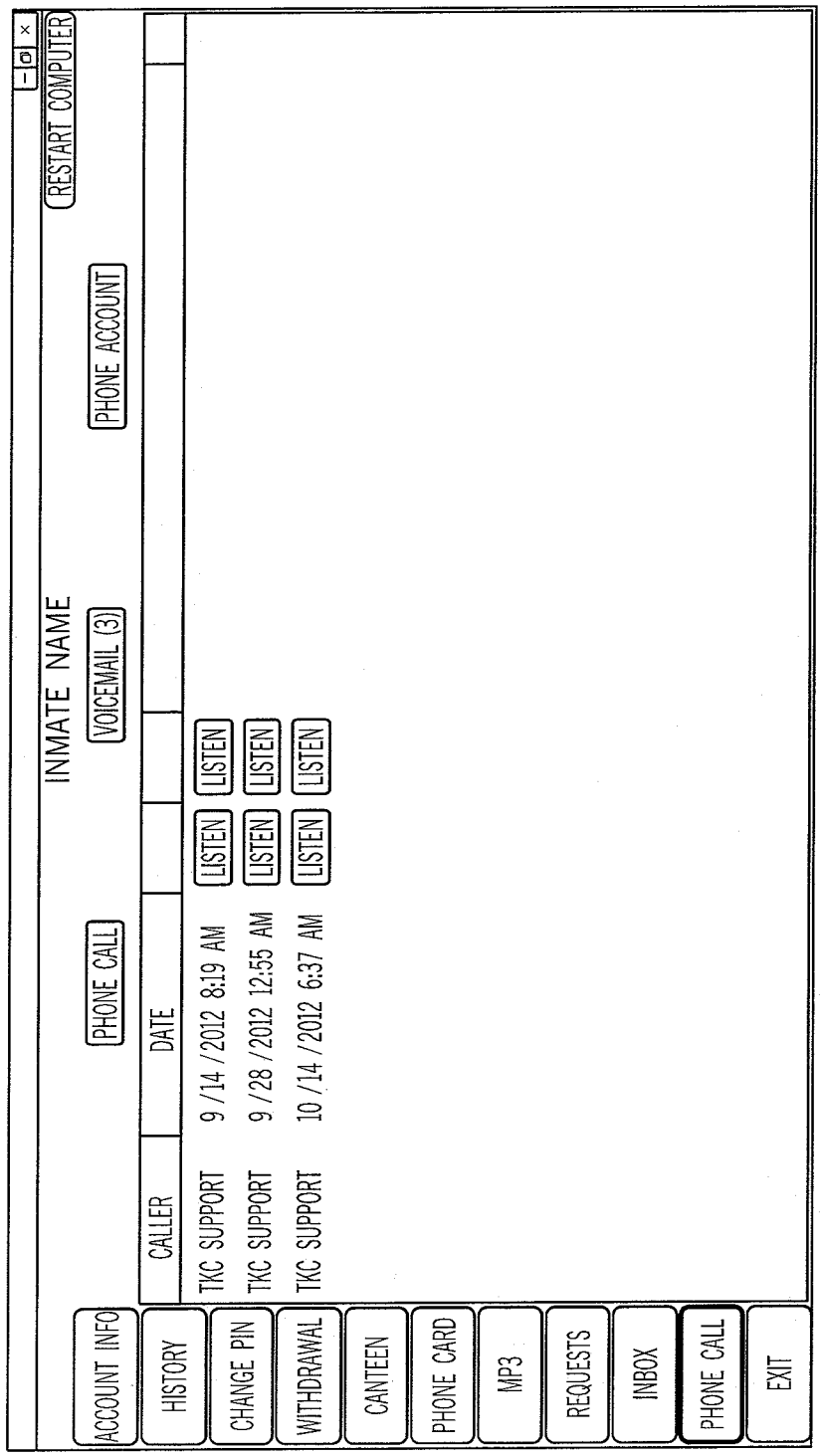
Figure 50:
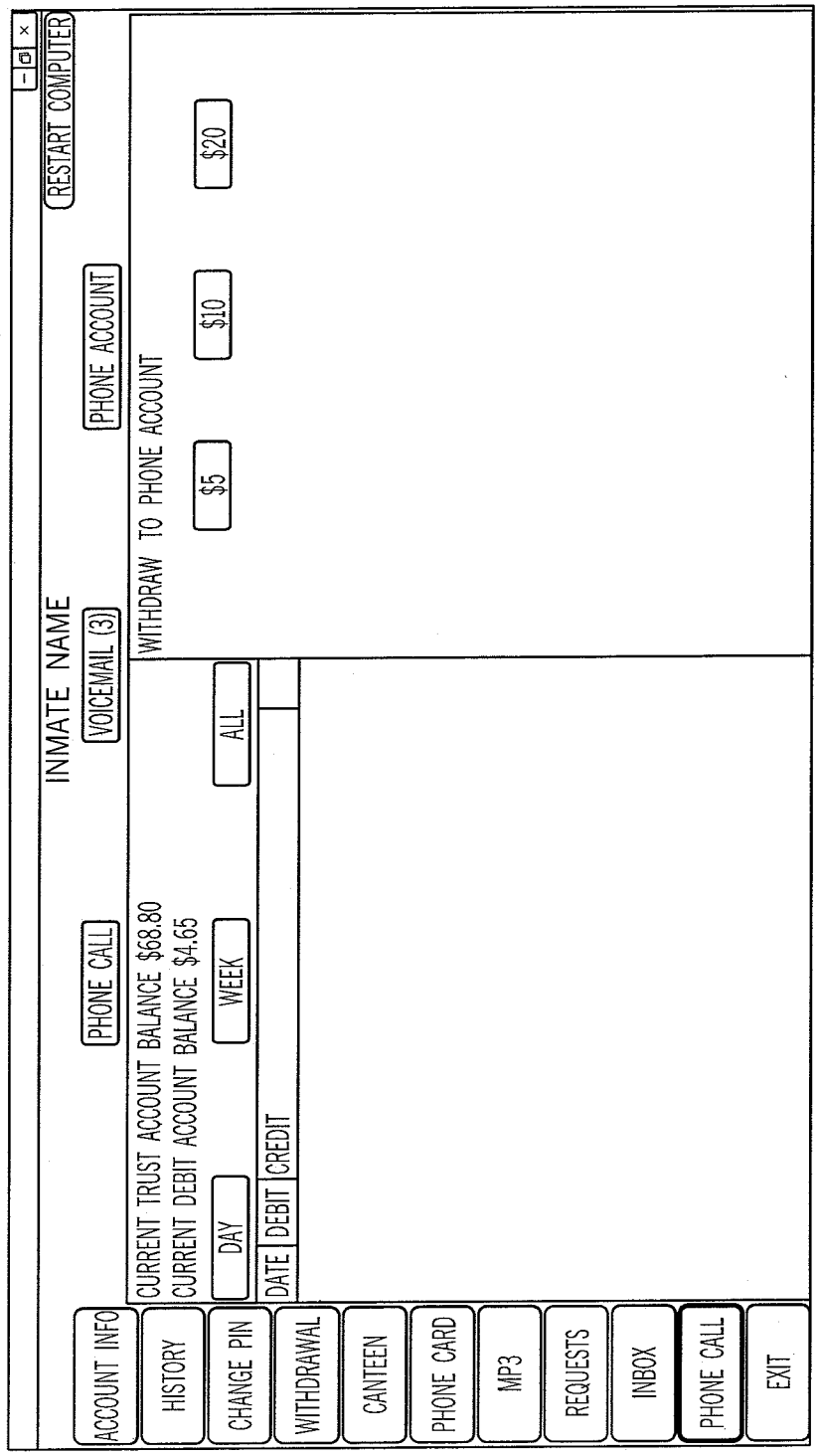

FIG. 10 is a chart of an embodiment of the user screens of the inmate management tools 130 of the system. At the Login Screen 131 a username and password are input. The following options are provided: Account information 132, Account History 133, Withdrawal Information 134, Canteen Information 135A/B (including Current Order 136 and Past Orders 137), Phone Cards 138, MP3 139, Requests 140, Inbox 141, and phone calls 142, including Phone Calls 143, Voice. Mail 144 and Phone Account 145. FIGS. 38 to 50 show embodiments of user screens of the inmate management tools of the system outlined in the Chart of FIG. 10, with an example of the login screen 131 shown in FIG. 38. An example of the Account Information screen 132 is shown in FIG. 39. The Account History screen 133 is shown in FIG. 40. The Withdrawal Information screen 134 is shown in FIG. 41. The Canteen Information screens 135a/b are shown in FIGS. 42 and 43, including Current Order selection 136 and a Past Orders selection 137. The Phone Card screen 138 is shown in FIG. 44. The MP3 screen 139 is shown in FIG. 45. The Requests screen 140 is shown in FIG. 46. The Inbox 141 is shown in FIG. 47. The Phone Call screen 143 is shown in FIG. 48. The Voice Mail screen 144 is shown in FIG. 49. And, a preferred embodiment of the Phone Account screen 145 is shown in FIG. 50.

Figure 11:
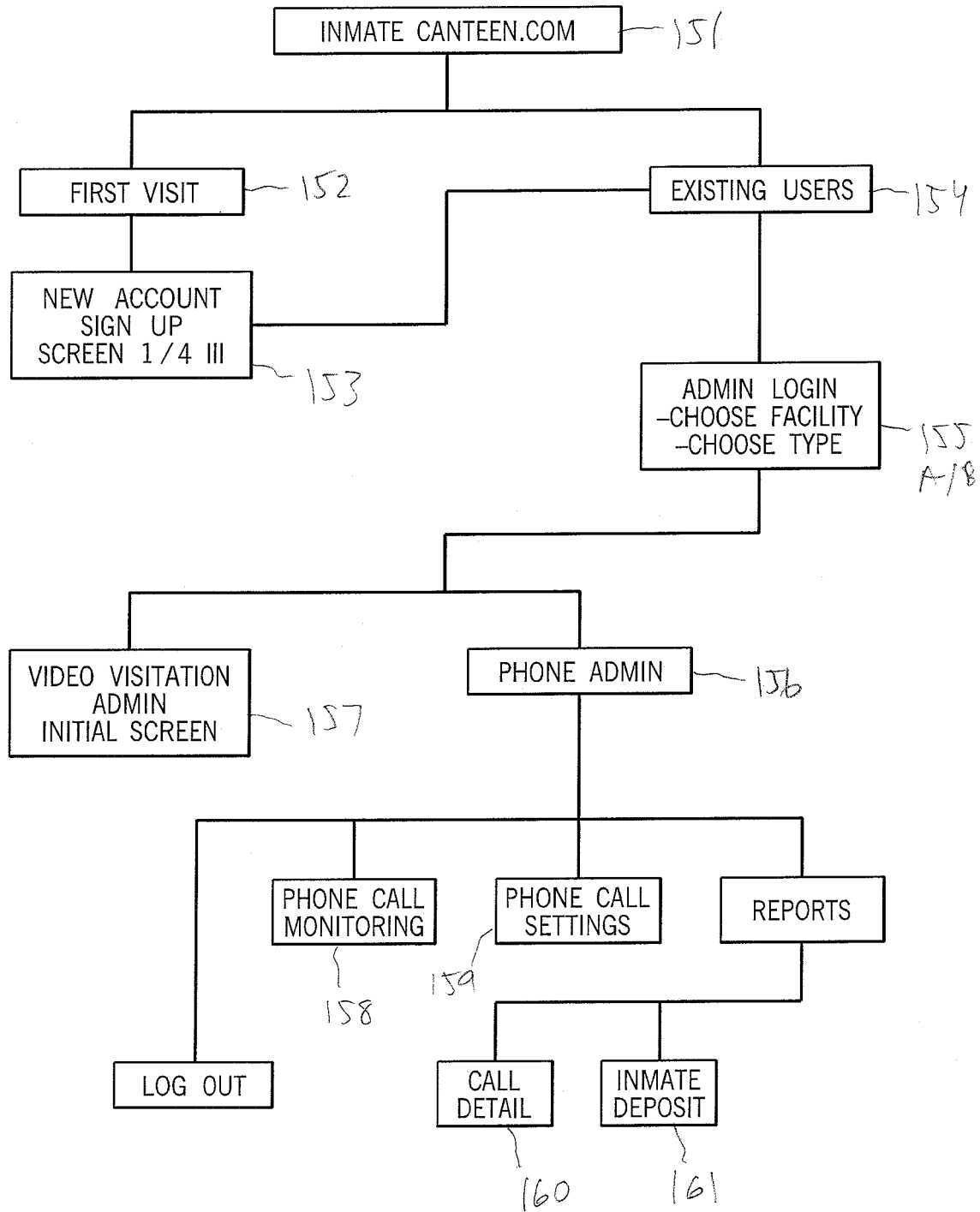
FIG. 11 is a chart of an embodiment of the user screens of the family/friend management tools of the system.
Figure 51:
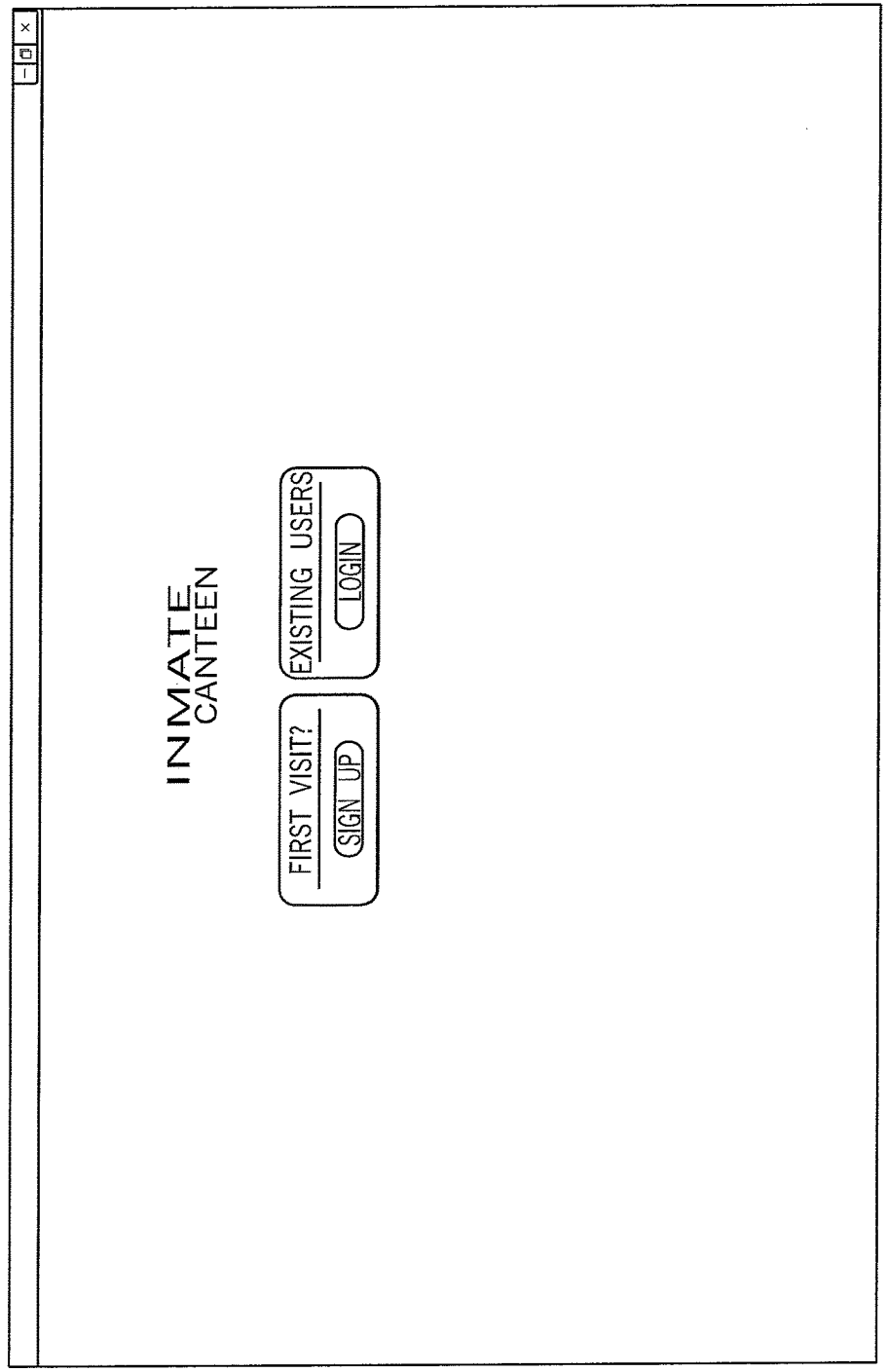
Figure 53:
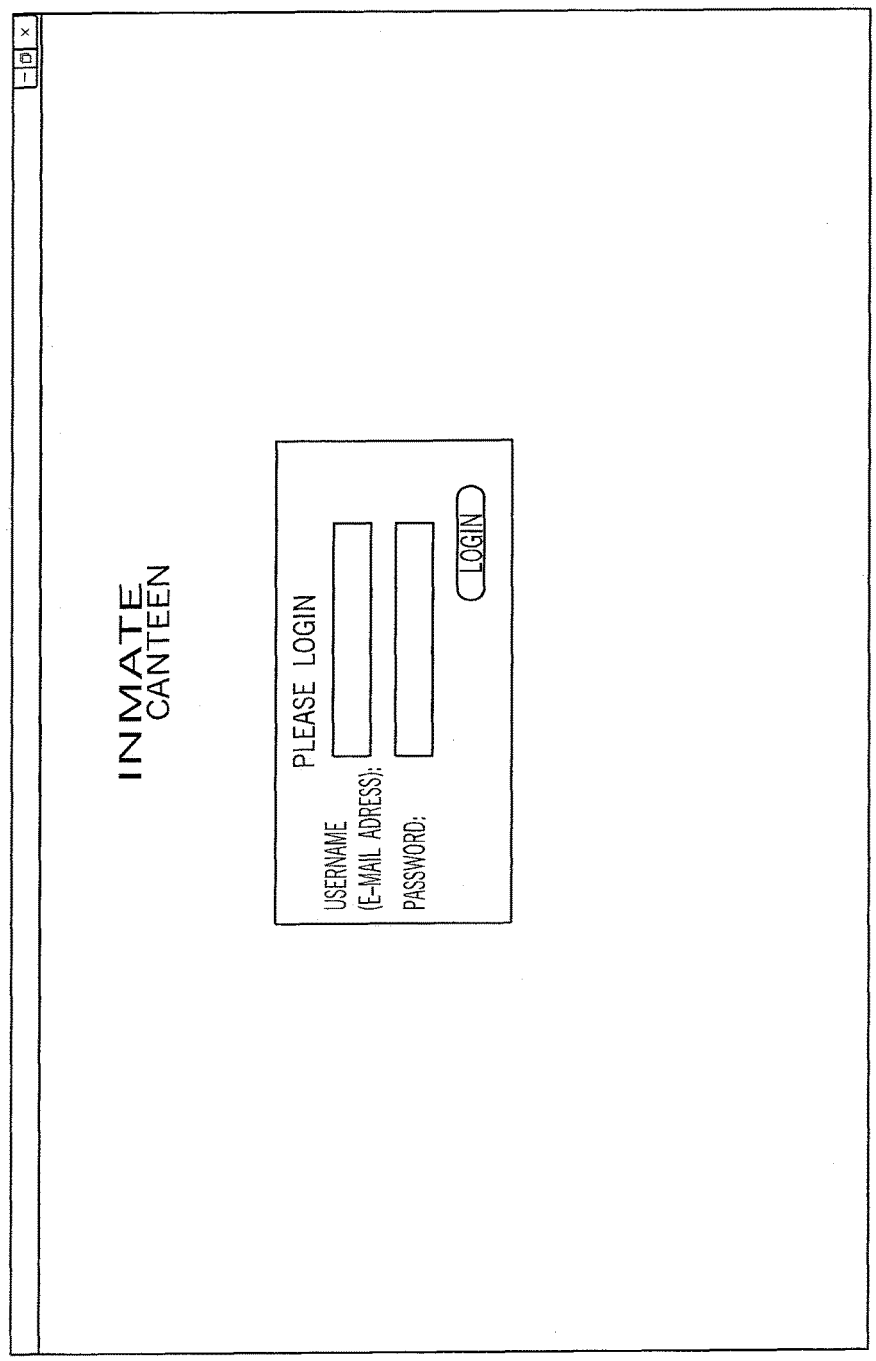
Figure 54:
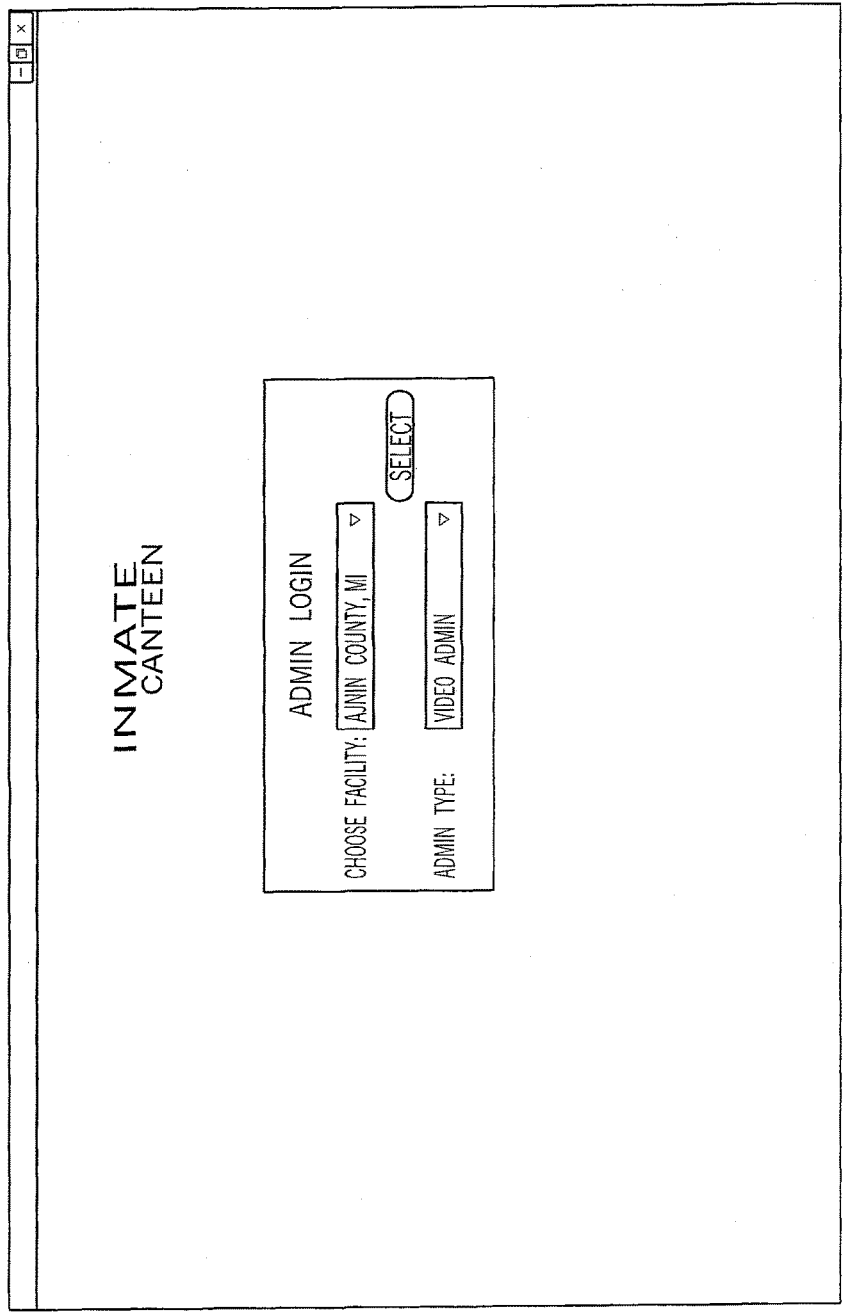
Figure 56:
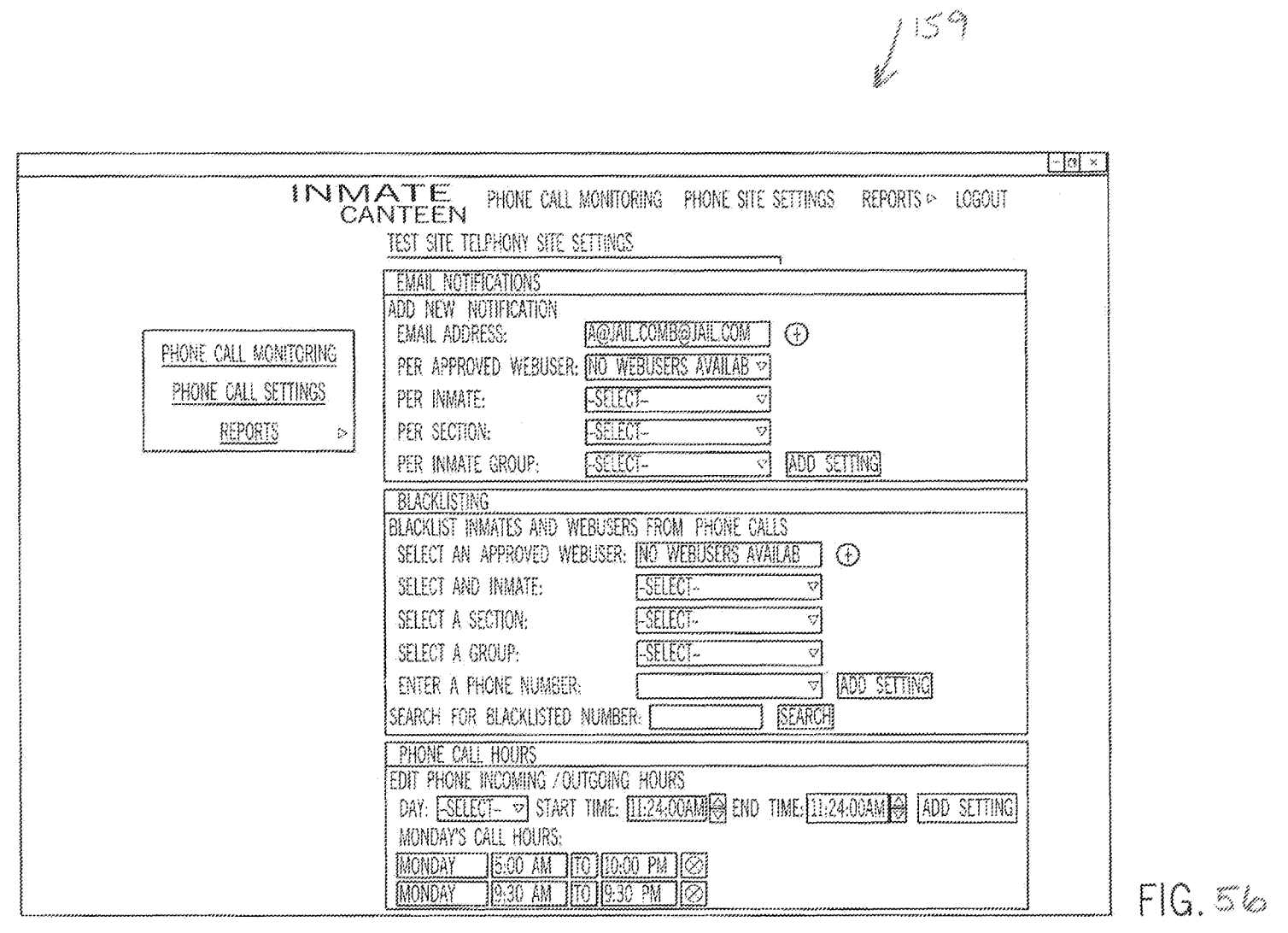
Figure 57:
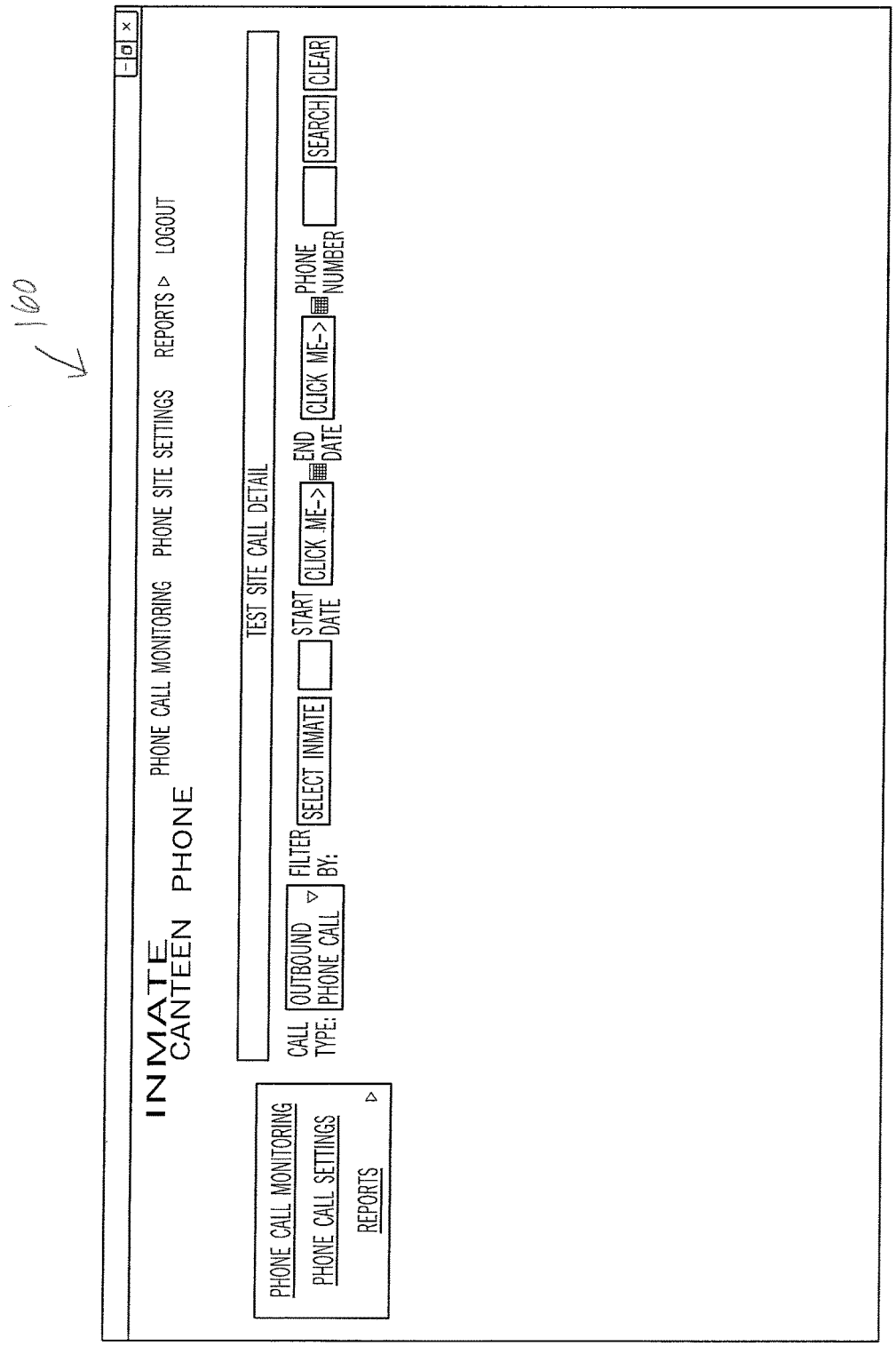
Figure 58:
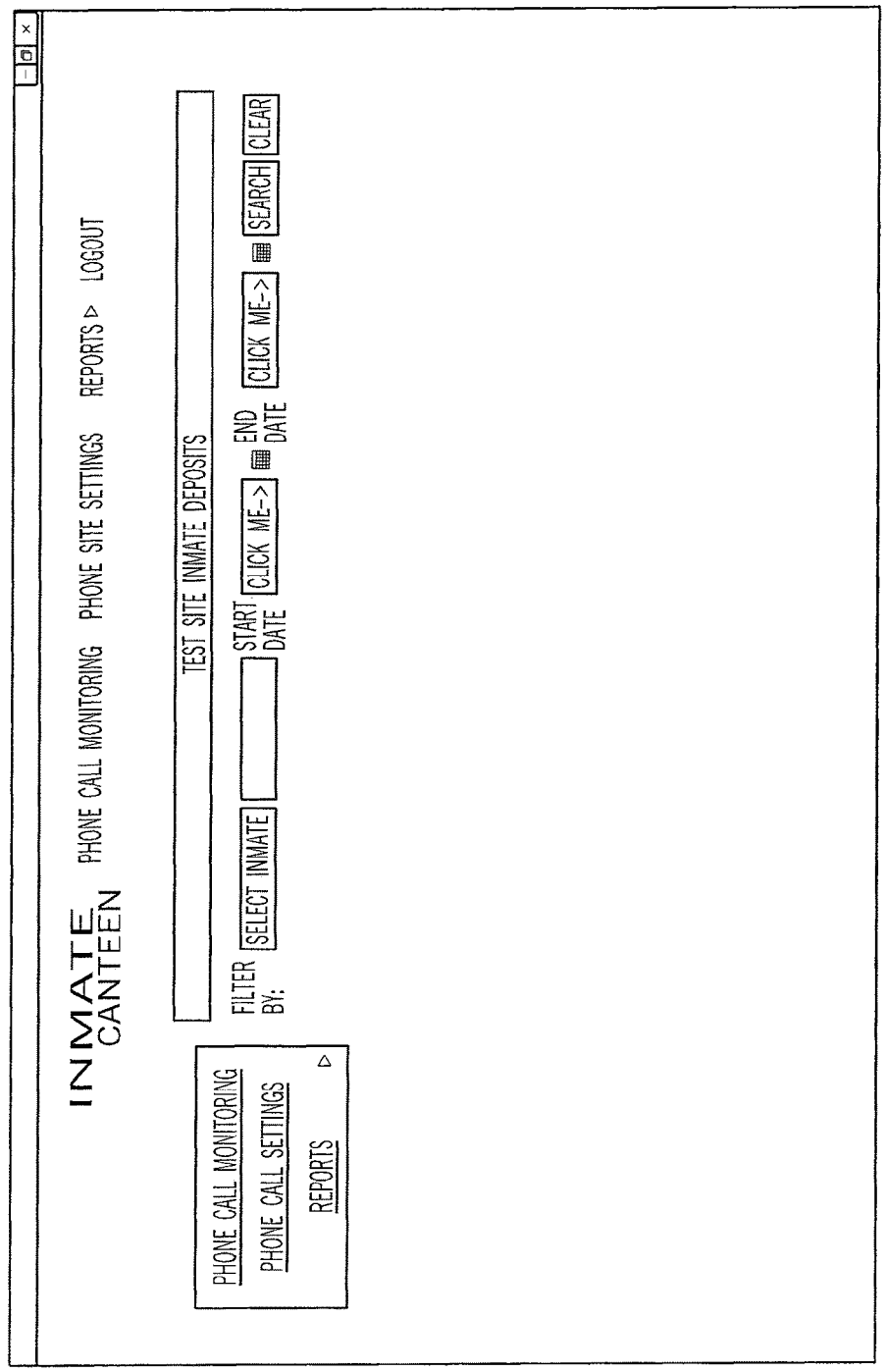
Figure 59:
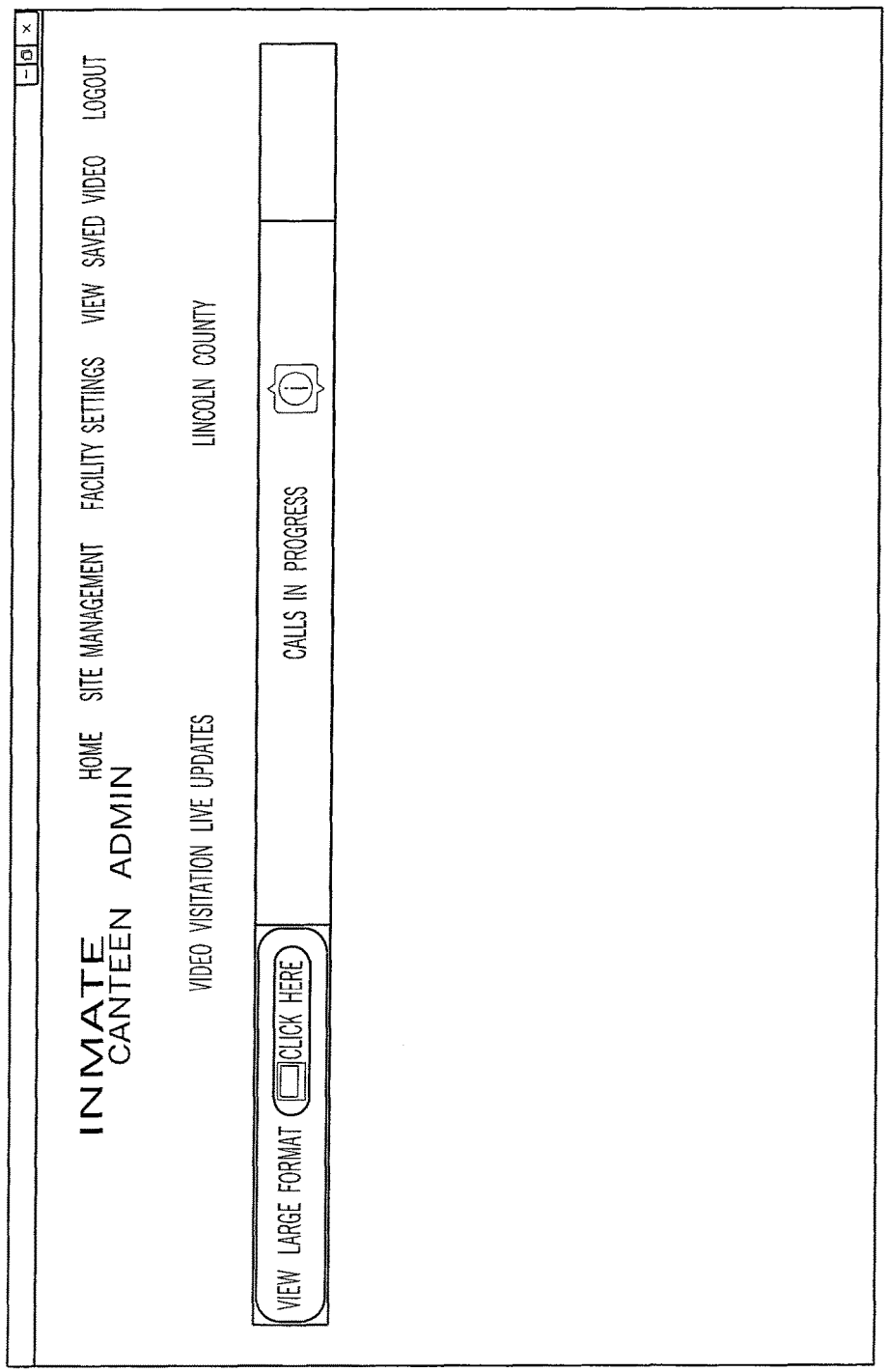

FIG. 11 is a chart of an embodiment of the user screens of the family/friend management tools 150 of the system. An on-line web based login screen 151 are for input of a username and password. First time visitors 152 are routed to a New Account Sign Up screen 153 and sub screens (not shown) for input of user information. Holders 154 of accounts are routed to a screen 155a/b permitting selection of a facility (jail) and a choice of communication administration between phone 156 and video visitation 157 (audio-visual). For phone administration 156, phone call monitoring 157, phone call setting 158 and reports (call details 159 and inmate deposit 160) are available. FIGS. 51-59 show exemplary embodiments of user interfaces for these functions for family/friend management. FIG. 51 illustrates the login screen 151. FIG. 52 shows an embodiment of the New Account Sign Up Screen 153. FIG. 53 shows an admin screen 155a for user name and password. FIG. 54 shows a facility selection screen 155b. FIG. 55 shows an example interface for phone administration 156. FIG. 56 shows a phone call setting screen 159. FIG. 57 illustrates a call detail screen 160. And, FIG. 58 discloses an inmate deposit user interface 161. FIG. 59 shows a video visitation admin screen 157.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A system for providing telecommunications between a resident inside a secure facility and at least one person outside the secure facility, and for management of such telecommunications by an administrator of the secure facility, comprising: a phone server adapted to be communicatively connected to an external service provider; a monitoring station communicatively connected to the phone server an account manager server communicatively connected to the phone server, and a plurality of telecommunications devices disposed at the secure facility for use by the resident and being communicatively connected to the phone server, and software means to receive and connect a direct, real-time incoming voice call to a resident from the at least one person outside the secure facility, the software means first determining the location of the inmate within the secure facility, second determining a set of telecommunication devices of the plurality of telecommunication devices that are near the location of the inmate in the secure facility, and third dialing the set of telecommunications devices that are near the location of the inmate in the secure facility to establish real-time, incoming voice call directly between the outside caller and the inmate.

2. The system of claim 1, wherein the secure facility is an institution selected from the group of institutions consisting of a jail, a detention center, a short term corrections facility, a penitentiary, a prison and a mental health institution; wherein the resident is a person selected from the group of persons consisting of an inmate, a prisoner and a patient; wherein the administrator is a person selected from the group of persons consisting of a sheriff, an officer, a guard, a warden, a jailer, and a mental health worker, and wherein the at least one person outside secure facility is selected from the group of persons consisting of a family member a friend, an acquaintance, and an attorney.

3. The system of clam 1, wherein telecommunications between the resident of the secure facility and the at least one person outside the secure facility is selected from the group of communications consisting of voice, SMS text, IM, email, and audio-visual; and wherein management of telecommunications is selected from the group of activities consisting of monitoring, recording, controlling and documenting communications and transactions of the resident.

4. The system of claim 3, wherein the controlling activities are selected from the group of activities consisting of call blocking, blacklisting, email notification, section/station setting, attorney call status, deferred call status.

5. The system of claim 1, wherein the person outside the secure facility is further able to electronically deposit funds or credits to an account of the resident at the secure facility, the account funding products and services at the secure facility selected from the group of products and services consisting of voice communications, audio-visual communications, vending drink, snacks and food items, and commissary items such as personal care items, books, videos, clothing and apparel, and blankets; and wherein the administrator is further able to monitor, audit and manage the account of the resident.

6. The system of claim 1, wherein the at least one telecommunications device disposed at the secure facility is a device selected from the group of devices consisting of a land line telephone, a mobile telephone, a personal computer (PC), and a telecommunications kiosk; and wherein the person outside the secure facility communicatively connects with the system by a device adapted to connect to the phone server selected from the group of devices consisting ala land line telephone, a mobile telephone, a smart phone, a PC and a telecommunications kiosk.

7. The system of claim 1, wherein the phone server, monitoring station, at least one telecommunications device disposed at the secure facility, and devices used by the at least one person outside the secure facility communicatively connect by Voice Over Internet Protocol (VoIP).

8. The system of claim 1, wherein the phone server includes a telephony switch which is adapted to connect to the external service provider via Session Initiated Protocol (SIP).

9. The system of claim 8, wherein, the telephony switch is a software element.

10. The system of claim 8, wherein the phone server controls call permissions, call charging, recording and monitoring.

11. The system of claim 1, wherein the monitoring station communicates with the phone server to request recorded and live stream telecommunications between the resident and the at least one person outside the secure facility.

12. The system of claim 11, wherein the monitoring station further functions to pause, fast forward, and rewind a recorded telecommunications stream, and to stop a live call in progress.

13. The system of claim 12, wherein the monitoring station further functions to process calling rules.

14. The system of claim 1, wherein the account manager server is a server which handles TCP/IP protocols over an IP network, and stores and processes information about the resident, the at least one person outside the secure facility.

15. The system of claim 14, wherein the account manager server is a TEAM Server provided by Team Software of Hudson, Wis. USA.

16. The system of claim 1 further comprising a software based phone management interface communicatively connected to the phone server, the phone management interface processing information including outgoing and incoming call rules, and resident telecommunications rate.

17. The system of claim 1, further comprising hardware based call record server for storing recorded calls, the call record server being communicatively connected to the phone server via the Internet.

18. The system of claim 1 further comprising a software based communication account server for accounting and business management of the system, the communication account server being disposed outside the secure facility at a third part manager of the system, the communication account server being communicatively connected to the phone server via the Internet.

19. A system for providing telecommunications, vending and commissary services between an intnate inside a correctional facility, the facility being of the type having a public lobby, visitor center, or booking area in addition to secure inmate resident section, and at least one non-inmate family member, friend or attorney, and for management of such telecommunications, vending and commissary services by an administrator of the secure correctional facility, comprising:
   a. a phone adapted to be communicatively connected to an external service provider;
   b. a monitoring station communicatively connected to the phone server,
   c. an account manager server communicatively connected to the phone server,
   d. at least one public telecommunications kiosk disposed in the public lobby, visitor center or booking area at the secure facility for use by the at least one non-inmate family member, friend or attorney, the at least one public telecommunications kiosk being communicatively connected to the phone server;
   e. a plurality of land line based, telecommunications kiosks and traditional inmate telephones disposed in the secure inmate residence section of the correctional facility at predetermined fixed locations, the inmate telecommunications kiosks and telephones being communicatively connected to the phone server;
   f. software means to receive and connect a real-time incoming voice call to a resident from the at least one person outside the secure facility; including:
      i. receiving a call request from the person outside,
      ii. prompting the person outside for a resident extension,
      iii. locating the resident within the secure facility,
      iv. determining a set of kiosks and telephones, within the plurality of kiosks and telephones in the secure facility, that are near the inmate;
      v. verifying that a call is authorized,
      vi. creating a call record, and
      vii. dialing the resident at the kiosks and telephones of the set of kiosks and telephones that are determined in step (iv) to establish a direct, real-time, incoming voice call between the outside caller and the inmate;
   g. wherein the telecommunications between the inmate and the at least one non-inmate family member, friend or attorney is a real-time voice communication; and wherein management of the real-time voice call is selected from the group of activities consisting of monitoring, recording, controlling and documenting communications and transactions of the inmate; and
   h. wherein the inmate does not have a portable wireless transmitter.

20. A method for telecommunicating between a resident inside a secure facility and at least one person outside the secure facility, and for management of such telecommunication by an administrator of the secure facility, comprising the steps of (a) providing a system comprising a phone server adapted to be communicatively connected to an external service provider; a monitoring station communicatively connected to the phone server; an account manager server communicatively connected to the phone server, and a plurality of telecommunications devices disposed at the secure facility for use by the resident and being communicatively connected to the phone server, and software means to receive and connect a real-time incoming voice call to a resident from the at least one person outside the secure facility, the software means first determining the location of the inmate within the secure facility, second determining a set of telecommunication devices of the plurality of telecommunication devices that are near the location of the inmate in the secure facility, and third dialing the set of telecommunications devices that are near the location of the inmate in the secure facility, and (b) making an incoming voice call from at least one person outside the secure facility to the resident inside the secure facility, wherein the step of making an incoming call comprises the steps of receiving a call request from the person outside, prompting the person outside for a resident extension, locating the resident, determining the set of telecommunications devices of the plurality of telecommunications devices that are near the location of the inmate in the secure facility, verifying that a call is authorized, creating a call record, and dialing the resident at the set of telecommunications devices that are near the location of the inmate in the secure facility to establish a real-time, voice call directly between the outside caller and the inmate.

21. The method of claim 20 further comprising the step of making an outgoing call from the resident to at least one person outside the secure facility.

22. The method of claim 21, wherein the step of making an outgoing call comprises the steps of receiving a phone number request, verifying that the resident is authorized to make an outgoing call, creating a call record, and sending a call request to a telephony service provider.

23. The system of claim 1, wherein the inmate does not have a portable wireless transmitter.

* * * * *